(12) United States Patent
Liang et al.

(10) Patent No.: US 12,537,985 B2
(45) Date of Patent: Jan. 27, 2026

(54) DATA TRANSMISSION METHOD AND APPARATUS

(71) Applicant: HUAWEI TECHNOLOGIES CO., LTD., Guangdong (CN)

(72) Inventors: Zhijian Liang, Beijing (CN); Zhigui Wei, Shenzhen (CN); Mengfu Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 18/475,126

(22) Filed: Sep. 26, 2023

(65) Prior Publication Data

US 2024/0022775 A1 Jan. 18, 2024

Related U.S. Application Data

(63) Continuation of application No. PCT/CN2021/083663, filed on Mar. 29, 2021.

(51) Int. Cl.
*H04N 21/258* (2011.01)
*H04L 9/08* (2006.01)
*H04N 21/233* (2011.01)
*H04N 21/2347* (2011.01)
*H04N 21/266* (2011.01)

(52) U.S. Cl.
CPC ..... *H04N 21/25816* (2013.01); *H04L 9/0861* (2013.01); *H04N 21/233* (2013.01); *H04N 21/2347* (2013.01); *H04N 21/26613* (2013.01)

(58) Field of Classification Search
CPC ........... H04N 21/25816; H04N 21/233; H04N 21/2347; H04N 21/26613; H04N 7/1675; H04N 21/4367; H04N 21/4408; H04N 21/4405; H04L 9/0861; H04L 9/32
See application file for complete search history.

(56) References Cited

U.S. PATENT DOCUMENTS

| 10,230,703 B1* | 3/2019 | Lepore ................. H04L 9/0894 |
| 2002/0095574 A1 | 7/2002 | Kori |
| 2009/0122988 A1* | 5/2009 | Schuba ................. H04L 9/0825 380/277 |
| 2012/0155642 A1 | 6/2012 | Nakano |

(Continued)

FOREIGN PATENT DOCUMENTS

| CN | 101166259 A | 4/2008 |
| EP | 2665282 A1 * | 11/2013 ......... H04N 21/4405 |

OTHER PUBLICATIONS

Extended European Search Report in European Appln No. 21933578.3, dated Nov. 24, 2023, 10 pages.

(Continued)

*Primary Examiner* — Mohammad W Reza
(74) *Attorney, Agent, or Firm* — Fish & Richardson P.C.

(57) ABSTRACT

The present disclosure relates to data transmission methods and apparatuses. In one example method, a source device performs identity authentication on and negotiate a key with a transmission device that needs to output audio-video data or perform transformation processing on a transmission path to a sink device, and generates a key distribution packet used to encrypt or decrypt an audio-video stream only for the transmission device that needs to output audio-video data or perform transformation processing.

20 Claims, 40 Drawing Sheets

(56) References Cited

U.S. PATENT DOCUMENTS

2012/0257750 A1   10/2012  Bohm et al.
2022/0200968 A1*  6/2022  Helmick ............... H04L 9/0825

OTHER PUBLICATIONS

International Search Report and Written Opinion in International Appln. No. PCT/CN2021/083663, mailed on Dec. 23, 2021, 17 pages (with English translation).
Extended European Search Report in European Appln. No. 21933578.3, mailed on Nov. 24, 2023, 10 pages.

* cited by examiner

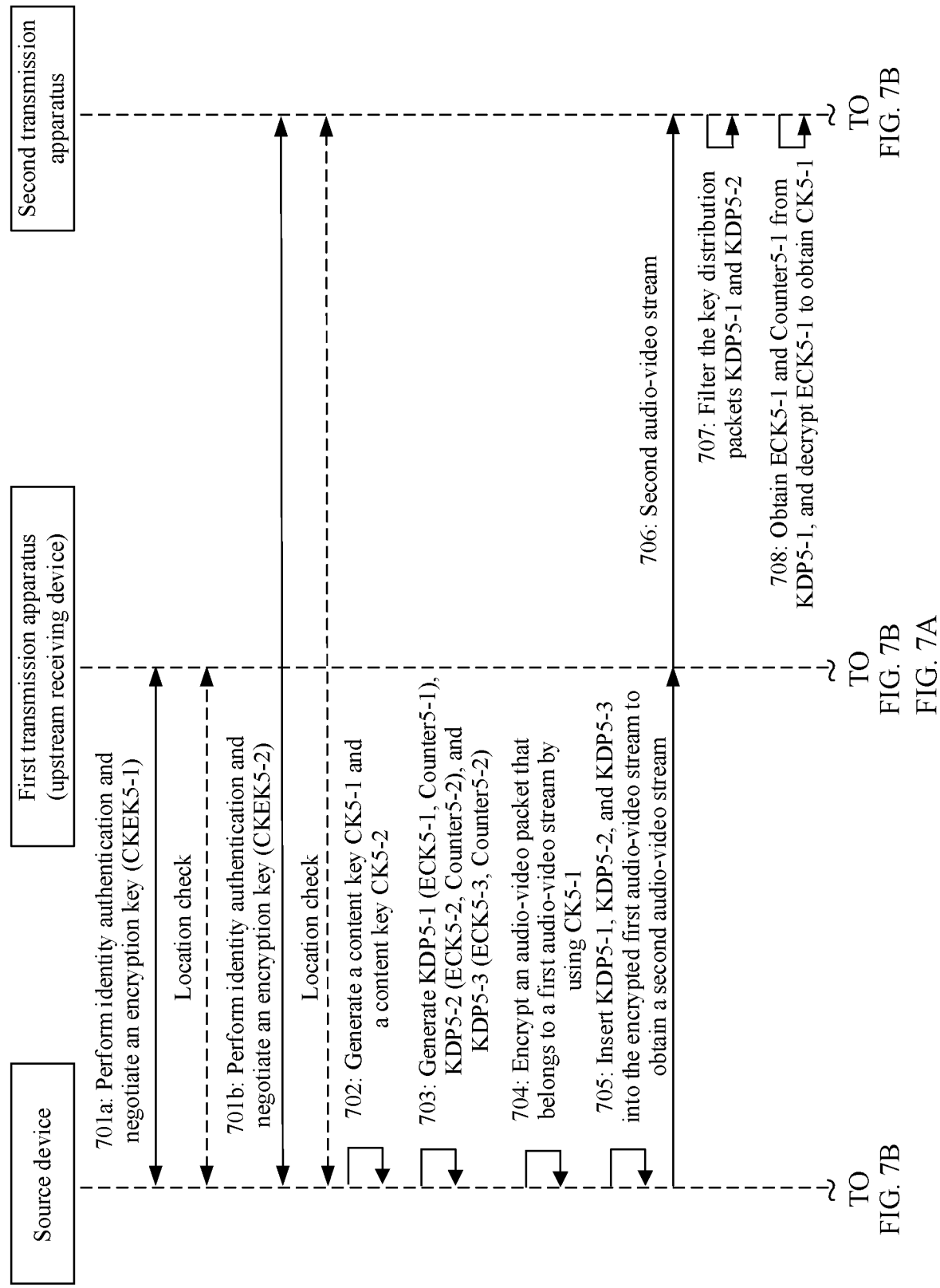

DATA TRANSMISSION METHOD AND APPARATUS

CROSS-REFERENCE TO RELATED APPLICATIONS

This application is a continuation of International Application No. PCT/CN2021/083663, filed on Mar. 29, 2021, the disclosure of which is hereby incorporated by reference in its entirety.

TECHNICAL FIELD

This application relates to the field of communication technologies, and in particular, to a data transmission method and apparatus.

BACKGROUND

With the development of ultra high definition videos, content security is drawing increasing attention. In addition, service scenarios on a media interface are becoming increasingly complex: extension from one media stream to a plurality of media streams, and extension from a media stream to a data stream. In an existing media interface protection standard, all data on a link is centrally encrypted, and a downstream device can decrypt audio-video data sent by a previous-hop device. Consequently, security is low.

SUMMARY

This application provides a data transmission method and apparatus, to improve transmission security of audio-video data.

According to a first aspect, an embodiment of this application provides a data transmission method, applied to a source device, where the source device performs identity authentication on a downstream first transmission apparatus, and negotiates a first encryption key with the first transmission apparatus; generates a first content key, and encrypts the first content key by using the first encryption key to obtain a second content key, where the first content key is used to encrypt or decrypt content transmitted between the source device and the first transmission apparatus; obtains first audio-video data, and encapsulates the first audio-video data into an audio-video packet, where the audio-video packet belongs to a first audio-video stream; processes the first audio-video stream to obtain a second audio-video stream, where the processing includes encrypting an audio-video packet of the first audio-video stream by using the first content key; and the second audio-video stream includes a first key distribution packet, the first key distribution packet is used by the first transmission apparatus to decrypt content from the source device, and the first key distribution packet includes the second content key; and sends the second audio-video stream to the first transmission apparatus. The first transmission apparatus may be a sink device configured to output the audio-video data of the source device, a transformation apparatus configured to transform the data of the source device, or the like. According to the foregoing solution, the source device performs identity authentication on and negotiates the key with the first transmission apparatus, and encapsulates a key distribution packet in a video stream, so that the first transmission apparatus can decrypt an encrypted audio-video stream by using the key distribution packet. Even if another apparatus is further connected between the source device and the first transmission apparatus, the audio-video stream cannot be decrypted, thereby improving transmission security of the audio-video data.

In a possible design, that the source device processes a to-be-sent first multimedia stream to obtain a second audio-video stream includes: encrypting the first audio-video stream by using the first content key and a randomly generated first count value, and adding the first key distribution packet to the encrypted first audio-video stream to obtain the second audio-video stream, where the first key distribution packet further includes the first count value. The randomly generated first count value may be all or some of randomly generated count values of a counter (counter). The audio-video data is encrypted by using a random count value, to further improve transmission security.

In a possible design, the first key distribution packet further includes a device identifier of the first transmission apparatus, which indicates that a device that uses the first key distribution packet is the first transmission apparatus. The device identifier enables the first transmission apparatus to filter the key distribution packet used by the first transmission apparatus.

In a possible design, the first key distribution packet further includes a first stream identifier, which indicates that an audio-video stream to which the first key distribution packet is applied is transmitted between the source device and the first transmission apparatus. The first transmission apparatus determines, by using the stream identifier, a stream for which the key distribution packet is used.

In a possible design, the first key distribution packet further includes one or more of an encryption algorithm, an encryption mode, and a check code.

In a possible design, the first content key includes an odd content key or an even content key, and the second content key includes an encrypted odd content key that is obtained by encrypting the odd content key by using the first encryption key, or an encrypted even content key that is obtained by encrypting the even content key by using the first encryption key.

In a possible design, the adding the first key distribution packet to the encrypted first audio-video stream to obtain the second audio-video stream includes: adding the first key distribution packet to a vertical blanking area of the encrypted first audio-video stream to obtain the second audio-video stream. Adding the key distribution packet to the vertical blanking area can improve utilization of the video area.

In a possible design, the source device and the first transmission apparatus may be connected through an audio-video transmission interface.

In a possible design, the downstream first transmission apparatus is a sink device, the source device is connected to the first transmission apparatus through a second transmission apparatus, the second transmission apparatus is a daisy chain device, and the method further includes: performing identity authentication on the daisy chain device, and negotiating a second encryption key with the daisy chain device; obtaining second audio-video data, and encapsulating the second audio-video data into an audio-video packet that belongs to a third audio-video stream; generating a third content key, and using the second encryption key to encrypt the third content key to obtain a fourth content key, where the third content key is used to encrypt or decrypt content transmitted between the source device and the daisy chain device; processing the third audio-video stream to obtain a fourth audio-video stream, where the processing includes encrypting the audio-video packet by using the third content key, the fourth audio-video stream includes a second key distribution packet, the second key distribution packet is used by the daisy chain device to decrypt the content from the source device, and the second key distribution packet includes the fourth content key; and multiplexing the second audio-video stream and the fourth audio-video stream into one audio-video stream, and sending the one audio-video stream to the daisy chain device.

According to the foregoing solution, the source device performs identity authentication on and negotiate a key with the daisy chain device and the sink device, and does not need to perform authentication on or negotiate a key with another device that does not need to output the audio-video stream or perform transformation processing. During audio-video stream transmission, only a key distribution packet used to decrypt an encrypted audio-video stream needs to be generated for the sink device (and the daisy chain device). Therefore, a device that is on a transmission path and that does not need to output the audio-video stream or perform transformation processing on the audio-video stream cannot know the key and cannot decrypt the audio-video stream. Therefore, after receiving the encrypted audio-video stream, the daisy chain device only forwards the audio-video stream that do not need to be output. This improves transmission security and transmission performance of audio-video streams.

In a possible design, the first transmission apparatus is an audio-video processor device on a transmission path between the source device and the second transmission apparatus, and the second transmission apparatus is a sink device corresponding to the source device, or the first transmission apparatus is a sink device corresponding to the source device, and the first transmission apparatus supports back-transmission of audio-video data of the source device to an upstream second transmission apparatus; and the method further includes: performing identity authentication on the second transmission apparatus, and negotiating a third encryption key with the second transmission apparatus; generating a fifth content key, encrypting the fifth content key by using the first encryption key to obtain a sixth content key, and encrypting the fifth content key by using the third encryption key to obtain a seventh content key, where the fifth content key is used to encrypt or decrypt content transmitted between the first transmission apparatus and the second transmission apparatus, where the second audio-video stream further includes a third key distribution packet and a fourth key distribution packet, the third key distribution packet is used by the first transmission apparatus to encrypt content to be transmitted to the second transmission apparatus, the fourth key distribution packet is used by the second transmission apparatus to decrypt content from the first transmission apparatus, the third key distribution packet includes the sixth content key, and the fourth key distribution packet includes the seventh content key.

When the first transmission apparatus is an audio-video processor device, the source device performs identity authentication on and negotiate a key with the sink device and the audio-video processor device that performs transformation processing, generates, for the audio-video processor device, the key distribution packet used to decrypt the audio-video stream sent by the source device and the key distribution packet used to encrypt the audio-video stream sent to the sink device, and generates, for the sink device, the key distribution packet used to decrypt the audio-video stream sent by the audio-video processor device. Therefore, another device on the transmission path cannot know the key and cannot decrypt the audio-video stream, so that the transmission security of the audio-video stream is improved.

When the first transmission apparatus is a sink device and supports back-transmission, the source device performs identity authentication on and negotiate a key with the sink device and an upstream receiving device to which the audio-video stream is to be back-transmitted, and does not need to perform authentication on or negotiate a key with another device that does not need to output the audio-video stream or perform transformation processing. During audio-video stream transmission, a key distribution packet used to decrypt an encrypted audio-video stream and a key distribution packet used to encrypt audio-video stream to be back-transmitted are generated for the sink device, and a key distribution packet used to encrypt the audio-video stream to be back-transmitted is generated for the receiving device for decryption. Therefore, a device that does not need to be output on the transmission path and a device that performs transformation processing cannot know the key and cannot decrypt the audio-video stream. Therefore, after receiving the encrypted audio-video stream, the sink device may output the audio-video stream, and may further perform transformation processing on the audio-video stream that needs to be sent to an upstream receiving device. Not only the back-transmission scenario is supported, but also the transmission security and transmission performance of the audio-video stream are improved.

In a possible design, the third key distribution packet further includes a device identifier of the first transmission apparatus, which indicates that a device that uses the third key distribution packet is the first transmission apparatus; and the fourth key distribution packet further includes a device identifier of the second transmission apparatus, which indicates that a device that uses the fourth key distribution packet is the second transmission apparatus.

In a possible design, the third key distribution packet further includes a first stream identifier, which indicates that an audio-video stream on which the third key distribution packet acts is transmitted between the source device and the first transmission apparatus; and the fourth key distribution packet further includes a second stream identifier, which indicates that an audio-video stream on which the fourth key distribution packet acts is transmitted between the first transmission apparatus and the second transmission apparatus.

In a possible design, the sink device corresponding to the source device further includes a downstream second transmission apparatus, the source device is connected to both the first transmission apparatus and the second transmission apparatus through a repeater, and the method further includes: performing identity authentication on a downstream second transmission apparatus, and negotiating a fourth encryption key with the second transmission apparatus; and encrypting the first content key by using the fourth encryption key to obtain an eighth content key, where the first content key is further used to encrypt or decrypt content transmitted between the source device and the second transmission apparatus, where the second audio-video stream includes a fifth key distribution packet used by a second transmission apparatus, and the fifth key distribution packet includes the eighth content key; and the sending the second audio-video stream to the first transmission apparatus includes: sending the second audio-video stream to both the first transmission apparatus and the second transmission apparatus through the repeater.

According to the foregoing solution, the source device performs identity authentication on and negotiates a key with the sink device, and does not need to perform authentication on or negotiate a key with another device that does not need to output the audio-video stream or perform transformation processing, for example, does not need to perform identity authentication or negotiate a key with a repeater device. During audio-video stream transmission, a key distribution packet used to decrypt the encrypted audio-video stream only needs to be generated for the sink device. Therefore, the repeater device on the transmission path cannot know the key and cannot decrypt the audio-video stream, and only needs to perform relaying and forwarding after receiving the encrypted audio-video stream. This improves transmission security of the audio-video stream.

In a possible design, the fifth key distribution packet further includes a device identifier of the second transmission apparatus, which indicates that a device that uses the fifth key distribution packet is the second transmission apparatus.

In a possible design, the fifth key distribution packet further includes a third stream identifier, which indicates that an audio-video stream on which the fifth key distribution packet acts is transmitted between the source device and the second transmission apparatus.

In a possible design, the method further includes: receiving authorization control information from a content authorization system; and verifying that the first transmission apparatus and the second transmission apparatus meet a requirement of the authorization control information. According to the foregoing solution, the source device performs authorization control on an apparatus that needs to receive or transform data. For example, when a channel is switched in a live broadcast scenario, compared with cascaded authorization control, this reduces a delay and improves transmission performance.

In a possible design, the authorization control information includes one or more of a protocol version, a security level, a maximum quantity of devices, or a maximum quantity of layers; and the verifying that the first transmission apparatus and the second transmission apparatus meet a requirement of the authorization control information includes: verifying that the first transmission apparatus and the second transmission apparatus support a protocol version indicated in the authorization control information; and verifying that security levels of the first transmission apparatus and the second transmission apparatus are higher than or equal to a security level indicated in the authorization control information; verifying that a quantity of transmission apparatuses including the first transmission apparatus and the second transmission apparatus is less than or equal to the maximum quantity of devices; or verifying that a quantity of audio-video processor devices that the audio-video data passes through to reach the sink device corresponding to the source device is less than the maximum quantity of layers.

In a possible design, the performing identity authentication on the first transmission apparatus includes: performing identity authentication on the first transmission apparatus through an auxiliary link to the first transmission apparatus; and the performing identity authentication on the second transmission apparatus includes: performing identity authentication on the second transmission apparatus through an auxiliary link to the second transmission apparatus.

According to a second aspect, an embodiment of this application provides a data transmission method, applied to a daisy chain device, including: negotiating a first encryption key with a source device; receiving a second audio-video stream from the source device, where the second audio-video stream includes a first key distribution packet, the first key distribution packet is used by the first transmission apparatus to decrypt content from the source device, and the first key distribution packet includes a second content key; decrypting the second content key by using the first encryption key to obtain a first content key; decrypting the second audio-video stream by using the first content key to obtain a first audio-video stream; parsing the first audio-video stream to obtain audio-video data, and outputting the audio-video data; receiving a third audio-video stream from the source device, where the third audio-video stream includes a second key distribution packet, and the second key distribution packet is used by a second transmission apparatus to decrypt the content from the source device; and forwarding the third audio-video stream to the second transmission apparatus.

According to the foregoing solution, the source device performs identity authentication on and negotiate a key with the daisy chain device and the sink device, and does not need to perform authentication on or negotiate a key with another device that does not need to output the audio-video stream or perform transformation processing. During audio-video stream transmission, only a key distribution packet used to decrypt an encrypted audio-video stream needs to be generated for the sink device (and the daisy chain device). Therefore, a device that is on a transmission path and that does not need to output the audio-video stream or perform transformation processing on the audio-video stream cannot know the key and cannot decrypt the audio-video stream. Therefore, after receiving the encrypted audio-video stream, the daisy chain device only forwards the audio-video stream that do not need to be output. This improves transmission security and transmission performance of audio-video streams.

In a possible design, the first key distribution packet further includes a first count value; and the decrypting the second content key by using the first encryption key to obtain a first content key includes: decrypting the second content key by using the first encryption key and the first count value to obtain the first content key.

In a possible design, the first key distribution packet further includes a device identifier of the first transmission apparatus, which indicates that a device that uses the first key distribution packet is the first transmission apparatus.

In a possible design, the first key distribution packet further includes a first stream identifier, which indicates that an object to which the first key distribution packet is applied is content transmitted between the source device and the first transmission apparatus.

In a possible design, the source device and the first transmission apparatus are connected through an audio-video transmission interface.

In a possible design, the second key distribution packet includes a device identifier of the second transmission apparatus.

According to a third aspect, an embodiment of this application further provides a data transmission method, applied to a first transmission apparatus (for example, the first transmission apparatus is an audio-video processor device), including: negotiating a first encryption key with a source device; receiving a second audio-video stream from the source device, where the second audio-video stream includes a first key distribution packet, a second key distribution packet, and a third key distribution packet, the first key distribution packet is used by the first transmission apparatus to decrypt content from the source device, the second key distribution packet is used by the first transmission apparatus to encrypt content to be transmitted to a second transmission apparatus, the third key distribution packet is used by the second transmission apparatus to decrypt content from the first transmission apparatus, the first key distribution packet includes a second content key, and the second key distribution packet includes a fourth content key; decrypting, by using the first encryption key, the second content key to obtain a first content key; decrypting the second audio-video stream by using the first content key to obtain a first audio-video stream;

decrypting, by using the first encryption key, a fourth content key to obtain a third content key; performing video transformation processing on the first audio-video stream to obtain a third audio-video stream; encrypting the third audio-video stream by using the third content key to obtain a fourth audio-video stream; and adding the third key distribution packet to the fourth audio-video stream, and sending the fourth audio-video stream to the second transmission apparatus.

According to the foregoing solution, the source device performs identity authentication on and negotiates a key with the sink device, and does not need to perform authentication on or negotiate a key with another device that does not need to output the audio-video stream or perform transformation processing, for example, does not need to perform identity authentication or negotiate a key with a repeater device. During audio-video stream transmission, a key distribution packet used to decrypt the encrypted audio-video stream only needs to be generated for the sink device. Therefore, the repeater device on the transmission path cannot know the key and cannot decrypt the audio-video stream, and only needs to perform relaying and forwarding after receiving the encrypted audio-video stream. This improves transmission security of the audio-video stream.

According to a fourth aspect, an embodiment of this application further provides a data transmission method, applied to a first transmission apparatus, where the first transmission apparatus is a sink device corresponding to the source device; and the second transmission apparatus is a transmission apparatus upstream of the first transmission apparatus, and is configured to receive audio-video data that is from the source device and that is back-transmitted by the first transmission apparatus. The method includes: negotiating a first encryption key with a source device; receiving a second audio-video stream from the source device, where the second audio-video stream includes a first key distribution packet, a second key distribution packet, and a third key distribution packet, where the first key distribution packet is used by the first transmission apparatus to decrypt content from the source device, the second key distribution packet is used by the first transmission apparatus to encrypt content to be transmitted to the second transmission apparatus, the third key distribution packet is used by the second transmission apparatus to decrypt content from the first transmission apparatus, the first key distribution packet includes a second content key, and the second key distribution packet includes a fourth content key; decrypting the second content key by using the first encryption key to obtain a first content key; decrypting the second audio-video stream by using the first content key to obtain a first audio-video stream, parsing the first audio-video stream to obtain first audio-video data, and outputting the first audio-video stream; processing the first audio-video data to obtain second audio-video data, and encapsulating the second audio-video data into an audio-video packet that belongs to a third audio-video stream; and decrypting the fourth content key by using the first encryption key to obtain a third content key; processing the third audio-video stream to obtain a fourth audio-video stream, where the processing includes encrypting an audio-video packet of the third audio-video stream by using the third content key, where the fourth audio-video stream includes an encrypted audio-video packet that belongs to the third audio-video and the third key distribution packet; and sending the fourth audio-video stream to the second transmission apparatus.

According to the foregoing solution, the source device performs identity authentication on and negotiate a key with the sink device and an upstream receiving device to which the audio-video stream is to be back-transmitted, and does not need to perform authentication on or negotiate a key with another device that does not need to output the audio-video stream or perform transformation processing. During audio-video stream transmission, a key distribution packet used to decrypt an encrypted audio-video stream and a key distribution packet used to encrypt audio-video stream to be back-transmitted are generated for the sink device, and a key distribution packet used to encrypt the audio-video stream to be back-transmitted is generated for the receiving device for decryption. Therefore, a device that does not need to be output on the transmission path and a device that performs transformation processing cannot know the key and cannot decrypt the audio-video stream. Therefore, after receiving the encrypted audio-video stream, the sink device may output the audio-video stream, and may further perform transformation processing on the audio-video stream that needs to be sent to an upstream receiving device. Not only the back-transmission scenario is supported, but also the transmission security and transmission performance of the audio-video stream are improved.

According to a fifth aspect, a source device is provided, including a first audio-video transmission adapter and a transmitter, where the transmitter is configured to: perform identity authentication on a downstream first transmission apparatus, and negotiate a first encryption key with the first transmission apparatus; and generate a first content key, and encrypt the first content key by using the first encryption key to obtain a second content key, where the first content key is used to encrypt or decrypt content transmitted between the source device and the first transmission apparatus;

the first audio-video transmission adapter is configured to: obtain first audio-video data, encapsulate the first audio-video data into an audio-video packet that belongs to a first audio-video stream, and send the first audio-video stream to the transmitter;

the transmitter is further configured to process the first audio-video stream to obtain a second audio-video stream, where the processing includes encrypting the audio-video packet by using the first content key; and the second audio-video stream includes a first key distribution packet and the encrypted audio-video packet, the first key distribution packet is used by the first transmission apparatus to decrypt content from the source device, and the first key distribution packet includes the second content key; and the transmitter is further configured to send the second audio-video stream to the first transmission apparatus through a port.

In a possible design, the transmitter includes an authentication module and a first encryption module, where the authentication module is configured to perform identity authentication on a downstream first transmission apparatus, and negotiate a first encryption key with the first transmission apparatus; and the first encryption module is configured to: generate a first content key, and encrypt the first content key by using the first encryption key to obtain a second content key; and process the first audio-video stream to obtain a second audio-video stream.

In a possible design, the first encryption module is specifically configured to:

encrypt the first audio-video stream by using the first content key and a first count value, and add the first key distribution packet to the encrypted first audio-video stream to obtain the second audio-video stream, where the first key distribution packet further includes the first count value.

In a possible design, the apparatus further includes:

a multiplexer, configured to combine the second audio-video stream and another to-be-sent audio-video stream into one audio-video stream.

In a possible design, the first key distribution packet further includes a device identifier of the first transmission apparatus, which indicates that a device that uses the first key distribution packet is the first transmission apparatus.

In a possible design, the first key distribution packet further includes a first stream identifier, which indicates that an audio stream to which the first key distribution packet is applied is transmitted between the source device and the first transmission apparatus.

In a possible design, the first key distribution packet is located in a vertical blanking area of the second audio-video stream.

In a possible design, the downstream first transmission apparatus is a sink device.

In a possible design, the source device is connected to the first transmission apparatus through a daisy chain device, and the authentication module is further configured to:

before sending the second audio-video stream to the first transmission apparatus, perform identity authentication on the daisy chain device, and negotiate a second encryption key with the daisy chain device;

the apparatus further includes: a second audio-video transmission adapter, configured to: obtain second audio-video data, and encapsulate the second audio-video data into an audio-video packet that belongs to a third audio-video stream; and a second encryption module, configured to: generate a third content key, and encrypt the third content key by using the second encryption key to obtain a fourth content key, where the third content key is used to encrypt or decrypt content transmitted between the source device and the daisy chain device; and process the third audio-video stream to obtain a fourth audio-video stream, where the processing includes encrypting the audio-video packet by using the third content key, where the fourth audio-video stream includes a second key distribution packet, the second key distribution packet is used by the daisy chain device to decrypt the content from the source device, and the second key distribution packet includes the fourth content key; and the apparatus further includes:

a multiplexer, configured to multiplex the second audio-video stream and the fourth audio-video stream into one audio-video stream, and send the one audio-video stream to the daisy chain device through the port.

In a possible design, the downstream of the source device further includes a second transmission apparatus, the second transmission apparatus is a sink device corresponding to the source device, and the first transmission apparatus is an audio-video processor device on a transmission path between the source device and the second transmission apparatus;

the authentication module is further configured to perform identity authentication on the second transmission apparatus, and negotiate a third encryption key with the second transmission apparatus; and the first encryption module is further configured to generate a fifth content key, encrypt the fifth content key by using the first encryption key to obtain a sixth content key, and encrypt the fifth content key by using the third encryption key to obtain a seventh content key, where the fifth content key is used to encrypt or decrypt content transmitted between the first transmission apparatus and the second transmission apparatus, where the second audio-video stream further includes a third key distribution packet and a fourth key distribution packet, the third key distribution packet is used by the first transmission apparatus to encrypt content to be transmitted to the second transmission apparatus, the fourth key distribution packet is used by the second transmission apparatus to decrypt content from the first transmission apparatus, the third key distribution packet includes the sixth content key, and the fourth key distribution packet includes the seventh content key.

In a possible design, the third key distribution packet further includes a device identifier of the first transmission apparatus, which indicates that a device that uses the third key distribution packet is the first transmission apparatus; and the fourth key distribution packet further includes a device identifier of the second transmission apparatus, which indicates that a device that uses the fourth key distribution packet is the second transmission apparatus.

In a possible design, the third key distribution packet further includes a first stream identifier, which indicates that an object on which the third key distribution packet acts is the content transmitted between the source device and the first transmission apparatus; and the fourth key distribution packet further includes a second stream identifier, which indicates that an object on which the fourth key distribution packet acts is the content transmitted between the first transmission apparatus and the second transmission apparatus.

In a possible design, the sink device corresponding to the source device further includes a downstream second transmission apparatus, the source device is connected to both the first transmission apparatus and the second transmission apparatus through a repeater;

the authentication module is further configured to perform identity authentication on a downstream second transmission apparatus, and negotiate a fourth encryption key with the second transmission apparatus;

the first encryption module is used to encrypt the first content key by using the fourth encryption key to obtain an eighth content key, where the first content key is further used to encrypt or decrypt content transmitted between the source device and the second transmission apparatus, where the second audio-video stream includes a fifth key distribution packet used by a second transmission apparatus, and the fifth key distribution packet includes the eighth content key; and the apparatus further includes:

a port, configured to send the second audio-video stream to both the first transmission apparatus and the second transmission apparatus through the repeater.

In a possible design, the fifth key distribution packet further includes a device identifier of the second transmission apparatus, which indicates that a device that uses the fifth key distribution packet is the second transmission apparatus.

In a possible design, the fifth key distribution packet further includes a third stream identifier, which indicates that an object on which the fifth key distribution packet acts is the content transmitted between the source device and the second transmission apparatus.

In a possible design, the transmitter further includes:
an authorization module, configured to receive authorization control information from a content authorization system, where the authorization control information is used to control a transmission apparatus that receives audio-video data sent by the source device; and verify that the transmission apparatus that receives the audio-video data sent by the source device meets a requirement of the authorization control information.

In a possible design, the authorization control information includes one or more of a protocol version, a security level, a maximum quantity of devices, or a maximum quantity of layers;
the verifying that the first transmission apparatus and the second transmission apparatus meet a requirement of grant control information includes:
verifying that the first transmission apparatus and the second transmission apparatus support a protocol version indicated in the authorization control information;
verifying that security levels of the first transmission apparatus and the second transmission apparatus are higher than or equal to a security level indicated in the authorization control information;
verifying that a quantity of transmission apparatuses including the first transmission apparatus and the second transmission apparatus is less than or equal to the maximum quantity of devices; or
verifying that the quantity of audio-video processor devices that the audio-video data passes through to reach the sink device corresponding to the source device is less than the maximum quantity of layers.

According to a sixth aspect, a first transmission apparatus is provided, including:
a receiver, configured to negotiate a first encryption key with a source device;
an audio-video receiving adapter, configured to receive a second audio-video stream from the source device, where the second audio-video stream includes a first key distribution packet, the first key distribution packet is used by the first transmission apparatus to decrypt content from the source device, and the first key distribution packet includes a second content key, where
the receiver is further configured to: decrypt the second content key by using the first encryption key to obtain a first content key; decrypt the second audio-video stream by using the first content key to obtain a first audio-video stream; parse the first audio-video stream to obtain audio-video data, and output the audio-video data through a port; and
a switch, configured to: receive a third audio-video stream from the source device through a receive port, where the third audio-video stream includes a second key distribution packet, and the second key distribution packet is used by the second transmission apparatus to decrypt the content from the source device; and forward the third audio-video stream to the second transmission apparatus through a transmit port.

In a possible design, the receiver includes an authentication module and a first encryption module, where
the authentication module is configured to negotiate the first encryption key with the source device, generate a first content key, and encrypt the first content key by using the first encryption key to obtain a second content key; and
the first encryption module is configured to process the first audio-video stream to obtain a second audio-video stream.

In a possible design, the first key distribution packet further includes a first count value; and
the receiver is specifically configured to decrypt the second content key by using the first encryption key and the first count value to obtain the first content key.

In a possible design, the first key distribution packet further includes a device identifier of the first transmission apparatus, which indicates that a device that uses the first key distribution packet is the first transmission apparatus.

In a possible design, the first key distribution packet further includes a first stream identifier, which indicates that an audio stream to which the first key distribution packet is applied is transmitted between the source device and the first transmission apparatus.

In a possible design, the second key distribution packet includes a device identifier of the second transmission apparatus.

According to a seventh aspect, a first transmission apparatus is provided, including:
a receiver, configured to negotiate a first encryption key with a source device;
the receiver is further configured to receive a second audio-video stream from the source device through a receive port, where the second audio-video stream includes a first key distribution packet, a second key distribution packet, and a third key distribution packet;
the first key distribution packet is used by the first transmission apparatus to decrypt content from the source device, the second key distribution packet is used by the first transmission apparatus to encrypt content to be transmitted to a second transmission apparatus, the third key distribution packet is used by the second transmission apparatus to decrypt content from the first transmission apparatus, the first key distribution packet includes the second content key, and the second key distribution packet includes the fourth content key; and
the receiver is further configured to decrypt the second content key by using the first encryption key to obtain a first content key; decrypt the second audio-video stream by using the first content key to obtain a first audio-video stream; and decrypt the fourth content key by using the first encryption key to obtain a third content key; and
an audio-video processor, configured to perform video transformation processing on the first audio-video stream to obtain a third audio-video stream, where
the receiver is further configured to: encrypt the third audio-video stream by using the third content key to obtain a fourth audio-video stream; add the third key distribution packet to the fourth audio-video stream, and send the fourth audio-video stream to the second transmission apparatus through a transmit port.

In a possible design, the receiver includes: an authentication module, configured to negotiate a first encryption key with the source device; a decryption module, configured to decrypt the second content key by using the first encryption key to obtain a first content key, and decrypt the second audio-video stream by using the first content key to obtain a first audio-video stream; and an encryption module, configured to decrypt the fourth content key by using the first encryption key to obtain a third content key, encrypt the third audio-video stream by using the third content key to obtain a fourth audio-video stream, and add the third key distribution packet to the fourth audio-video stream.

In a possible design, the decryption module may decrypt the second audio-video stream by using the first content key and a first count value included in the first key distribution packet to obtain the first audio-video stream; and the encryption module may encrypt the third audio-video stream by using the third content key and a second count value in the second key distribution packet to obtain the fourth audio-video stream.

According to an eighth aspect, an embodiment of this application provides a first transmission apparatus, including:
- a receiver, configured to negotiate a first encryption key with a source device;
- the receiver is further configured to receive a second audio-video stream from the source device through a receive port, where the second audio-video stream includes a first key distribution packet, a second key distribution packet, and a third key distribution packet;
- the first key distribution packet is used by the first transmission apparatus to decrypt content from the source device, the second key distribution packet is used by the first transmission apparatus to encrypt content to be transmitted to a second transmission apparatus, the third key distribution packet is used by the second transmission apparatus to decrypt content from the first transmission apparatus, the first key distribution packet includes the second content key, and the second key distribution packet includes the fourth content key; and
- the receiver is further configured to decrypt the second content key by using the first encryption key to obtain a first content key, and decrypt the second audio-video stream by using the first content key to obtain a first audio-video stream; and
- an audio-video transmission adapter, configured to parse the first audio-video stream to obtain first audio-video data, and output the first audio-video data, where
- the receiver is further configured to process the first audio-video data to obtain second audio-video data; and
- an audio-video receiving adapter, configured to encapsulate the second audio-video data into an audio-video packet that belongs to a third audio-video stream, where
- the receiver is further configured to: decrypt the fourth content key by using the first encryption key to obtain a third content key; process the third audio-video stream to obtain a fourth audio-video stream, where the processing includes encrypting an audio-video packet of the third audio-video stream by using the third content key, and the fourth audio-video stream includes an encrypted audio-video packet that belongs to the third audio-video and the third key distribution packet; and send the fourth audio-video stream to the second transmission apparatus through a transmit port.

According to a ninth aspect, an embodiment of this application provides a data transmission apparatus, and the data transmission apparatus may be a chip. The data transmission apparatus may include a processor. The processor invokes software instructions stored in a memory to implement the function in the method embodiment according to any one of the first aspect, the second aspect, the third aspect, or the fourth aspect, or the possible designs of the method embodiment. The memory may be a memory deployed in the data transmission apparatus, or may be a memory deployed outside the data transmission apparatus.

According to a tenth aspect, an embodiment of this application provides a computer program product, including a computer program. When the computer program is executed on a computer or a processor, the computer or the processor is enabled to implement the function in the method embodiment according to any one of the first aspect, the second aspect, the third aspect, or the fourth aspect, or the possible designs of the method embodiment.

According to an eleventh aspect, an embodiment of this application provides a computer-readable storage medium, configured to store a program and instructions. When the program and the instructions are invoked and executed in a computer, the computer may be enabled to perform the function in the method embodiment according to any one of the first aspect, the second aspect, the third aspect, or the fourth aspect, or the possible designs of the method embodiment.

According to a twelfth aspect, an embodiment of this application provides a chip system. The chip system includes a processor, may further include a memory, and is configured to implement functions in the foregoing method. The chip system may include a chip, or may include a chip and another discrete device.

BRIEF DESCRIPTION OF DRAWINGS

FIG. 7A and FIG. 7B are a schematic flowchart of a method in a fifth possible scenario according to an embodiment of this application;

FIG. 13B-1 to FIG. 13B-3 are a schematic flowchart of a second possible scenario according to an embodiment of this application;

FIG. 13C-1 to FIG. 13C-3 are a schematic flowchart of a third possible scenario according to an embodiment of this application;

FIG. 13D-1 to FIG. 13D-3 are a schematic flowchart of a fourth possible scenario according to an embodiment of this application;

DESCRIPTION OF EMBODIMENTS

Figure 1:
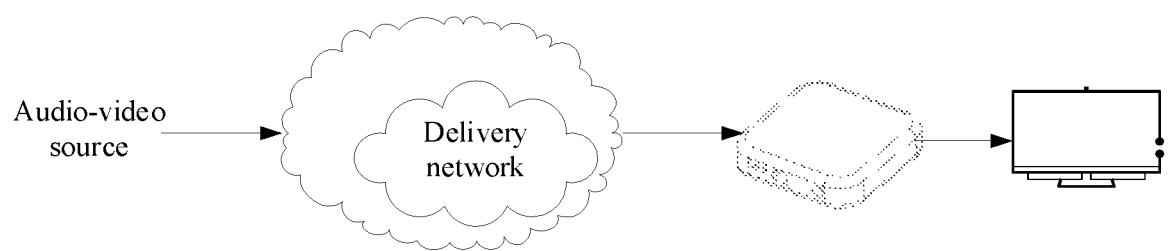
FIG. 1 is a schematic diagram of a structure of a communication system according to an embodiment of this application.

Before technical solutions provided in this application are described, technical terms involved in embodiments of this application are first explained.

(1) A transmitter (Transmitter) is a start point for transmitting an audio-video data stream and a control end for authentication and authorization. The transmitter can perform identity authentication on and negotiate a key with a receiver and supports authorization control for the receiver, and can encrypt generated audio-video data and send the encrypted data to the receiver. Audio-video data may also be referred to as audio-video data. An audio-video data stream may also be referred to as an audio-video stream, or referred to as an audio-video stream, or referred to as a multimedia data stream.

(2) A receiver (Receiver) is an end point for transmitting an audio-video stream. The receiver can perform identity authentication on and negotiate a key with a transmitter, and can decrypt audio-video data and output the audio-video data.

(3) A transformer (Transformer) is an apparatus for processing an audio-video stream. The transformer can decrypt an audio-video stream sent by an upstream device, encrypt a new audio-video stream after transforming the audio-video stream, and send the audio-video stream to a downstream device.

(4) A sender (Sender) can transmit an audio-video stream. Both the transmitter and the transformer can serve as the sender.

(5) A receiver end (Receiver End) is a device that receives an audio-video stream. An apparatus (or a device) having a receiver or a transformer may serve as a receiver end.

(6) A source device (Source Device) is a device that inputs an audio-video stream and a start point for transmitting an audio-video stream. Generally, a transmitter may be deployed in the source device. The source device may be an apparatus deployed in a source device, or may be implemented by a function of the source device.

(7) A sink device (Sink Device) is a device that outputs an audio-video stream and an end point for transmitting an audio-video stream.

(8) A repeater device (Repeater Device) can split one channel of audio-video stream into a plurality of channels of the same audio-video stream and forward the plurality of channels of the audio-video stream to a plurality of downstream receiver ends. The repeater device may also be referred to as a repeater.

(9) A daisy chain device (Daisy Chain Device) can receive and output an audio-video stream and forward other audio-video streams to a downstream receiver end. For example, a receiver and a transformer may be deployed in the daisy chain device.

(10) A router device (Router Device) can send an audio stream to an audio-video transmission apparatus of the downstream receiver end according to a routing requirement. A router device generally does not have an encryption or decryption function.

(11) An audio-video processor device (Video Audio Processor Device) is configured to perform transformation processing on an audio-video stream, for example, perform format conversion on the audio-video stream, and send the transformed audio-video stream to a downstream receiver end. The audio-video processor device includes a transformer, and a transformer certificate may be built in the audio-video processor device.

(12) A key distribution packet is a packet that is encapsulated by a device that needs to receive audio-video data or transform audio-video data and that is used to encrypt and decrypt audio-video data. For example, the key distribution packet includes an encrypted content key, and the encrypted content key may be obtained by encrypting a content key generated by the source device by using an encryption key negotiated by both devices. For another example, the key distribution packet may further include a stream identifier, which is used to identify an audio-video stream transmitted between two devices. The key distribution packet may further a device identifier used to identify a device that uses the key distribution packet.

(13) In this application, an "uplink audio-video stream" refers to an audio-video stream sent by the source device to the sink device, and a "downlink audio-video stream" refers to an audio-video stream back-transmitted by the sink device to an upstream transmission device.

This application mainly provides a solution for content protection between digital media transmission apparatuses. Currently, a feasible content protection scheme is to use a high-bandwidth digital content protection (high-bandwidth digital content protection, HDCP) technology. When the HDCP technology is used, the transmission device performs stream multiplexing without encoding, then performs stream multiplexing and load multiplexing to multiplex a plurality of channels of audio-video streams into one channel of audio-video stream, and then encrypts the one channel of stream. Consequently, data that needs to be encrypted and data that does not need to be encrypted are encrypted, and transmission performance of the transmission interface is reduced. In addition, when another forwarding device needs to be used, an upstream transmission device needs to perform identity authentication on a downstream transmission device, that is, a plurality of transmission devices need to perform identity authentication and authorization control in a cascading manner. Therefore, when a channel is switched in a live broadcast scenario, content authorization information needs to be delivered in a cascading manner each time, which takes a relatively long time and affects transmission performance. In addition, the intermediate device decrypts the audio-video stream without outputting the audio-video stream, which brings a great security risk.

Embodiments of this application provide a data transmission solution. A transmission device that does not need to output data or that does not involve video transformation processing does not need to participate in authentication, authorization, and decryption, so that a transmission device that does not need to output data or that does not involve video transformation processing does not need to decrypt data, thereby improving security and transmission performance.

FIG. 1 is a schematic diagram of a possible structure of a communication system according to an embodiment of this application. The communication system includes at least a source device and a sink device. This application may be applied to a home network scenario.

A signal from a signal source of a home network is input to the source device, and then output to the sink device. The source device may be connected to the sink device directly or through one or more audio-video devices. An audio-video transmission apparatus may include an audio-video processor device, a daisy chain device, a repeater device, a router device, or the like.

The connection herein may be a wired connection, or may be a wireless connection. This is not specifically limited in this application. For example, refer to FIG. 1. A signal source may be generated by an audio-video service platform, and is input to the source device through a distribution network. Alternatively, a signal source may be generated by the source device. For example, the source device may be a set-top box, a split docking (DOCK) station, or a terminal device. The sink device may include a television, a projector, a smart screen, an electronic device having a display function (for example, a sound box or terminal device that has a display), or an electronic device having an audio playback function, for example, a sound box.

The smart screen may be a home multimedia entertainment center, an information sharing center, a control management center, or a multi-device interaction center. The above terminal device may also be referred to as user equipment, an access terminal, a user unit, a user station, a mobile station, a mobile console, a remote station, a remote terminal, a mobile device, a user terminal, a terminal, a wireless communications device, a user proxy, or a user apparatus. The terminal device may be a cellular phone, a cordless phone, a personal digital assistant (personal digital assistant, PDA), a handheld device having a wireless communication function, a computing device, another processing device connected to a wireless adjustment demodulator, a wearable device, or the like.

It should be understood that an electronic device may have one or more of a function of a source device, a function of a sink device, and a function of an audio-video processor device. For example, an electronic device may have only a function of a source device and be used as a source device. For example, the electronic device includes a transmitter. Alternatively, an electronic device has only a function of a sink device and is used as a sink device. For example, the electronic device includes a receiver, and a receiver certificate is built in the electronic device. Alternatively, an electronic device has functions of both a source device and a sink device, and may be used as both a source device and a sink device. The electronic device includes a receiver and a transmitter, and a receiver certificate is built in the electronic device.

Figure 2A:
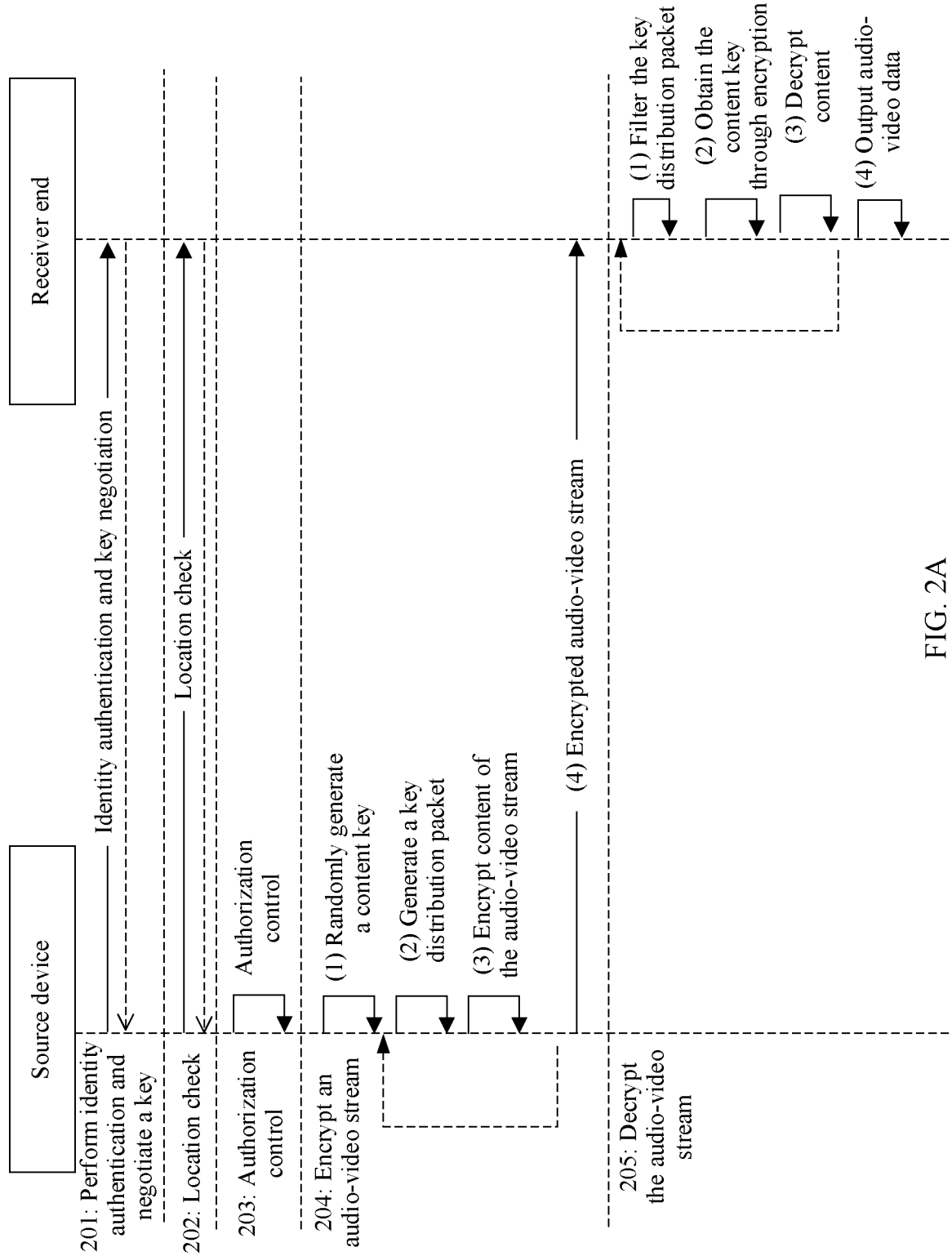
FIG. 2A is a schematic flowchart of a data transmission method according to an embodiment of this application.

The following describes a data transmission method according to an embodiment of this application with reference to FIG. 2A.

201: A source device performs identity authentication and negotiates a key. For example, the source device performs identity authentication on and negotiates a key with a sink device corresponding to the source device. When there are a plurality of sink devices, the source device performs identity authentication on all the sink devices. When a transmission path between the source device and the sink device further includes another transmission apparatus, the source device also needs to perform identity authentication on and negotiate a key with the another transmission apparatus. For example, the another transmission apparatus may include an audio-video processor device and/or a daisy chain device.

The source device initiates identity authentication and key negotiation to the sink device and the another transmission apparatus. In FIG. 2A, an example in which identity authentication and key negotiation are performed between the source device and the sink device is used. The source device and the sink device perform information interaction, negotiate a supported protocol version, verify a certificate chain (or referred to as a trust chain) of a receiver included in the sink device, and negotiate a content key encryption key (content key encryption key, CKEK) and a location check key (IcMacKey). The sink device has a built-in receiver certificate. The receiver certificate may include one or more of a device identifier (DeviceId), a security level, or a device type (or referred to as a certificate type). The device type (certificate type) includes a transformer, a receiver, and a receiving transformer. The receiving transformer has functions of both a receiver and a transformer.

It should be understood that the source device generally includes a transmitter. The sink device generally includes a receiver, and may include a receiver certificate. The daisy chain device generally includes a receiver, and may include a receiver certificate. The audio-video processor device generally includes a transformer, and may include a transformer certificate. It may be understood that, when the source device performs identity authentication on or negotiates a key with the sink device or another transmission apparatus, the transmitter performs identity authentication on all receivers, transformers, or receiving transformers of current audio-video data, and negotiates the key with all receivers, transformers, or receiving transformers.

For example, the content key encryption key may also be referred to as an encryption key, or may have another name. This is not specifically limited in this embodiment of this application.

In some embodiments, the source device may perform identity authentication on and negotiate a key with the sink device or the another transmission apparatus through an auxiliary link (or described as a control link). The auxiliary link supports routing and forwarding between devices. It may be understood that an audio-video stream is transmitted between the source device and the sink device through a primary link, and the primary link supports routing and forwarding. Control information is transmitted between the source device and the sink device through an auxiliary link, and the auxiliary link supports routing and forwarding.

202: After the source device successfully authenticates the sink device, the source device may perform a location check on the sink device. The performing a location check on the sink device may be determining that a distance between the sink device and the source device is within a specified range.

203: The source device performs authorization control. For example, the source device performs authorization control on the sink device. When there are a plurality of sink devices, the source device executes authorization control on all the sink devices. When a transmission path between the source device and the sink device further includes another transmission apparatus, the source device also needs to perform authorization control on the another transmission apparatus. For example, the another transmission apparatus may include an audio-video processor device and a daisy chain device.

(1) The source device receives authorization control information that is of current audio-video data and that is sent by a content authorization system. For example, the authorization control information that is of the current audio-video data stream that is sent by the content authorization system is received through an authorization interface.

For example, the authorization control information includes one or more of a protocol version, a security level, a maximum quantity of devices, and a maximum level.

In an example, the authorization control information may be defined by using the following message format, as shown in Table 1.

TABLE 1

| Field | Length (bytes) | Description |
|---|---|---|
| Version | 1 | Version of the authorization control information. For example, a current version is 0x01. |
| VersionRequired | 1 | Required protocol version |
| SecurityLevel | 1 | Security level. Content can be used only on devices with the same or a higher security level. |
| MaxDepth | 1 | Maximum cascading depth. For example, when the maximum cascading depth is not limited, the value may be 0. |
| MaxCount | 1 | Maximum number of connected devices. For example, when the maximum quantity of supported connected devices is not limited, the value may be 0. |

(2) The source device verifies whether the sink device (and another transmission apparatus) meets a requirement of the authorization control information.

For example, the verifying whether the sink device (and another transmission apparatus) meets a requirement of the authorization control information may include one or more of the following:

(1) Verify whether the sink device (and another transmission apparatus) supports a protocol version indicated in the authorization control information. For example, when it is verified that the sink device does not support the protocol version indicated in the authorization control information, the current audio-video data may not be sent to the sink device. For example, the source device verifies whether a protocol version negotiated with the receiver end in an identity authentication process is the same as VersionRequired in the authorization control information.

(2) Verify whether a security level of the sink device (and another transmission apparatus) is higher than or equal to a security level indicated in the authorization control information. For example, it is compared whether the security level of the receiver end is higher than or equal to SecurityLevel in the authorization control information. For example, when it is verified that the security level of the sink device is lower than the security level indicated in the authorization control information, the current audio-video data may not be sent to the sink device. A security level defines a level of a security capability.

For example, refer to Table 2. A definition of a security level is described as an example.

TABLE 2

| Secure level | Secure storage | Implementation of cryptographic algorithm | Audio-video stream encryption protection |
|---|---|---|---|
| 1 | Implemented by using only software | Implemented by using only software | Implemented by using only software |
| 2 | A root key for hardware protection is encrypted or inserted into a chip. The secure storage cannot be modified or deleted. | Implementation by using TEE software or a hardware algorithm | Implementation by using TEE software or hardware |

TABLE 2-continued

| Secure level | Secure storage | Implementation of cryptographic algorithm | Audio-video stream encryption protection |
|---|---|---|---|
| 3 | Same as those for level 2 | Implemented by using a hardware algorithm, and supporting defense against a side channel attack and a physical attack | Implemented by hardware, but cannot be read by software |

(3) The source device verifies whether a quantity of sink devices receiving the current audio-video data is less than or equal to the maximum quantity of devices.

The source device may determine a receiver end according to a routing path of current to-be-sent audio-video data, obtain a related receiver end certificate and a device identifier of the related receiver end certificate to count a quantity of devices, and compare the quantity with a limit of a maximum quantity of devices MaxCount required in the authorization control information, to implement quantity control.

(4) The source device verifies whether a quantity of audio-video processor devices through which the current audio-video data reaches the sink device is less than the maximum quantity of layers. The source device may determine a maximum level of the transformer and the receiver according to a routing path of the current to-be-sent audio-video data, to limit the quantity of layers by comparing the maximum level of the transformer and the maximum level of the receiver with the maximum cascading depth MaxDepth.

In some embodiments, the content authorization system determines that the authorization control information of the current audio-video data is updated, and sends the updated authorization control information to the transmitter of the source device. For example, the required protocol version is updated, the security level is updated, the maximum cascading depth is updated, or the maximum quantity of connected devices supported by each level of device is updated. When receiving the updated authorization control information, the source device re-performs authorization control on each receiver end that receives the current audio-video data. It is determined, for each receiver end, whether a requirement of the authorization control information is met. If the requirement is met, an update authorization procedure is performed; or if the requirement is not met, a de-authorization process is triggered.

For example, the update authorization procedure may include: the source device regenerates a content key used to encrypt audio-video data and a count value of a counter (Counter). The source device regenerates a key distribution packet, encrypts the packed audio-video packet by using the regenerated content key and the counter, and adds the regenerated key distribution packet.

For example, the authorization cancellation process may include: if one receiver end does not meet a requirement of the authorization control information, and there is only one receiver end of the current audio-video data, the source device may cancel sending of the current audio-video data. If one receiver end does not meet the requirement of the authorization control information, and there are a plurality of receiver ends of the current audio-video data, sending of a key distribution packet used to decrypt or encrypt the current audio-video data to the receiver end may be canceled, and sending of a key distribution packet used to decrypt or encrypt the current audio-video data to a downstream receiver end of the receiver end may be canceled.

In some other embodiments, if the receiver end corresponding to the source device does not change, but the audio-video data that needs to be sent changes, that is, a program watched by the user changes, the source device re-completes authorization control. In addition, a content key and a counter are regenerated for the updated audio-video data. The source device regenerates a key distribution packet, encrypts the packed audio-video packet by using the regenerated content key and the counter, and adds the regenerated key distribution packet.

204: The source device encrypts the audio-video data stream. An example in which the source device encrypts and transmits an audio-video data stream to the sink device is used.

(1) Generate a content key. The source device may randomly generate a content key (content key, CK). For example, the source device may randomly generate a count value of a counter (Counter). For example, the source device may randomly generate some count values of the counter, and the remaining count values may be initialized to 0. For example, if the counter is 128 bits (bits), the most significant 64 bits of the count value of the counter are randomly generated, and the least significant 64 bits are initialized to 0.

(2) The source device generates a key distribution packet (key distribution packet, KDP). The source device uses a content key encryption key CKEK to encrypt the content key CK to obtain an encrypted content key (encryption content key, ECK). The KDP is used by the sink device to decrypt the content from the source device. The key distribution packet includes the encrypted content key ECK. For example, the key distribution packet may further include a device identifier of the sink device, to indicate that a device that uses the key distribution packet is the sink device. For ease of subsequent description, the device identifier is represented by DeviceId. For example, the key distribution packet may further include a stream identifier of audio-video data, which indicates that an object on which the key distribution packet acts is content transmitted between the source device and the sink device. Different stream identifiers may correspond to different acted objects. For ease of subsequent description, the stream identifier may be represented by StreamId.

Optionally, the key distribution packet may further include a version (KDP version), some or all of the count values of the counter used to encrypt content, and the like. For example, the some or all of the count values are the most significant 64 bits of the counter used for encryption. The some or all of the count values of the counter may be used to encrypt content to be transmitted between the source device and the sink device.

In an example, Table 3 describes a possible format definition of the key distribution packet as an example.

TABLE 3

| Field | Length (bits) | Description |
| --- | --- | --- |
| Version | 8 | Version (currently set to 1) |
| StreamId | 16 | Audio-video data stream identifier |
| DeviceId | 48 | Unique ID of a device at a receiver end, which is in a binary format. |
| EncryptionMethod | 2 | Encryption method. For example, the value "0" indicates no encryption; the value "1" indicates that the odd content key OddCK is used for encryption; the value "2" indicates that the even content key EvenCK is used for encryption; and the value "3" indicates that the content key is not changed. |
| ContentEncryptionAlgorithm | 2 | Encryption algorithm. For example, 0 indicates SM4, and 1 indicates AES-128. |
| ContentEncryptionMode | 2 | Encryption mode. For example, 0 indicates a counter (counter, CTR) mode, and 1 indicates a Galois/Counter mode (Galois/Counter Mode, GCM). |
| Reserved | 2 | Reserved |
| ECKCounter | 128 | A counter used to encrypt CKs, including an even content key EvenCK and an odd content key OddCK. The two keys are encrypted by using consecutive counters. |
| EvenECK | 128 | An even content key EvenCK encrypted by using the content key encryption key CKEK When EncryptionMethod is set to 2 or 3, EvenECK is used as the ECK. |
| OddECK | 128 | An odd content key OddCK encrypted by using the content key encryption key CKEK When EncryptionMethod is set to 1, OddECK is used as the ECK. |
| Counter | 64 | The most significant 64 bits of the counter used to encrypt content. The counter varies according to the key distribution packet. The least significant 64 bits of the counter. The value starts from 0. For example, the least significant 64 bits of a 16-byte data block are increased by 1 each time the data block is encrypted. |
| CRC | 8 | CRC8 check bit, which is obtained by performing CRC8 calculation on the preceding fields and is used for integrity verification. |

It should be noted that a mode in which the authentication function is added on the basis of the CTR mode is referred to as a GCM mode (Galois/Counter Mode). The GCM mode can generate information for authentication while generating a ciphertext in the CTR mode, to determine whether the ciphertext undergoes a valid encryption process.

As an example, to support smooth transformation of the content key, the encryption method may adopt an odd-even key transformation mechanism, that is, EncryptionMethod is set to 1 or 2.

(3) The source device encrypts the content to be transmitted to the sink device. For example, the encryption algorithm may be an AES-128-CTR algorithm or an SM4-128-CTR algorithm. Certainly, another encryption algorithm may also be used.

In an example, the source device encrypts the to-be-sent audio-video data stream by using the CK. In another example, the source device may encrypt the to-be-sent audio-video data stream by using the CK and some or all count values of the counter. For example, the CK and the most significant 64 bits of the counter are used to encrypt the to-be-sent audio-video data stream.

(4) The transmitter packs the key distribution packet KDP into the encrypted audio-video data stream, and sends the encrypted audio-video data stream to the downstream sink device.

In a possible example, the KDP may be packed into a vertical blanking area, a horizontal blanking area, or a video area of the audio-video data stream. For example, refer to FIG. 2B. The audio-video packet may include a vertical blanking area, a horizontal blanking area, and a video area. The video area is used to carry a video packet. It should be understood that an electron gun draws pixels from left to right, and only one scanning line can be drawn each time. Before drawing a next scanning line, the electron gun needs to return to the left and prepare to draw the next scanning line. An area scanned by the electron gun from the end of the previous scanning line to the start of the next scanning line is referred to as the horizontal blanking area. After drawing all the scanning lines, the electron gun returns to the upper left corner of the screen to prepare to draw the next screen (frame), and the area that the electron gun scans from the end of all the scanning lines to the upper left corner of the screen is referred to as the vertical blanking area. The vertical blanking area and the horizontal blanking area may be used to carry auxiliary data and audio data. The auxiliary data may be, for example, in an audio-video format. The video area is used to carry video data or a video packet.

Figure 2B:
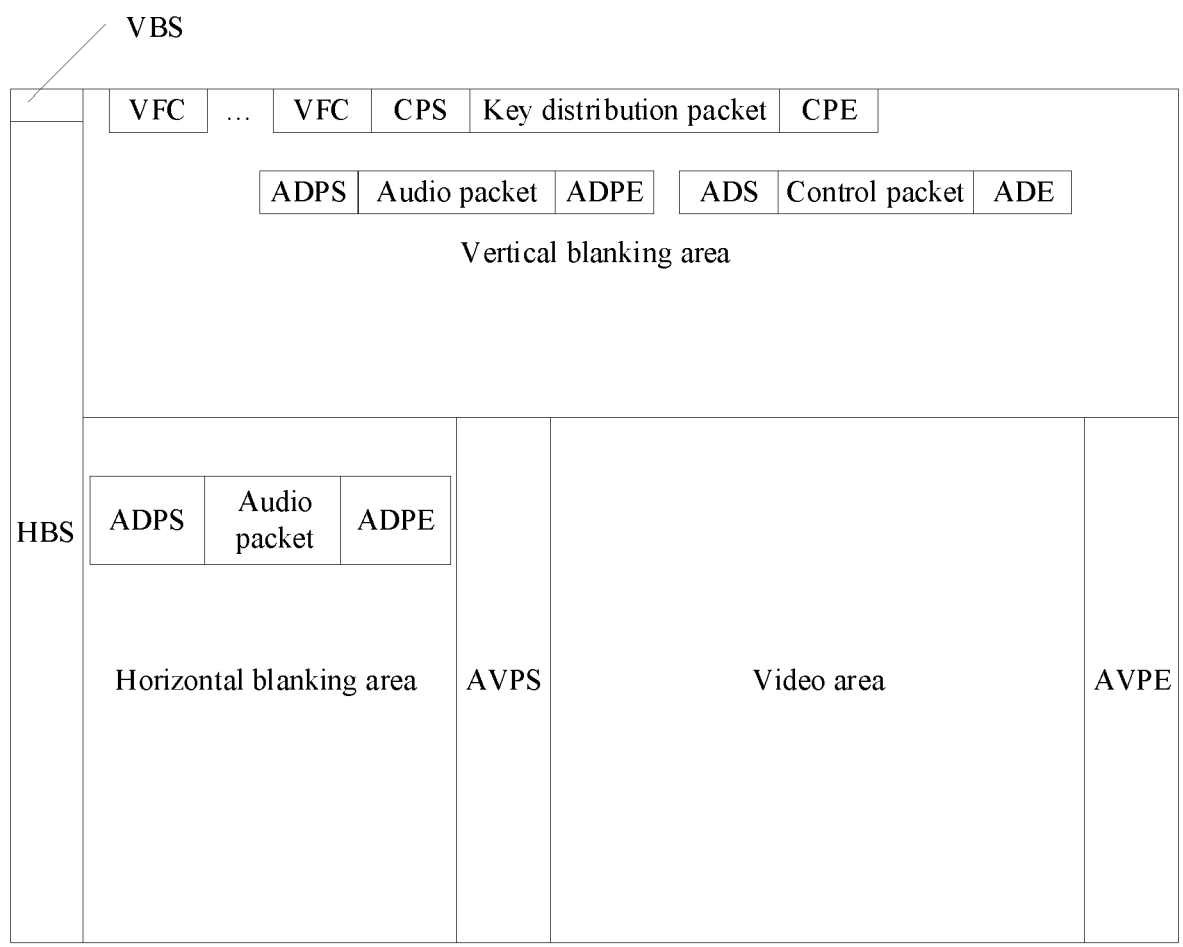
FIG. 2B is a schematic diagram of a position of a key distribution packet according to an embodiment of this application.

In an example, the KDP may be packed at a start position of the vertical blanking area, for example, after a frame format start field. For example, the frame format start field may be represented by a video frame control (video frame control, VFC). The key distribution packet may further include a start indication and an end indication, to indicate an area in which the KDP is located. In FIG. 2B, the start indication is represented by a content protection start (content protection start, CPS), and the end indication is represented by a content protection end (content protection end, CPE). In an example, the video packet in the video area may include a start indication and an end indication, to indicate a start and an end of video packet data. For example, the start indication is represented by an active video start (active video start, AVS) or an active video start with content protection (active video protection start, AVPS), and the end indication may be represented by an active video end (active video end, AVE) or an active video end with content protection (active video protection end, AVPE). In an example, an unencrypted video packet is carried in an area indicated by the AVS and the AVE, and an encrypted video packet is carried in an area indicated by the AVPS and the AVPE. In another example, an auxiliary packet carrying auxiliary data or audio data may also include a start indication and an end indication. For example, the start indication is represented by an auxiliary data start (auxiliary data start, ADS) or an auxiliary data start with content protection (auxiliary data protection start, ADPS), and the end indication is represented by an auxiliary data end (auxiliary data end, ADS) or an auxiliary data end with content protection (auxiliary data protection end, ADPS). In an example, an unencrypted audio packet or auxiliary packet is carried in an area indicated by the ADS and the ADE, and an encrypted audio packet or auxiliary packet is carried in an area indicated by the ADPS and the ADPE. For example, the horizontal blanking area of an audio-video stream may include a start indication. For example, in FIG. 2B, a horizontal blanking area start (HBlank start, HBS) is used for representation. The vertical blanking area may include a start indication, which is, for example, shown by using a vertical blanking area start (VBlank start, VBS) in FIG. 2B.

205: The sink device receives the encrypted audio-video data stream from the source device, and decrypts the encrypted audio-video data stream.

(1) Filter the key distribution packet KDP from the encrypted audio-video data stream.

In an example, the sink device receives the encrypted audio-video data stream, and may filter the key distribution packet KDP that belongs to the sink device by using StreamId and DeviceId.

(2) Obtain the content key through decryption. The sink device obtains the encrypted content key ECK from the key distribution packet KDP, and then decrypts the ECK by using the content key encryption key CKEK negotiated with the source device to obtain the content key CK.

In an example, the source device may send the key distribution packet to the sink device each time, and may continuously and repeatedly send a plurality of same key distribution packets, for example, repeatedly send a plurality of same key distribution packets, so that the sink device may perform error correction processing on the plurality of key distribution packets in a majority decision-making manner.

In some embodiments, before the sink device obtains the encrypted content key ECK from the key distribution packet KDP, the sink device may further verify whether the key distribution packet is correctly received. For example, the following manner may be used:

When the encryption mode is the GCM mode, the sink device adds the key distribution packet as an additional message to the GCM calculation, to perform integrity verification on the key distribution packet. If the verification succeeds, the key distribution packet is received correctly.

When the encryption mode is the CTR mode, the integrity of the key distribution packet can be verified through transmission channel verification.

(3) Use the content key to decrypt the content. In an example, the sink device decrypts the encrypted audio-video data stream by using the CK. In another example, the sink device decrypts the encrypted audio-video data stream by using the CK and some or all of the count values of the counter, for example, the most significant 64 bits of the counter.

(4) Output audio-video data.

In the foregoing solution in this embodiment of this application, the source device performs identity authentication on and negotiate a key with a transmission device that needs to output audio-video data or perform transformation processing on a transmission path to the sink device, and generates a key distribution packet used to encrypt or decrypt an audio-video stream only for the transmission device that needs to output audio-video data or perform transformation processing. Another device on the transmission path cannot know the key, and therefore cannot perform decryption, so that transmission security of the audio-video stream can be improved. In addition, in this application, the source device centrally performs identity authentication and authorization control on other transmission devices that need to output audio-video data or perform transformation processing. When a channel is switched in a live broadcast scenario, the source device only needs to perform authorization control. Compared with a cascaded verification and authorization manner, this reduces a delay and improves transmission performance.

The following describes solutions provided in the embodiments of this application with reference to different scenarios.

First Possible Scenario:

A source device and a sink device are connected directly or by using one or more router devices. For example, the source device and the sink device are connected through an audio-video transmission interface. For example, the audio-video transmission interface may be a digital video interface (display port, DP), a universal serial bus (universal serial bus, USB) type (Type)-C interface, or another interface that can support routing. For example, the source device may be a set-top box, and the sink device may be a television set.

Figure 3:
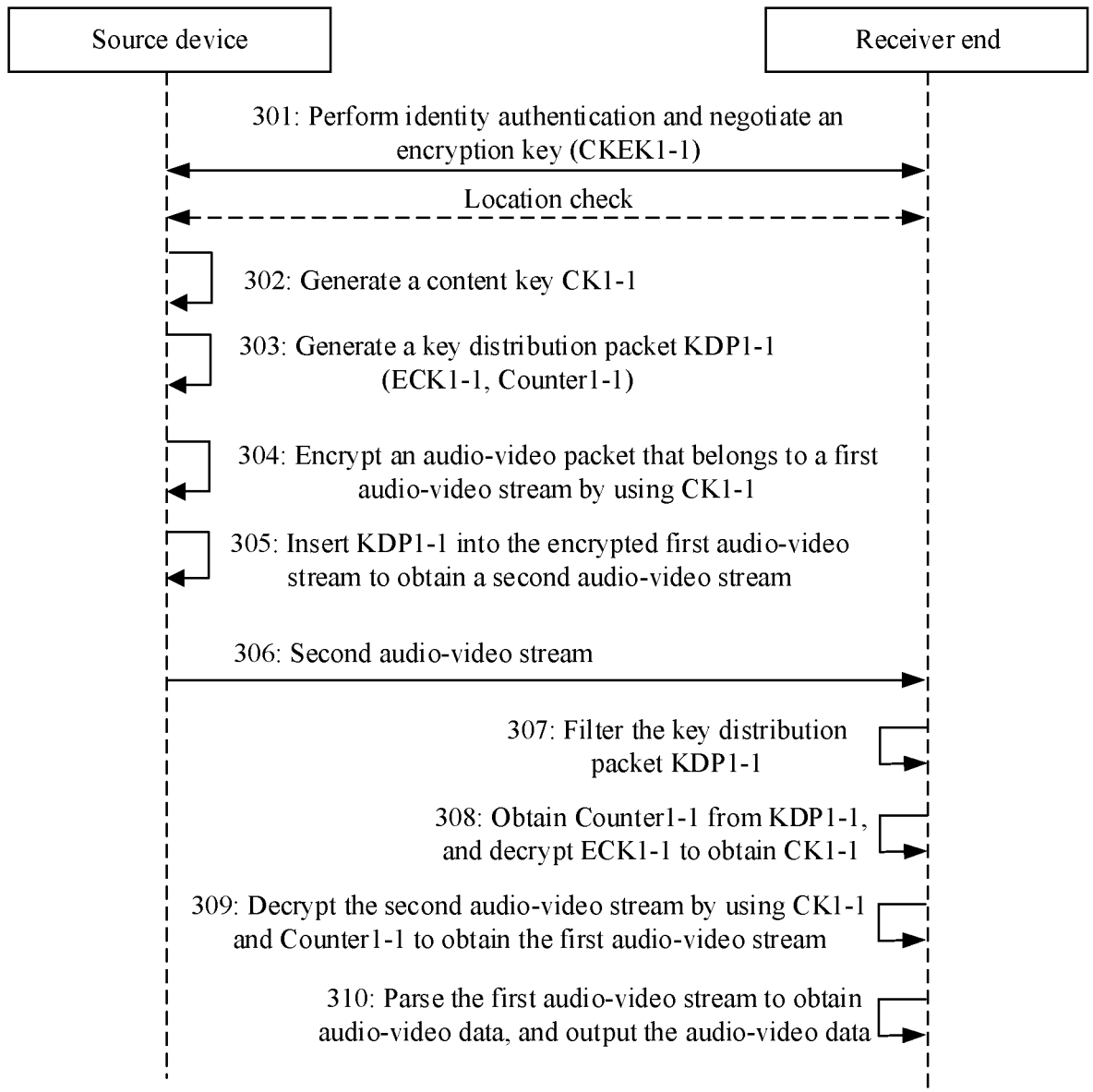
FIG. 3 is a schematic flowchart of a method in a first possible scenario according to an embodiment of this application.

FIG. 3 is a schematic flowchart of a data transmission method applied to the first possible scenario. The source device is connected to the first transmission apparatus. The first transmission apparatus is a sink device that receives audio-video data of the source device.

301: The source device performs identity authentication on the first transmission apparatus, and negotiates an encryption key with the first transmission apparatus. For ease of differentiation, the encryption key negotiated between the source device and the first transmission apparatus is referred to as a first encryption key herein, which is represented by CKEK1-1. When a transmission path includes a router device, because the router device does not participate in encryption or decryption, identity authentication may not be performed on the router device, and an encryption key does not need to be negotiated with the router device. The source device further performs authorization control on the audio-video processor device and the sink device on the transmission path. Reference may be made to related descriptions in step 203, and details are not described herein again.

It should be noted that transmission apparatuses on the transmission path from the source device to the sink device may be determined according to a routing table corresponding to the audio-video data.

302: The source device generates a content key. The content key is used to encrypt or decrypt content transmitted between the source device and the first transmission apparatus. For ease of differentiation, the content key used to encrypt or decrypt the content transmitted between the source device and the first transmission apparatus is referred to as a first content key herein, which is represented by CK1-1.

303: The source device generates a key distribution packet, where the key distribution packet is used by the first transmission apparatus to decrypt content from the source device. For descriptions about the key distribution packet, refer to related descriptions in step 204. Details are not described herein again. For ease of differentiation, the key distribution packet used by the first transmission apparatus to decrypt the content from the source device is referred to as a first key distribution packet, which is represented by KDP1-1. The source device encrypts CK1-1 by using CKEK1-1 to obtain a second content key, where the second content key is represented by ECK1-1. Herein, KDP1-1 includes a version (KDP version), a stream identifier StreamId1-1 of audio-video data, a device identifier DeviceId1-1, an encrypted content key ECK1-1, and some or all of the count values of a counter used to encrypt content (for example, the most significant 64 bits of the counter are used). Counter1-1 indicates the most significant 64 bits of the counter. In the following description, an example in which Counter1-1 is used to encrypt content is used for description.

The source device may generate audio-video data, receive audio-video data from a content delivery network, or the like. The audio-video data is encapsulated to obtain an audio-video packet. For ease of differentiation, a data stream to which an audio-video packet obtained by encapsulating audio-video data belongs is referred to as a first audio-video stream herein. Then, the source device processes the first audio-video stream to obtain a second audio-video stream. The processing may include encrypting and adding a key distribution packet.

It should be understood that a larger quantity of sink devices receiving same audio-video data indicates that a larger quantity of key distribution packets are generated by the source device. Each time a sink device is added, a key distribution packet for decryption may be added for the added sink device.

304: The source device encrypts the audio-video packet that belongs to the first audio-video stream by using CK1-1. Optionally, to further improve security of audio-video data transmission, the audio-video packet that belongs to the first audio-video stream may be encrypted by using CK1-1 and Counter1-1.

305: The source device inserts KDP1-1 into the encrypted first audio-video stream to obtain a second audio-video stream.

In an example, KDP1-1 may be inserted at an interval of a specific quantity of audio-video packets. In another example, a specified quantity of KDP1-1 may be inserted at a start stage of the audio-video stream, and subsequently, KDP1-1 is inserted at an interval of a specific quantity of audio-video packets.

306: The source device sends the second audio-video stream to the first transmission apparatus, so that the first transmission apparatus receives the second audio-video stream from the source device. For example, the source device may send the second audio-video stream to the first transmission apparatus by using one or more router devices. The router device only forwards the second audio-video stream, and does not encrypt or decrypt the second audio-video stream, so that security of audio-video data transmission can be improved.

307: The first transmission apparatus filters KDP1-1 from the second audio-video stream.

308: The first transmission apparatus obtains Counter1-1 from KDP1-1, and decrypts ECK1-1 to obtain CK1-1.

309: The first transmission apparatus decrypts the second audio-video stream by using CK1-1 and Counter1-1 to obtain the first audio-video stream.

310: The first transmission apparatus parses the first audio-video stream to obtain audio-video data, and outputs the audio-video data. For example, video data is rendered to a display, and audio data is rendered to a speaker.

According to the foregoing solution, the source device performs identity authentication on and negotiate a key with a transmission device that needs to output audio-video data or perform transformation processing on a transmission path to the sink device, and generates a key distribution packet used to encrypt or decrypt an audio-video stream only for the transmission device that needs to output audio-video data or perform transformation processing. Another device on the transmission path cannot know the key and cannot perform decryption, so that transmission security of the audio-video stream can be improved.

Second Possible Scenario:

In a transformation scenario, a transmission path between the source device and the sink device includes an audio-video processor device, and there may be one or more audio-video processor devices. The audio-video processor device is configured to transform an audio-video stream. The source device, a first transmission apparatus, and a second transmission apparatus are used as an example. The first transmission apparatus is an audio-video processor device, and the second transmission apparatus is a sink device.

Figure 4A:
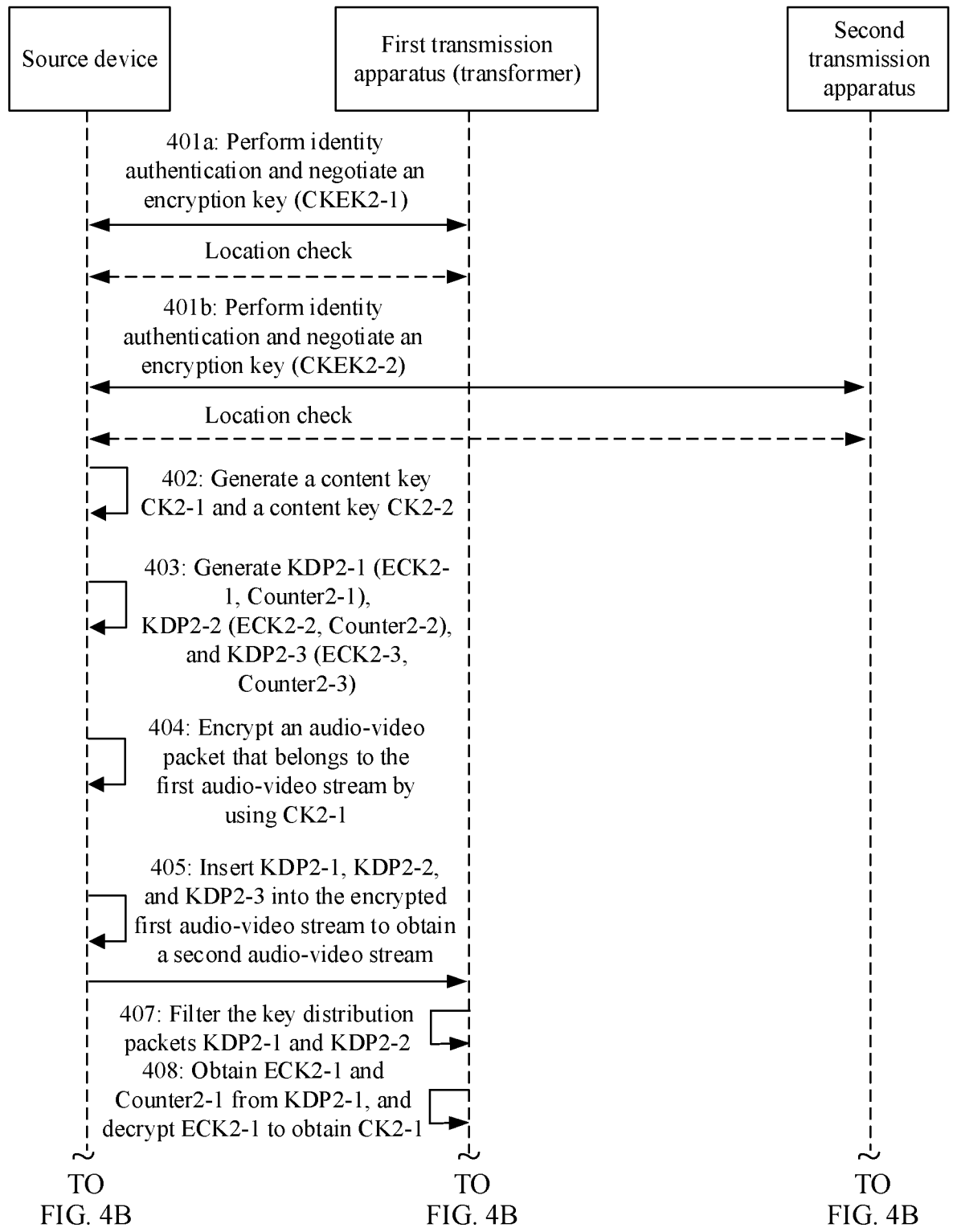
FIG. 4A and FIG. 4B are a schematic flowchart of a method in a second possible scenario according to an embodiment of this application.
Figure 4B:
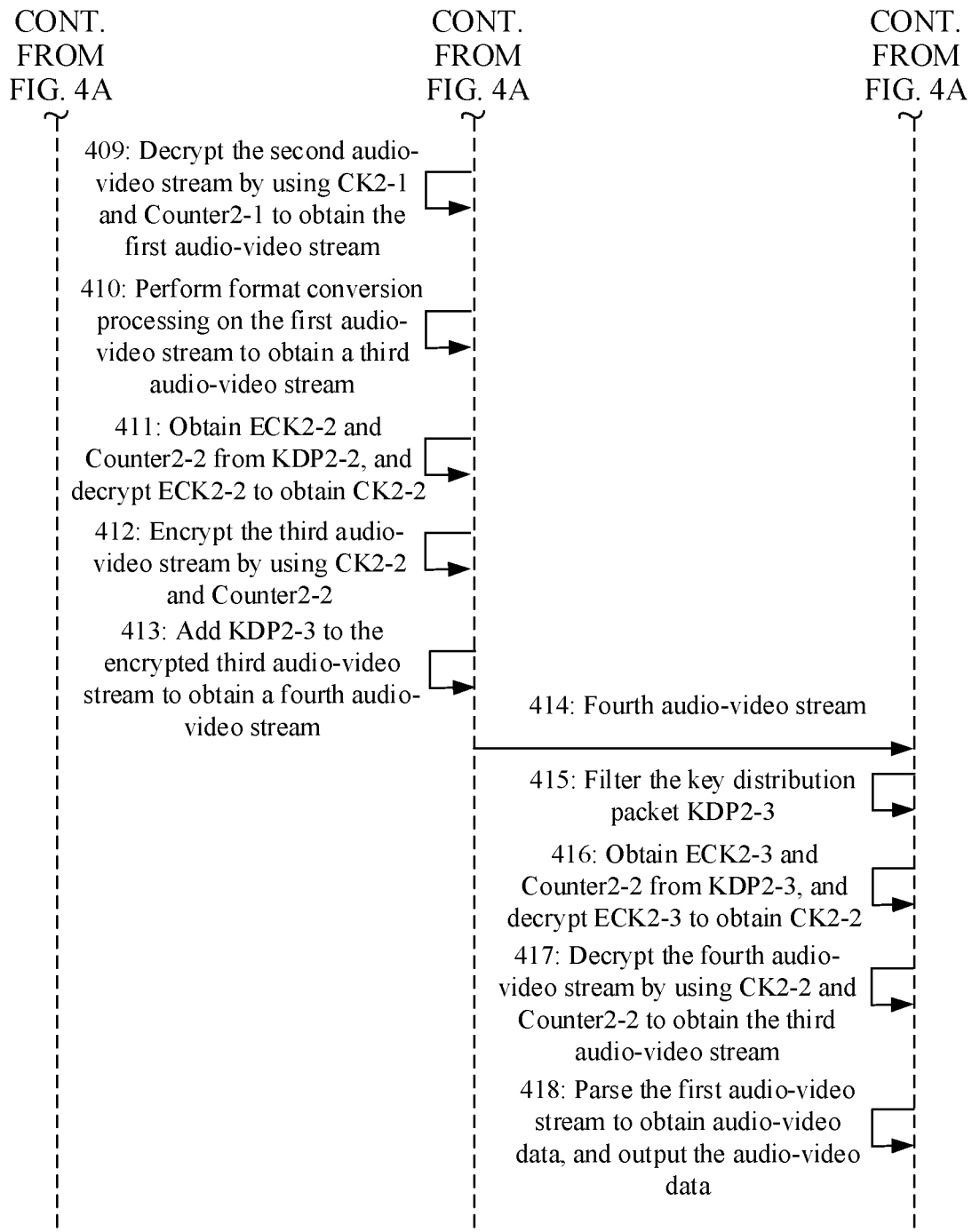

FIG. 4A and FIG. 4B are a schematic flowchart of a data transmission method applied to the second possible scenario. The source device is connected to the first transmission apparatus, and the first transmission apparatus is connected to the second transmission apparatus. The connection described herein may be a wired connection or a wireless connection. The transmission path between the source device and the second transmission apparatus may further include another forwarding device, for example, a router device. The another forwarding device does not encrypt or decrypt a data stream.

The second transmission apparatus is a sink device that receives audio-video data of the source device, and the first transmission apparatus is an audio-video processor device on a transmission path between the source device and the second transmission apparatus.

401a: The source device performs identity authentication on the first transmission apparatus, and negotiates an encryption key with the first transmission apparatus.

401b: The source device performs identity authentication on the second transmission apparatus, and negotiates an encryption key with the second transmission apparatus.

For ease of differentiation, herein, the encryption key negotiated between the source device and the first transmission apparatus is referred to as a first encryption key, which is represented by CKEK2-1; and the encryption key negotiated between the source device and the second transmission apparatus is referred to as a second encryption key, which is represented by CKEK2-2.

When a transmission path includes a router device, because the router device does not participate in encryption or decryption, identity authentication may not be performed on the router device, and an encryption key does not need to be negotiated with the router device.

The source device further performs authorization control on the audio-video processor device and the sink device on the transmission path. Reference may be made to related descriptions in step 203, and details are not described herein again. It should be noted that transmission apparatuses on the transmission path from the source device to the sink device may be determined according to a routing table corresponding to the audio-video data.

402: The source device generates a content key used for content transmitted between the source device and the first transmission apparatus, and a content key used to encrypt or decrypt content transmitted between the first transmission apparatus and the second transmission apparatus. For ease of differentiation, a content key used for content transmitted between the source device and the first transmission apparatus is referred to as a first content key, which is represented by CK2-1. A content key used for content transmitted between the first transmission apparatus and the second transmission apparatus is referred to as a third content key, which is represented by CK2-2.

For example, StreamId2-1 may be used to identify the content transmitted between the source device and the first transmission apparatus, and StreamId2-2 may be used to identify the content transmitted between the first transmission apparatus and the second transmission apparatus.

403: The source device generates a first key distribution packet, a second key distribution packet, and a third key distribution packet. The first key distribution packet is used by the first transmission apparatus to decrypt content from the source device. The second key distribution packet is used by the first transmission apparatus to encrypt content sent to the second transmission apparatus. The third key distribution packet is used by the second transmission apparatus to decrypt content sent by the first transmission apparatus.

For descriptions about the key distribution packet, refer to related descriptions in step 204. Details are not described herein again. For ease of description, the first key distribution packet is represented by KDP2-1; the second key distribution packet is represented by KDP2-2; and the third key distribution packet is represented by KDP2-3.

The source device encrypts CK2-1 by using CKEK2-1 to obtain a second content key, where the second content key is represented by ECK2-1. The source device uses CKEK2-1 to encrypt CK2-2 to obtain a fourth content key, where the fourth content key is represented by ECK2-2. The source device encrypts CK2-2 by using CKEK2-2 to obtain a fifth content key, where the fifth content key is represented by ECK2-3. Herein, an example in which KDP2-1 includes a version (KDP version), a stream identifier StreamId2-1 of audio-video data, a device identifier DeviceId2-1, an encrypted content key ECK2-1, and Counter2-1 is used for description. Herein, an example in which KDP2-2 includes a version (KDP version), a stream identifier StreamId2-2 of audio-video data, a device identifier DeviceId2-1 (a device identifier of the first transmission apparatus), an encrypted content key ECK2-2, and Counter2-2 is used for description. Herein, an example in which the KDP2-3 includes a version (KDP version), a stream identifier StreamId2-2 of audio-video data, a device identifier DeviceId2-2 (a device identifier of the second transmission apparatus), an encrypted content key ECK2-3, and Counter2-2 is used for description.

The source device may generate audio-video data, receive audio-video data from a content delivery network, or the like. The audio-video data is encapsulated to obtain an audio-video packet. For ease of differentiation, a data stream to which an audio-video packet obtained by encapsulating audio-video data belongs is referred to as a first audio-video stream herein. In this way, the source device processes the first audio-video stream to obtain the second audio-video stream. The processing may include encrypting and adding the first key distribution packet, the second key distribution packet, and the third key distribution packet.

It should be understood that a larger quantity of audio-video processor devices on the transmission path of the audio-video data indicates that a larger quantity of key distribution packets are generated by the source device. Each time an audio-video processor device is added, a key distribution packet used for decryption and a key distribution packet used for encryption may be added for the added audio-video processor device.

404: The source device encrypts the audio-video packet that belongs to the first audio-video stream by using CK2-1. Optionally, to further improve security of audio-video data transmission, the audio-video packet that belongs to the first audio-video stream may be encrypted by using CK2-1 and Counter2-1.

405: The source device inserts KDP2-1, KDP2-2, and KDP2-3 into the encrypted first audio-video stream to obtain a second audio-video stream.

In an example, KDP2-1, KDP2-2, and KDP2-3 may be inserted into the vertical blanking area, the horizontal blanking area, or the video area at an interval of a specific quantity of audio-video packets. In another example, a specified quantity of KDP2-1, KDP2-2, and KDP2-3 may be inserted into the vertical blanking area at a start stage of the audio-video stream, and subsequently, KDP2-1, KDP2-2, and KDP2-3 are inserted into the vertical blanking area, the horizontal blanking area, or the video area at an interval of a specific quantity of audio-video packets.

406: The source device sends the second audio-video stream to the first transmission apparatus, so that the first transmission apparatus receives the second audio-video stream from the source device. For example, the source device may further send the second audio-video stream to the first transmission apparatus by using one or more router devices. The router device only forwards the second audio-video stream, and does not encrypt or decrypt the second audio-video stream, so that security of audio-video data transmission can be improved.

407: The first transmission apparatus filters KDP2-1 and KDP2-2 from the second audio-video stream.

For example, it may be determined, according to the device identifier DeviceId2-1 included in both KDP2-1 and KDP2-2, that the two key distribution packets are used by the first transmission apparatus; and it may be determined, according to the stream identifier StreamId2-1 included in KDP2-1, that KDP2-1 is used by the first transmission apparatus to decrypt the second audio-video stream.

408: The first transmission apparatus obtains Counter2-1 from KDP2-1, and decrypts ECK2-1 by using EKCK2-1 to obtain CK2-1.

409: The first transmission apparatus decrypts the second audio-video stream by using the CK2-1 and the Counter2-1 to obtain the first audio-video stream.

410: Perform format conversion processing on the first audio-video stream to obtain a third audio-video stream.

411: The first transmission apparatus obtains Counter2-2 and ECK2-2 from KDP2-2, and decrypts ECK2-2 by using EKCK2-1 to obtain CK2-2; and determines, according to the stream identifier StreamId2-2 included in KDP2-2, that KDP2-2 is used by the first transmission apparatus to encrypt the third audio-video stream.

412: The first transmission apparatus encrypts the third audio-video stream by using CK2-2 and Counter2-2.

413: The first transmission apparatus adds KDP2-3 to the encrypted third audio-video stream to obtain a fourth audio-video stream.

414: The first transmission apparatus sends the fourth audio-video stream to the second transmission apparatus.

415: The second transmission apparatus receives the fourth audio-video stream, and filters KDP2-3 from the fourth audio-video stream.

416: The second transmission apparatus obtains Counter2-2 and ECK2-3 from KDP2-3, and decrypts ECK2-3 by using EKCK2-2 to obtain CK2-2.

417: The second transmission apparatus decrypts the fourth audio-video stream by using CK2-2 and Counter2-2 to obtain a third audio-video stream.

418: The second transmission apparatus parses the third audio-video stream to obtain audio-video data, and outputs the audio-video data. For example, video data is rendered to a display, and audio data is rendered to a speaker.

According to the foregoing solution, the source device performs identity authentication on and negotiate a key with the sink device and the audio-video processor device that performs transformation processing, generates, for the audio-video processor device, the key distribution packet used to decrypt the audio-video stream sent by the source device and the key distribution packet used to encrypt the audio-video stream sent to the sink device, and generates, for the sink device, the key distribution packet used to decrypt the audio-video stream sent by the audio-video processor device. Therefore, another device on the transmission path cannot know the key and cannot decrypt the audio-video stream, so that the transmission security of the audio-video stream is improved.

Third Possible Scenario:

In a relaying scenario, there are a plurality of sink devices corresponding to the source device. The source device is connected to a plurality of sink devices by using a repeater. An audio-video processor device may be further included between the source device and the repeater, or an audio-video processor device is included between the repeater and the sink device. In this embodiment, two sink devices are used as an example: a first transmission apparatus and a second transmission apparatus. The source device is connected to both the first transmission apparatus and the second transmission apparatus by using a repeater. The connection described herein may be a wired connection or a wireless connection.

Figure 5A:
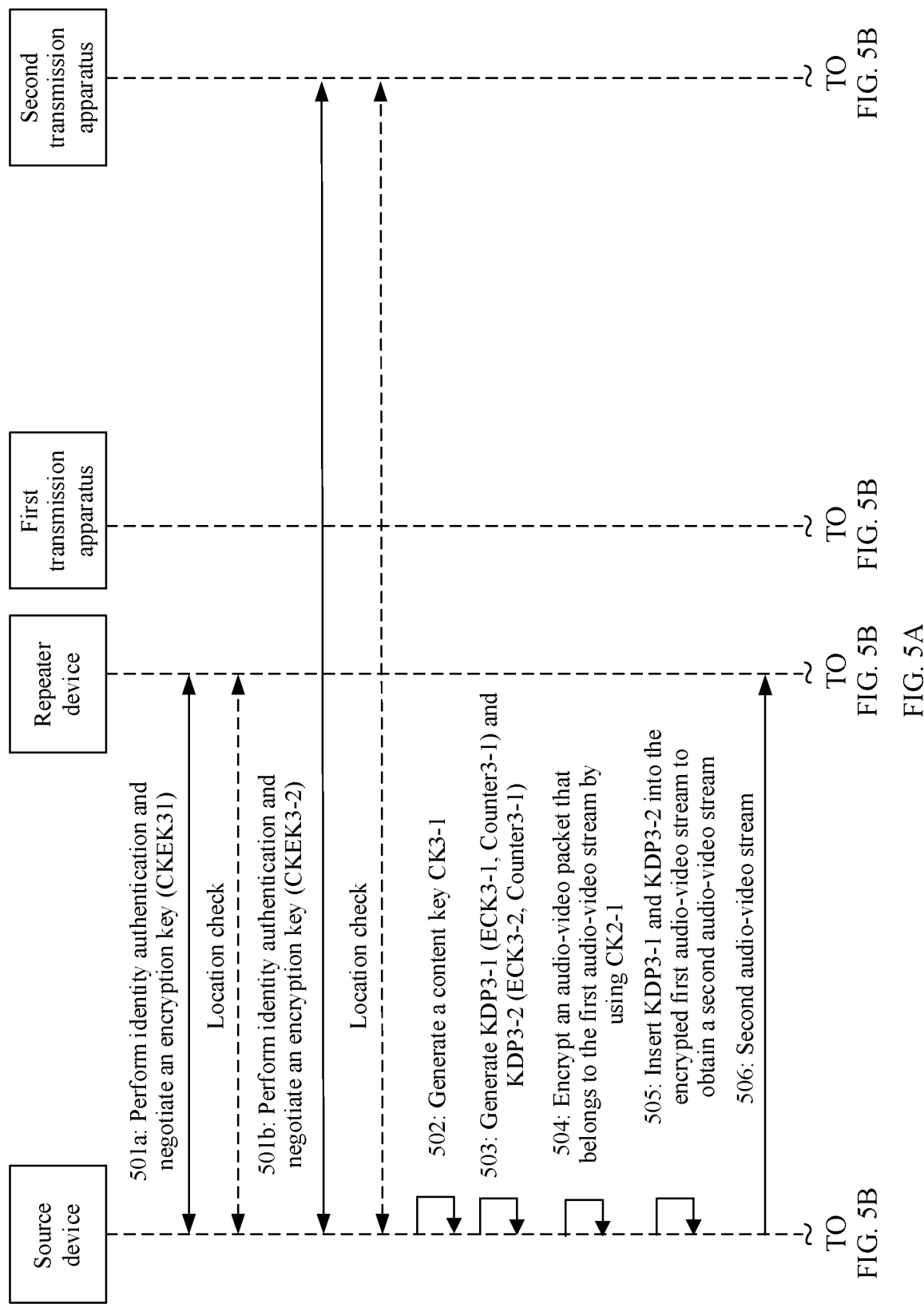
FIG. 5A and FIG. 5B are a schematic flowchart of a method in a third possible scenario according to an embodiment of this application.
Figure 5B:
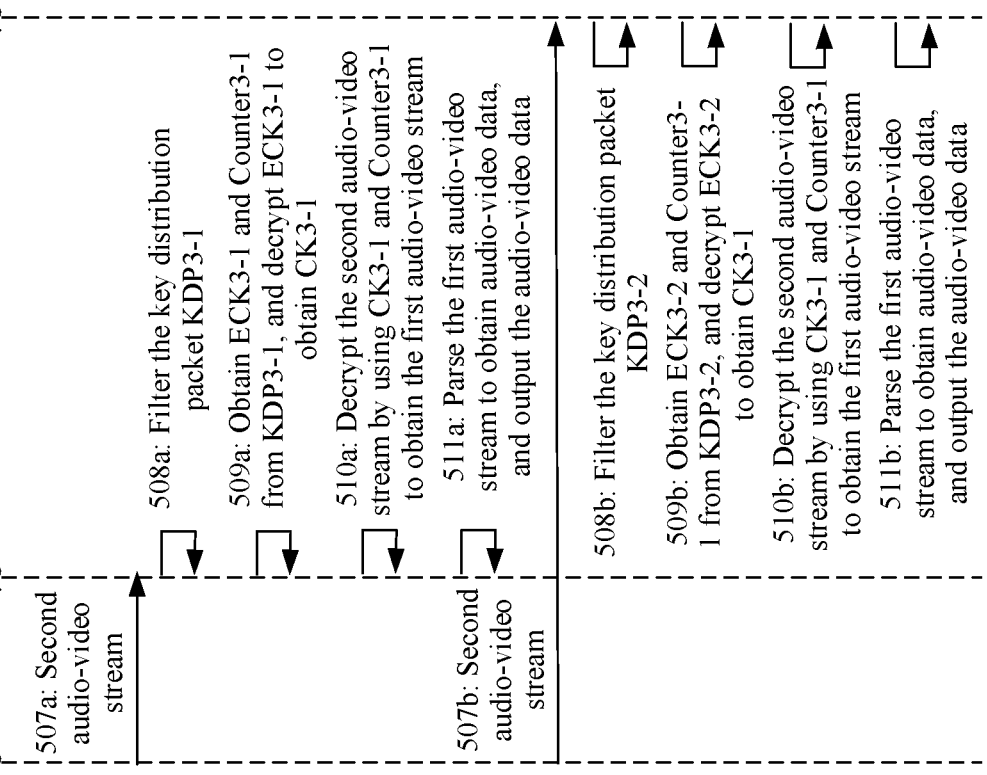

FIG. 5A and FIG. 5B are a schematic flowchart of a data transmission method applied to the third possible scenario. The transmission path between the source device and the second transmission apparatus may further include another forwarding device, and the transmission path between the source device and the first transmission apparatus may further include another forwarding device, for example, a router device. The another forwarding device does not encrypt or decrypt a data stream. The repeater device does not need to encrypt or decrypt a data stream.

501*a*: The source device performs identity authentication on the first transmission apparatus, and negotiates an encryption key with the first transmission apparatus.

501*b*: The source device performs identity authentication on the second transmission apparatus, and negotiates an encryption key with the second transmission apparatus.

For ease of differentiation, herein, the encryption key negotiated between the source device and the first transmission apparatus is referred to as a first encryption key, which is represented by CKEK3-1; and the encryption key negotiated between the source device and the second transmission apparatus is referred to as a second encryption key, which is represented by CKEK3-2.

When a transmission path includes a repeater device, because the repeater device does not participate in encryption or decryption, identity authentication may not be performed on the repeater device, and an encryption key does not need to be negotiated with the repeater device.

The source device further performs authorization control on the audio-video processor device and the sink device on the transmission path. Reference may be made to related descriptions in step 203, and details are not described herein again. It should be noted that transmission apparatuses on the transmission path from the source device to the sink device may be determined according to a routing table corresponding to the audio-video data.

502: The source device generates CK3-1.

For example, StreamId3-1 may be used to identify content transmitted between the source device and the first transmission apparatus, and StreamId3-2 may be used to identify content transmitted between the source device and the second transmission apparatus.

503: The source device generates KDP3-1 and KDP3-2. KDP3-1 is used by the first transmission apparatus to decrypt the content from the source device. KDP3-2 is used by a second transmission apparatus to decrypt content from the source device.

For descriptions about the key distribution packet, refer to related descriptions in step 204. Details are not described herein again.

The source device encrypts CK3-1 by using CKEK3-1 to obtain ECK3-1, and the source device encrypts CK3-1 by using CKEK3-2 to obtain ECK3-2. Herein, an example in which KDP3-1 includes a version (KDP version), a stream identifier StreamId3-1 of audio-video data, a device identifier DeviceId3-1 (a device identifier of the first transmission apparatus), an encrypted content key ECK3-1, and Counter3-1 is used for description. Herein, an example in which KDP3-2 includes a version (KDP version), a stream identifier StreamId3-2 of audio-video data, a device identifier DeviceId3-2 (a device identifier of the second transmission apparatus), an encrypted content key ECK3-2, and Counter3-1 is used for description.

The source device may generate audio-video data, receive audio-video data from a content delivery network, or the like. The audio-video data is encapsulated to obtain an audio-video packet. For ease of differentiation, a data stream to which an audio-video packet obtained by encapsulating audio-video data belongs is referred to as a first audio-video stream herein. Then, the source device processes the first audio-video stream to obtain a second audio-video stream. The processing may include encrypting and adding KDP3-1 and KDP3-2.

504: The source device encrypts the audio-video packet that belongs to the first audio-video stream by using CK3-1. Optionally, to further improve security of audio-video data transmission, the audio-video packet that belongs to the first audio-video stream may be encrypted by using CK3-1 and Counter3-1.

505: The source device inserts KDP3-1 and KDP3-2 into the decrypted first audio-video stream to obtain a second audio-video stream.

In an example, KDP3-1 and KDP3-2 may be inserted into a vertical blanking area, a horizontal blanking area, or a video area at an interval of a specific quantity of audio-video packets. In another example, a specified quantity of KDP3-1 and KDP3-2 may be inserted into a vertical blanking area at a start stage of the audio-video stream, and subsequently, KDP3-1 and KDP3-2 are inserted into the vertical blanking area, the horizontal blanking area, or the video area at an interval of a specific quantity of audio-video packets.

506: The source device sends the second audio-video stream to the repeater, so that the repeater receives the second audio-video stream from the source device.

507a: The repeater device sends the second audio-video stream to the first transmission apparatus.

507b: The repeater device sends the second audio-video stream to the second transmission apparatus.

508a: The first transmission apparatus receives the second audio-video stream, and filters KDP3-1 from the second audio-video stream.

509a: The first transmission apparatus obtains Counter3-1 and ECK3-1 from KDP3-1, and decrypts ECK3-1 by using EKCK3-1 to obtain CK3-1.

510a: The first transmission apparatus decrypts the second audio-video stream by using CK3-1 and Counter3-1 to obtain the first audio-video stream.

511a: The first transmission apparatus parses the first audio-video stream to obtain audio-video data, and outputs the audio-video data. For example, video data is rendered to a display, and audio data is rendered to a speaker.

508b: The second transmission apparatus receives the second audio-video stream, and filters KDP3-2 from the second audio-video stream.

509b: The second transmission apparatus obtains Counter3-1 and ECK3-2 from KDP3-2, and decrypts ECK3-2 by using EKCK3-2 to obtain CK3-1.

510b: The second transmission apparatus decrypts the second audio-video stream by using CK3-1 and Counter3-1 to obtain the first audio-video stream.

511b: The second transmission apparatus parses the first audio-video stream to obtain audio-video data, and outputs the audio-video data. For example, video data is rendered to a display, and audio data is rendered to a speaker.

According to the foregoing solution, the source device performs identity authentication on and negotiates a key with the sink device, and does not need to perform authentication on or negotiate a key with another device that does not need to output the audio-video stream or perform transformation processing, for example, does not need to perform identity authentication or negotiate a key with a repeater device. During audio-video stream transmission, a key distribution packet used to decrypt the encrypted audio-video stream only needs to be generated for the sink device. Therefore, the repeater device on the transmission path cannot know the key and cannot decrypt the audio-video stream, and only needs to perform relaying and forwarding after receiving the encrypted audio-video stream. This improves transmission security of the audio-video stream.

Fourth Possible Scenario:

This scenario is a daisy chain scenario, where a daisy chain device is included. The source device, the first transmission apparatus, and the second transmission apparatus use a daisy chain topology structure. The first transmission apparatus is a daisy chain device. It should be understood that the daisy chain scenario may include one or more daisy chain devices, and may further include another transmission apparatus, such as an audio-video processor device or a repeater device.

Figure 6A:
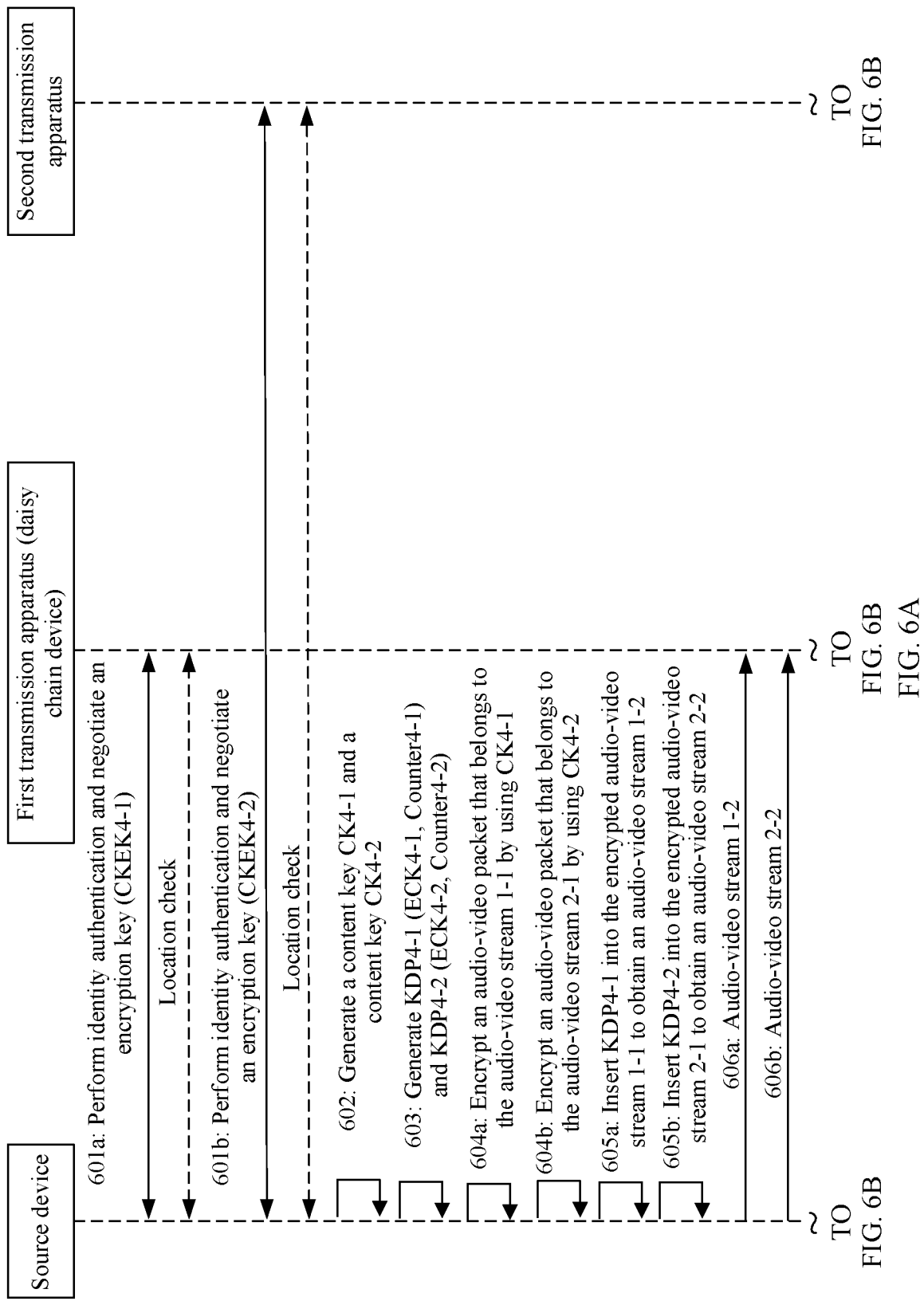
FIG. 6A and FIG. 6B are a schematic flowchart of a method in a fourth possible scenario according to an embodiment of this application.
Figure 6B:
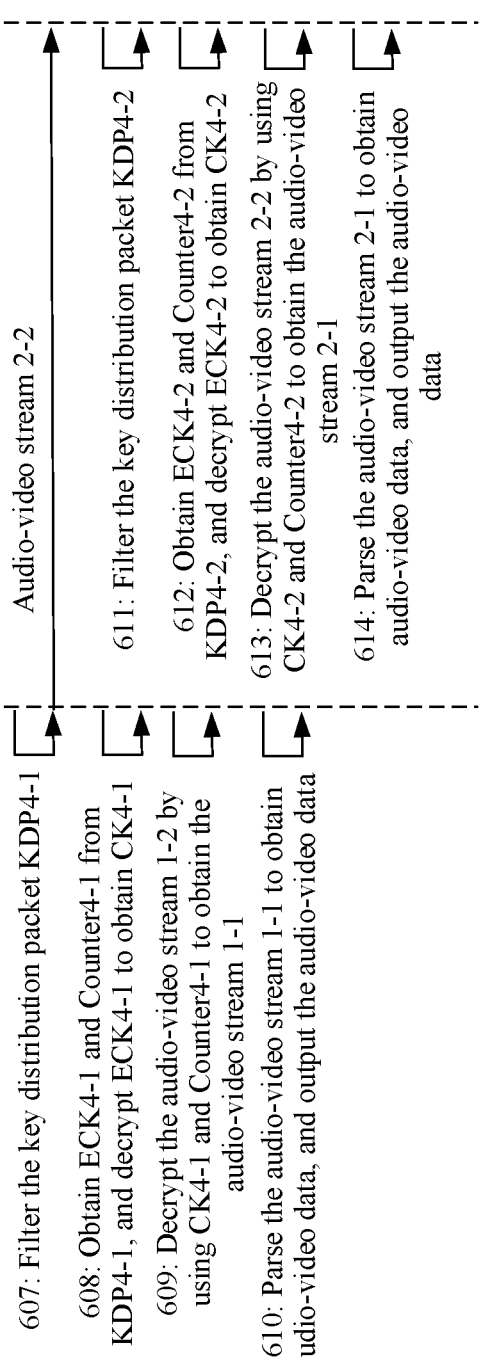

FIG. 6A and FIG. 6B are a schematic flowchart of a data transmission method applied to the fourth possible scenario. The source device is connected to the first transmission apparatus, and the first transmission apparatus is connected to the second transmission apparatus. The connection described herein may be a wired connection or a wireless connection. In FIG. 6A and FIG. 6B, the source device sends different audio-video data to the first transmission apparatus and the second transmission apparatus. When the source device sends audio-video data to the second transmission apparatus, the first transmission apparatus needs to forward the audio-video data. For ease of differentiation, audio-video data sent to the first transmission apparatus is referred to as audio-video data 1, and audio-video data sent to the second transmission apparatus is referred to as audio-video data 2.

601a: The source device performs identity authentication on the first transmission apparatus, and negotiates an encryption key with the first transmission apparatus.

601b: The source device performs identity authentication on the second transmission apparatus, and negotiates an encryption key with the second transmission apparatus.

For ease of differentiation, herein, the encryption key negotiated between the source device and the first transmission apparatus is referred to as a first encryption key, which is represented by CKEK4-1; and the encryption key negotiated between the source device and the second transmission apparatus is referred to as a second encryption key, which is represented by CKEK4-2.

When a transmission path includes a router device, because the router device does not participate in encryption or decryption, identity authentication may not be performed on the router device, and an encryption key does not need to be negotiated with the router device.

The source device further performs authorization control on the daisy chain device and the sink device on the transmission path. For details, refer to related descriptions in step 203. Details are not described herein again. It should be noted that transmission apparatuses on the transmission path from the source device to the sink device may be determined according to a routing table corresponding to the audio-video data.

602: The source device generates CK4-1 and CK4-2.

For example, StreamId4-1 may be used to identify content transmitted between the source device and the first transmission apparatus, and StreamId4-2 may be used to identify content transmitted between the source device and the second transmission apparatus.

603: The source device generates KDP4-1 and KDP4-2.

The source device encrypts CK4-1 by using CKEK4-1 to obtain ECK4-1. The source device encrypts CK4-2 by using CKEK4-2 to obtain ECK4-2. Herein, an example in which the KDP4-1 includes a version (KDP version), a stream identifier StreamId4-1 of audio-video data, a device identifier DeviceId4-1 (a device identifier of the second transmission apparatus), an encrypted content key ECK4-1, and Counter4-1 is used for description. Herein, an example in which KDP4-2 includes a version (KDP version), a stream identifier StreamId4-2 of audio-video data, a device identifier DeviceId4-2 (a device identifier of the second transmission apparatus), an encrypted content key ECK4-2, and Counter4-2 is used for description.

The source device may generate audio-video data 1 to be sent to the first transmission apparatus, or receive audio-video data 1 from a content delivery network, or the like.

The audio-video data 1 is encapsulated to obtain an audio-video packet 1. For ease of differentiation, the data stream to which the audio-video packet 1 obtained by encapsulating the audio-video data belongs is referred to as an audio-video stream 1-1 herein. In this way, the source device processes the audio-video stream 1 to obtain an audio-video stream 1-2. The processing may include encrypting and adding KDP4-1.

The source device may generate audio-video data 2 to be sent to the second transmission apparatus, or receive audio-video data 2 from a content delivery network, or the like. The audio-video data 2 is encapsulated to obtain an audio-video packet 2. For ease of differentiation, the data stream to which the audio-video packet 2 obtained by encapsulating the audio-video data belongs is referred to as an audio-video stream 2-1 herein. Then, the source device processes the audio-video stream 2-1 to obtain an audio-video stream 2-2. The processing may include encrypting and adding KDP4-2.

604a: The source device encrypts the audio-video packet that belongs to the audio-video stream 1-1 by using CK4-1. Optionally, to further improve security of audio-video data transmission, CK4-1 and Counter4-1 may be used to encrypt the audio-video packet that belongs to the audio-video stream 1-1.

604b: The source device uses CK4-2 to encrypt the audio-video packet that belongs to the audio-video stream 2-1. Optionally, to further improve security of audio-video data transmission, CK4-2 and Counter4-2 may be used to encrypt the audio-video packet that belongs to the audio-video stream 2-1.

605a: The source device inserts KDP4-1 into the encrypted audio-video stream 1-1 to obtain the audio-video stream 1-2.

In an example, KDP4-1 may be inserted at an interval of a specific quantity of audio-video packets. In another example, a specified quantity of KDP4-1 may be inserted at a start stage of the audio-video stream, and subsequently, KDP4-1 is inserted at an interval of a specific quantity of audio-video packets.

605b: The source device inserts KDP4-2 into the encrypted audio-video stream 2-1 to obtain the audio-video stream 2-2.

606a: The source device sends the audio-video stream 1-2 to the first transmission apparatus, so that the first transmission apparatus receives the audio-video stream 1-2 from the source device. For example, the source device may further send the audio-video streams 1-2 to the first transmission apparatus by using one or more router devices. The router device only forwards audio-video streams 1-2, but does not encrypt or decrypt the audio-video streams 1-2. This improves security of audio-video data transmission.

606b: The source device further sends the audio-video streams 2-2 to the first transmission apparatus, so that the first transmission apparatus receives the audio-video streams 2-2 from the source device.

Optionally, when a sending time of the audio-video stream 2-1 overlaps with a sending time of the audio-video stream 2-2, the source device may multiplex the audio-video stream 2-1 and the audio-video stream 2-2 into one audio-video stream and send the audio-video stream to the first transmission apparatus.

607: The first transmission apparatus filters KDP4-1 from the audio-video stream 1-2, determines that a receiver end of the audio-video stream 2-2 is not the first transmission apparatus but the second transmission apparatus, and forwards the audio-video stream 2-2 to the second transmission apparatus.

For example, it may be determined, according to a device identifier DeviceId4-1 included in KDP4-1, that KDP4-1 is used by the first transmission apparatus. For another example, it may be determined, according to the StreamId, that KDP4-1 is used to decrypt the audio-video stream 1-2 of the source device.

608: The first transmission apparatus obtains Counter4-1 and EKCK4-1 from KDP4-1, and decrypts ECK4-1 by using EKCK4-1 to obtain CK4-1.

609: The first transmission apparatus decrypts the audio-video stream 1-2 by using CK4-1 and Counte4-1 to obtain the audio-video stream 1-1.

610: A first transmission apparatus parses the audio-video stream 2-1 to obtain audio-video data 1, and outputs the audio-video data 1. For example, video data is rendered to a display, and audio data is rendered to a speaker.

611: The second transmission apparatus receives the audio-video stream 2-2, and filters KDP4-2 from the audio-video stream 2-2.

612: The second transmission apparatus obtains Counter4-2 and ECK4-2 from KDP4-2, and decrypts ECK4-2 by using EKCK4-2 to obtain CK4-2.

613: The second transmission apparatus decrypts the audio-video stream 2-2 by using the CK4-2 and Counter4-2 to obtain the audio-video stream 2-1.

614: The second transmission apparatus parses the audio-video stream 2-1 to obtain audio-video data 2, and outputs the audio-video data 2. For example, video data is rendered to a display, and audio data is rendered to a speaker.

According to the foregoing solution, the source device performs identity authentication on and negotiate a key with the daisy chain device and the sink device, and does not need to perform authentication on or negotiate a key with another device that does not need to output the audio-video stream or perform transformation processing. During audio-video stream transmission, only a key distribution packet used to decrypt an encrypted audio-video stream needs to be generated for the sink device (and the daisy chain device). Therefore, a device that is on a transmission path and that does not need to output the audio-video stream or perform transformation processing on the audio-video stream cannot know the key and cannot decrypt the audio-video stream. Therefore, after receiving the encrypted audio-video stream, the daisy chain device only forwards the audio-video stream that do not need to be output. This improves transmission security and transmission performance of audio-video streams.

Fifth Possible Scenario:

In a back-transmission scenario, the sink device needs to back-transmit audio-video data to an upstream transmission apparatus, for example, a source device or a transformer, and the upstream transmission apparatus outputs the back-transmitted audio-video data. The back-transmitted audio-video data may be audio-video data transformed by the sink device. For example, if the upstream transmission apparatus supports audio playing, but the sink device does not support audio playing, the sink device may back-transmit data to the transmission apparatus for playing.

The following uses an example in which the first transmission apparatus is a sink device and the second transmission apparatus is an upstream transmission apparatus for description. The first transmission apparatus may be used as a common receiver to output audio-video data, or may be used as a transformer to forward the audio-video data to the upstream transmission apparatus. For example, a receiving transformer certificate is built in the first transmission apparatus.

Figure 7B:
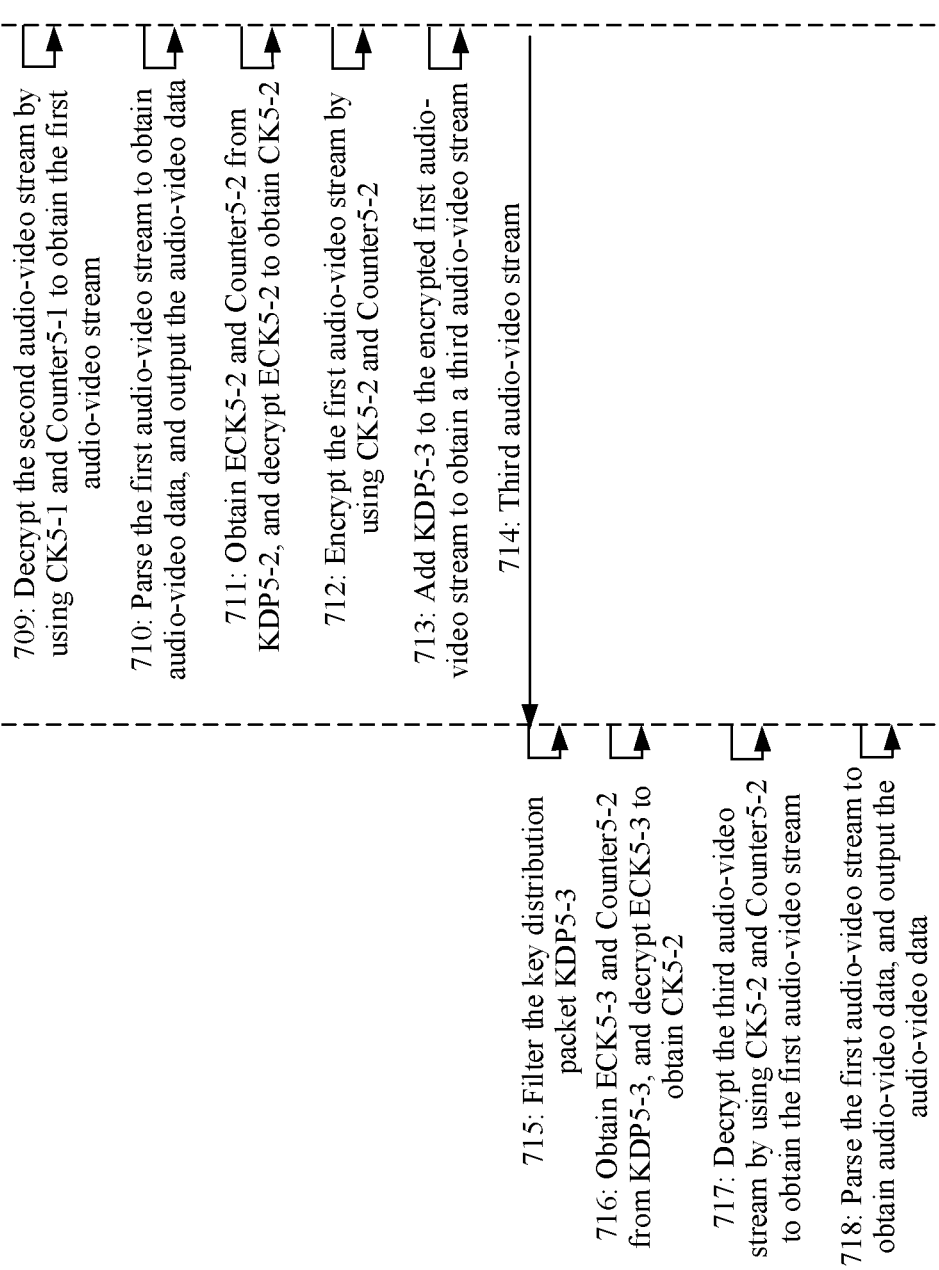

FIG. 7A and FIG. 7B are a schematic flowchart of a data transmission method applied to the fifth possible scenario. The source device is connected to the second transmission apparatus, and the second transmission apparatus is connected to the first transmission apparatus. The connection herein may be a wired connection or a wireless connection. The transmission path between the source device and the second transmission apparatus may further include another forwarding device, for example, a router device. The another forwarding device does not encrypt or decrypt a data stream. On a path through which the audio-video data of the source device is transmitted to the second transmission apparatus, the first transmission apparatus may be used as a forwarding device, and does not perform encryption processing or decryption processing. After receiving the audio-video data from the source device, the second transmission apparatus encrypts the audio-video data, and back-transmits the encrypted audio-video data to the first transmission apparatus. On the back-transmission path, after receiving the encrypted data from the second transmission apparatus, the first transmission apparatus performs a decryption operation, and outputs the audio-video data.

701a: The source device performs identity authentication on the first transmission apparatus (an upstream receiving device), and negotiates an encryption key with the first transmission apparatus.

701b: The source device performs identity authentication on the second transmission apparatus (the sink device), and negotiates an encryption key with the second transmission apparatus.

For ease of differentiation, herein, the encryption key negotiated between the source device and the second transmission apparatus is represented by CKEK5-1, and the encryption key negotiated between the source device and the first transmission apparatus is represented by CKEK5-2.

When a transmission path includes a router device, because the router device does not participate in encryption or decryption, identity authentication may not be performed on the router device, and an encryption key does not need to be negotiated with the router device.

The source device further performs authorization control on the upstream receiving device and the sink device on the transmission path. For details, refer to related descriptions in step 203. Details are not described herein again. It should be noted that transmission apparatuses on the transmission path from the source device to the sink device may be determined according to a routing table corresponding to the audio-video data.

702: The source device generates a content key used for content transmitted between the source device and the first transmission apparatus, and a content key used to encrypt or decrypt content transmitted between the first transmission apparatus and the second transmission apparatus. For ease of differentiation, a content key used for content transmitted between the source device and the second transmission apparatus is represented by CK5-1, and a content key used for content transmitted between the second transmission apparatus and the first transmission apparatus is represented by CK5-2.

For example, StreamId5-1 may be used to identify the content transmitted between the source device and the second transmission apparatus, and StreamId5-2 may be used to identify the content transmitted between the second transmission apparatus and the first transmission apparatus.

703: The source device generates a key distribution packet used by the second transmission apparatus to decrypt the content from the source device, and the key distribution packet is represented by KDP5-1 herein. A key distribution packet used by the second transmission apparatus to back-transmit audio-video data is further generated, and is represented by KDP5-2 herein. A key distribution packet used by the first transmission apparatus to decrypt the audio-video data back-transmitted by the second transmission apparatus is further generated, and is represented by KDP5-3 herein.

The source device uses CKEK5-1 to encrypt CK5-1 to obtain an encrypted content key, which is represented by ECK5-1 herein. The source device uses CKEK5-1 to encrypt CK5-2 to obtain an encrypted content key, which is represented by ECK5-2 herein. The source device uses CKEK5-2 to encrypt CK5-2 to obtain an encrypted content key, which is represented by ECK5-3 herein. Herein, an example in which the KDP5-2 includes a version (KDP version), a stream identifier StreamId5-1 of audio-video data (a stream identifier of original audio-video data), a device identifier DeviceId5-1 (a device identifier of the second transmission apparatus), an encrypted content key ECK5-1, and Counte5-1 is used for description. Herein, an example in which the KDP5-2 includes a version (KDP version), a stream identifier StreamId5-2 (a stream identifier of the back-transmitted audio-video data), a device identifier DeviceId5-1 (a device identifier of the second transmission apparatus), an encrypted content key ECK5-2, and Counter5-2 is used for description. Herein, an example in which KDP5-3 includes a version (KDP version), a stream identifier StreamId5-2 (a stream identifier of the back-transmitted audio-video data) of audio-video data, a device identifier DeviceId5-2 (a device identifier of the first transmission apparatus), an encrypted content key ECK5-3, and Counter5-2 is used for description.

The source device may generate audio-video data, receive audio-video data from a content delivery network, or the like. The audio-video data is encapsulated to obtain an audio-video packet. For ease of differentiation, a data stream to which an audio-video packet obtained by encapsulating audio-video data belongs is referred to as a first audio-video stream herein. In this way, the source device processes the first audio-video stream to obtain the second audio-video stream. The processing may include encrypting and adding KDP5-1, KDP5-2, and KDP5-3.

704: The source device encrypts the audio-video packet that belongs to the first audio-video stream by using CK5-1. Optionally, to further improve security of audio-video data transmission, the audio-video packet that belongs to the first audio-video stream may be encrypted by using CK5-1 and Counter5-1.

705: The source device inserts KDP5-1, KDP5-2, and KDP5-3 into the encrypted first audio-video stream to obtain a second audio-video stream.

In an example, KDP5-1, KDP5-2, and KDP5-3 may be inserted into the vertical blanking area, the video area, or the horizontal blanking area at an interval of a specific quantity of audio-video packets. In another example, a specified quantity of KDP5-1, KDP5-2, and KDP5-3 may be inserted into the vertical blanking area at a start stage of the audio-video stream, and subsequently, KDP5-1, KDP5-2, and KDP5-3 are inserted into the vertical blanking area, the video area, or the horizontal blanking area at an interval of a specific quantity of audio-video packets.

706: The source device sends the second audio-video stream to the second transmission apparatus by using the first transmission apparatus, so that the second transmission apparatus receives the second audio-video stream from the source device. For example, the source device may further send the second audio-video stream to the second transmission apparatus by using one or more router devices. The router device only forwards the second audio-video stream, and does not encrypt or decrypt the second audio-video stream, so that security of audio-video data transmission can be improved.

707: The second transmission apparatus filters KDP5-1 and KDP5-2 from the second audio-video stream.

For example, it may be determined, according to the device identifier DeviceId5-1 included in both KDP5-1 and KDP5-2, that the two key distribution packets are used by the second transmission apparatus; and it may be determined, according to the stream identifier StreamId5-1 included in KDP5-1, that KDP5-1 is used the second transmission apparatus for decryption.

708: The second transmission apparatus obtains Counter5-1 from KDP5-1, and decrypts ECK5-1 by using EKCK5-1 to obtain CK5-1.

709: The second transmission apparatus decrypts the second audio-video stream by using CK5-1 and Counter5-1 to obtain the first audio-video stream.

710: The second transmission apparatus parses the first audio-video stream to obtain audio-video data, and outputs the audio-video data.

711: The second transmission apparatus obtains Counter5-2 and ECK5-2 from KDP5-2, and decrypts ECK5-2 by using EKCK5-1 to obtain CK5-2.

712: The second transmission apparatus encrypts the first audio-video stream by using CK5-2 and Counter5-2.

In some embodiments, before the first audio-video stream is encrypted, the first audio-video stream is transformed and then encrypted.

713: The second transmission apparatus adds KDP5-3 to the encrypted first audio-video stream to obtain a third audio-video stream.

714: The second transmission apparatus sends the third audio-video stream to the first transmission apparatus.

715: The first transmission apparatus receives the third audio-video stream, and filters KDP5-3 from the third audio-video stream.

716: The first transmission apparatus obtains Counter5-2 and ECK5-3 from KDP5-3, and decrypts ECK5-3 by using EKCK5-2 to obtain CK5-2; and

717: The first transmission apparatus decrypts the third audio-video stream by using CK5-2 and Counter5-2 to obtain the first audio-video stream.

718: The first transmission apparatus parses the first audio-video stream to obtain audio-video data, and outputs the audio-video data. For example, video data is rendered to a display, and/or audio data is rendered to a speaker.

According to the foregoing solution, the source device performs identity authentication on and negotiate a key with the sink device and an upstream receiving device to which the audio-video stream is to be back-transmitted, and does not need to perform authentication on or negotiate a key with another device that does not need to output the audio-video stream or perform transformation processing. During audio-video stream transmission, a key distribution packet used to decrypt an encrypted audio-video stream and a key distribution packet used to encrypt audio-video stream to be back-transmitted are generated for the sink device, and a key distribution packet used to encrypt the audio-video stream to be back-transmitted is generated for the receiving device for decryption. Therefore, a device that does not need to be output on the transmission path and a device that performs transformation processing cannot know the key and cannot decrypt the audio-video stream. Therefore, after receiving the encrypted audio-video stream, the sink device may output the audio-video stream, and may further perform transformation processing on the audio-video stream that needs to be sent to an upstream receiving device. Not only the back-transmission scenario is supported, but also the transmission security and transmission performance of the audio-video stream are improved.

The following describes structures of devices in the embodiments of this application with reference to the accompanying drawings. It may be understood that, to implement the functions in the foregoing method embodiments, each device may include a corresponding hardware structure and/or software module for implementing each function. A person skilled in the art should be easily aware that, modules and method steps in the examples described with reference to embodiments disclosed in this application can be implemented in this application by hardware or a combination of hardware and computer software. Whether a function is performed by hardware or hardware driven by computer software depends on particular application scenarios and design constraints of technical solutions.

Figure 8A:
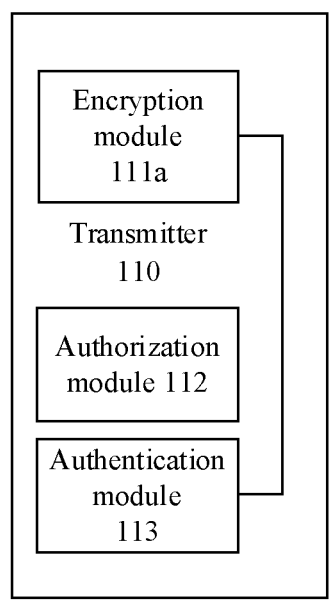
FIG. 8A is a schematic diagram of a possible structure of a transmitter according to an embodiment of this application.

Source Device:

A transmitter is built in the source device 100. FIG. 8A is a schematic diagram of a possible structure of a transmitter. The transmitter 110 may include an encryption module 111, an authorization module 112, and an authentication module 113.

The authentication module 113 in the transmitter 110 is responsible for authenticating all downstream receiver ends (including devices having an audio-visual transformation or output function, such as a sink device, a daisy chain device, and an audio-video processor device). The authentication module 113 is further configured to negotiate an encryption key with all downstream receiver ends. The authorization module 112 is configured to receive authorization control information from a content authorization system, and perform authorization control on the sink device, the daisy chain device, the audio-video processor device, and the like according to the authorization control information. The encryption module 111 is configured to generate a content key, generate a key distribution packet, and encrypt to-be-transmitted audio-video data.

Figure 8B:
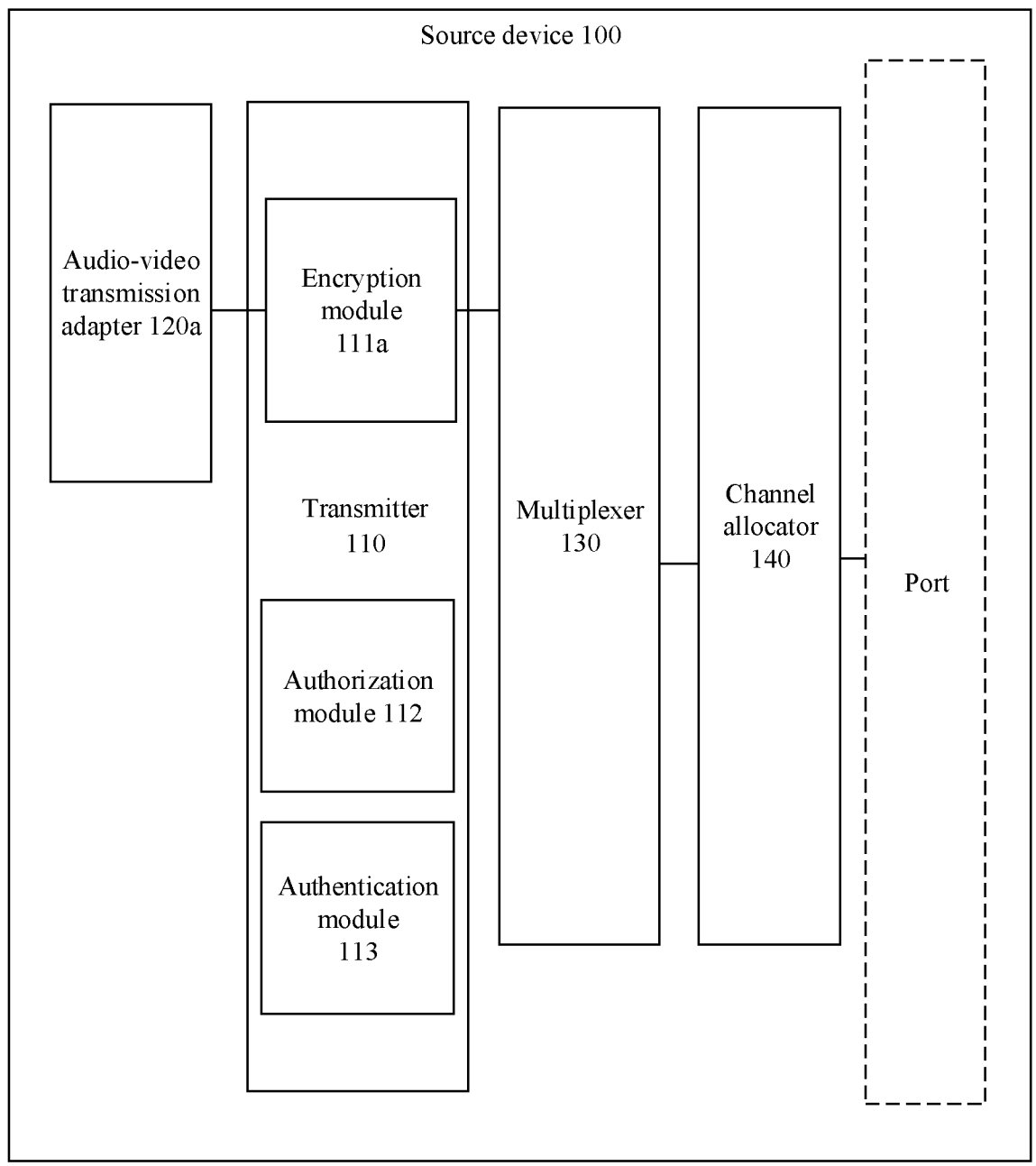
FIG. 8B is a schematic diagram of a first possible structure of a source device according to an embodiment of this application.

Refer to FIG. 8B. In addition to the transmitter 110, the source device 100 may further include an audio-video transmission adapter 120, where the audio-video transmission adapter 120 is configured to encapsulate the received audio data and video data into an audio-video packet, and send the audio-video packet to the transmitter. In an example, the source device 100 may further include a multiplexer 130 and a channel allocator 140. The multiplexer 130 is configured to multiplex and combine a plurality of channels of audio-video streams into one channel of downlink audio-video stream, and send the one channel of downlink audio-video stream to the channel allocator 140. The channel allocator 140 is configured to allocate one or more channels to transmit the downlink audio-video stream on a plurality of downlink primary links, and send the audio-video stream to a downstream transmission apparatus through a port corresponding to the allocated channel.

Figure 8C:
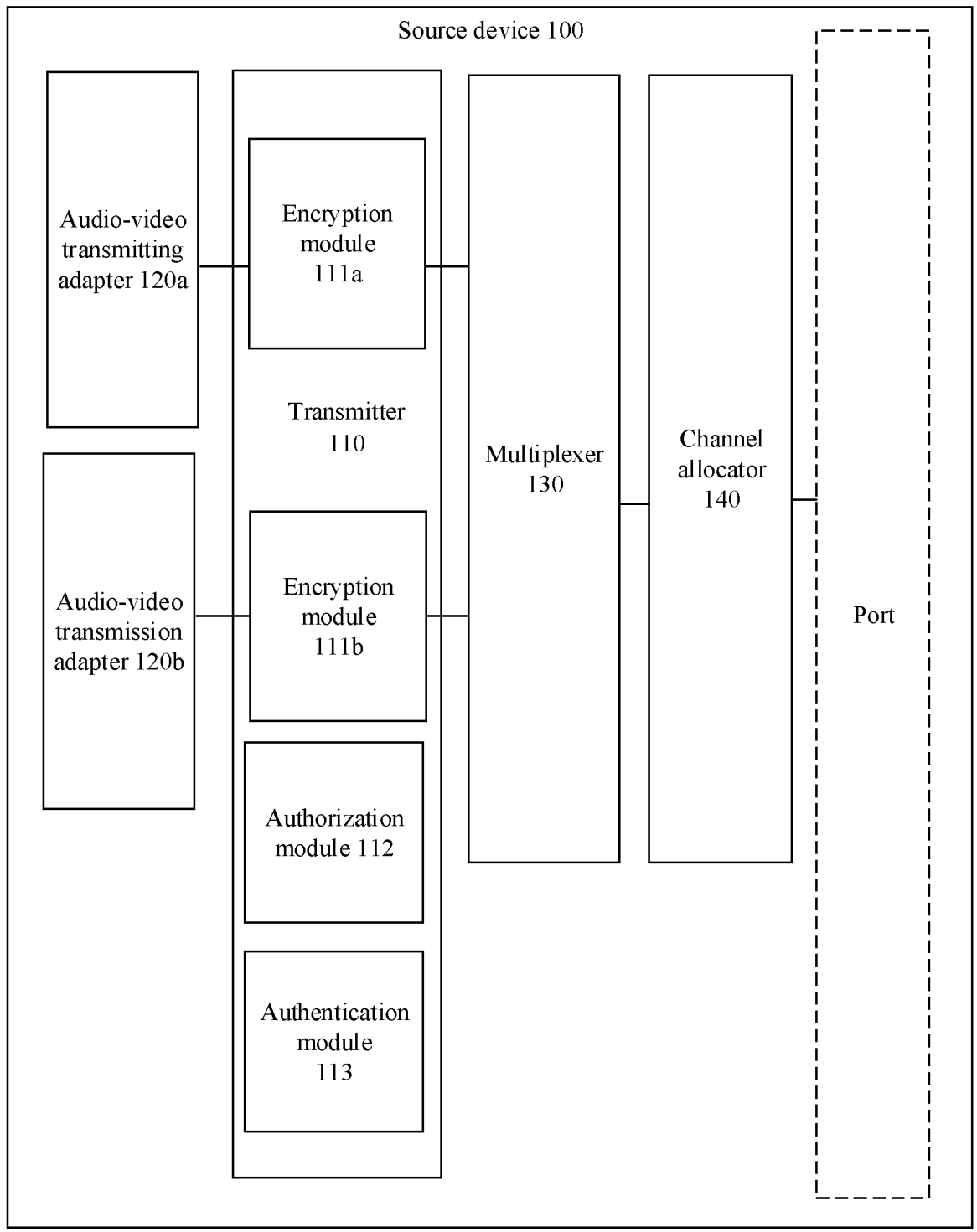
FIG. 8C is a schematic diagram of a second possible structure of a source device according to an embodiment of this application.

In some embodiments, the transmitter 110 may include a plurality of encryption modules, to encrypt a plurality of audio-video streams. As shown in FIG. 8C, an example in which the source device includes two audio-video signal sources is used. The transmitter 110 includes two encryption modules: an encryption module 111a and an encryption module 111b. The source device 100 includes two audio-video transmission adapters 120 corresponding to two audio-video streams, which are respectively referred to as an audio-video transmission adapter 120a and an audio-video transmission adapter 120b for ease of differentiation.

Figure 8D:
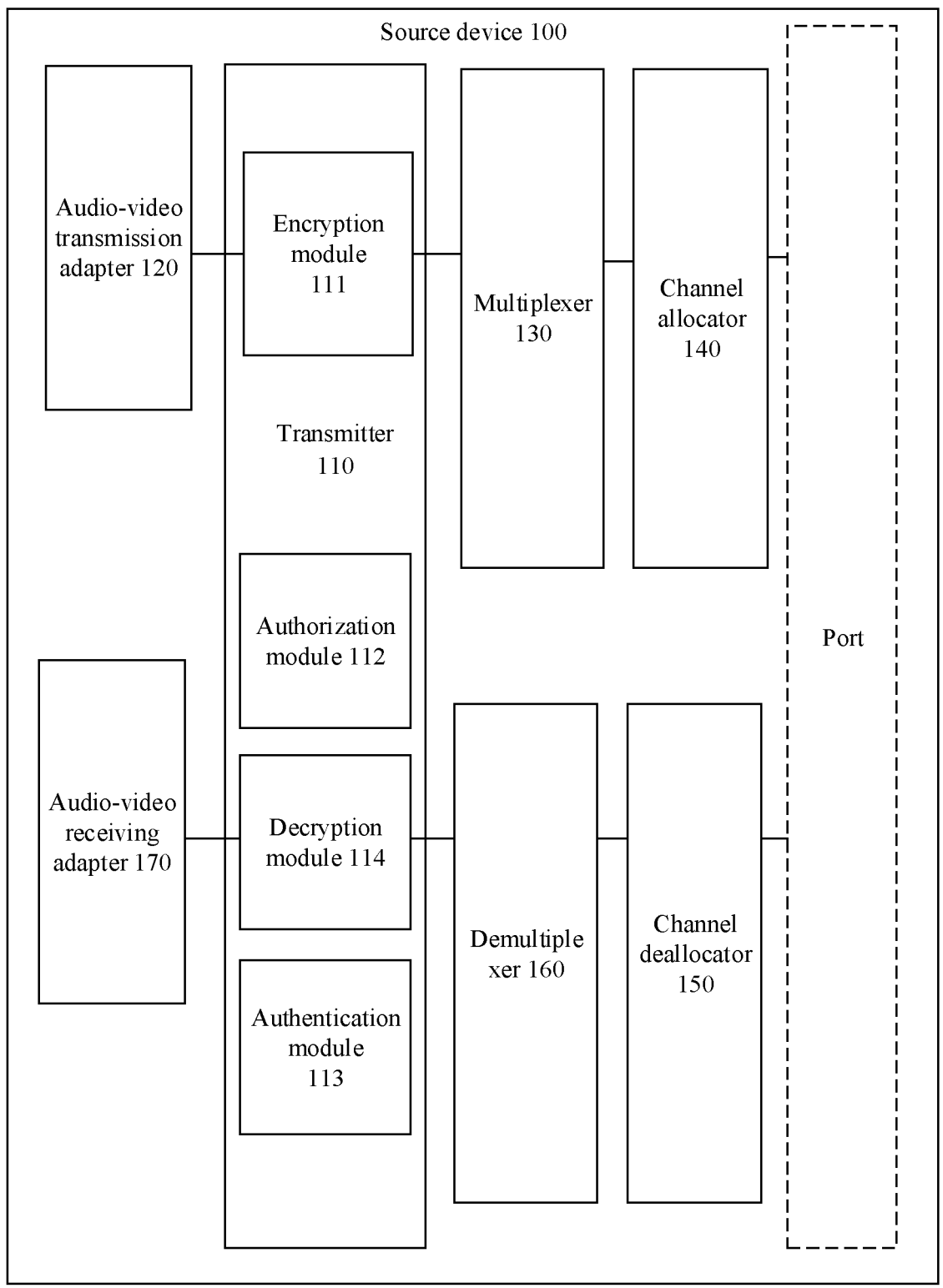
FIG. 8D is a schematic diagram of a third possible structure of a source device according to an embodiment of this application.

In some embodiments, the source device 100 may further have a video output function. For example, in a back-transmission scenario, the source device 100 is used as an upstream receiving device of the sink device. Further, refer to FIG. 8D. The transmitter 110 may further include a decryption module 114, configured to decrypt received encrypted audio-video data. The source device 100 may further include a channel deallocator 150, a demultiplexer 160, and an audio-video receiving adapter 170. It should be understood that FIG. 8B to FIG. 8D are merely examples, and the source device 100 may include more or fewer components. The channel deallocator 150 is configured to combine audio-video packets that belong to one audio-video stream and that are received from one or more primary link channels. The demultiplexer 160 is configured to demultiplex different audio-video streams in a received video stream into different audio-video streams. The audio-video receiving adapter 170 is configured to parse an audio-video packet of an audio-video stream to obtain audio-video data, and output the audio-video data.

Figure 8E:
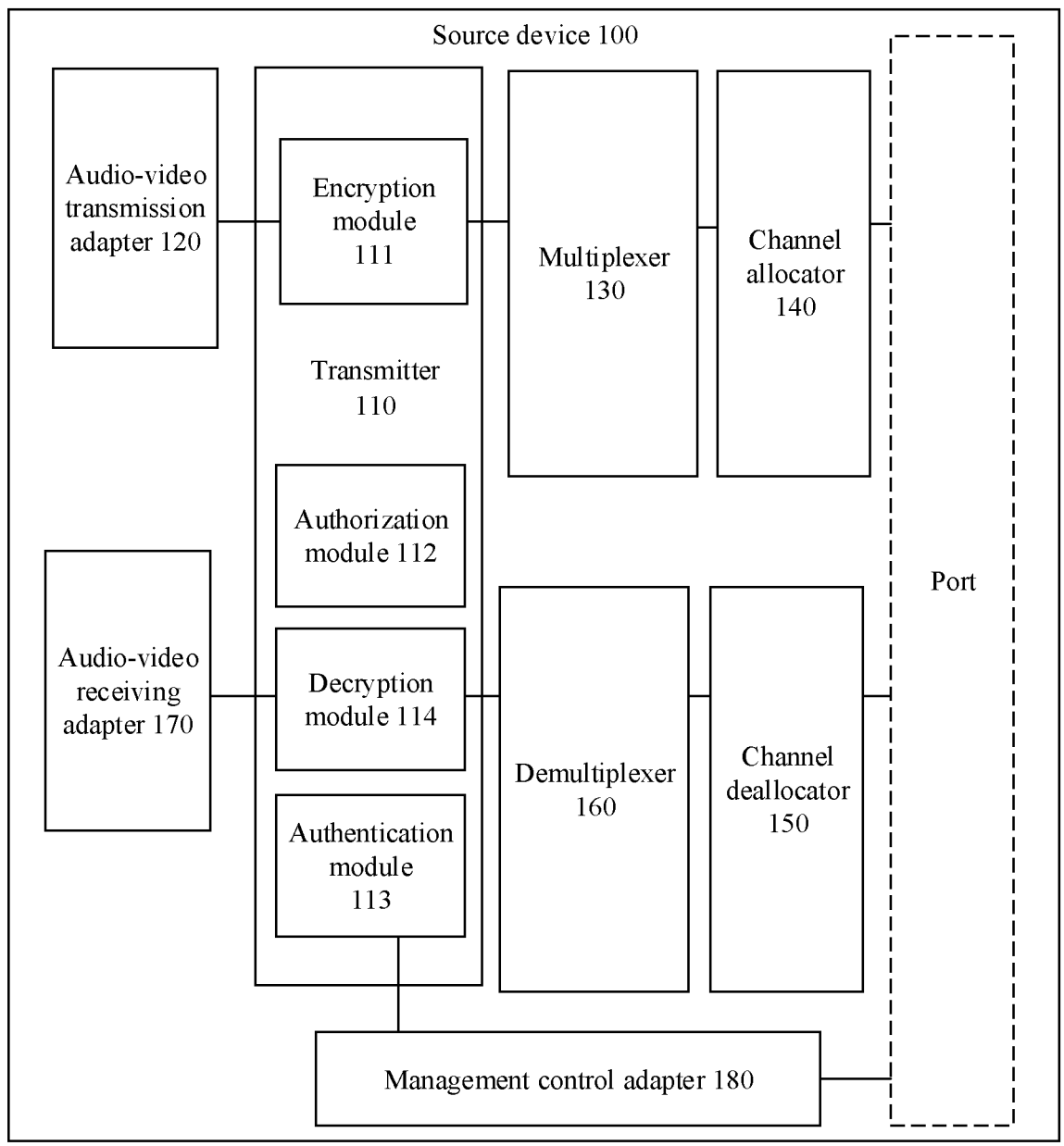
FIG. 8E is a schematic diagram of a fourth possible structure of a source device according to an embodiment of this application.

In some embodiments, the source device 100 may further include a management control adapter 180, configured to establish an auxiliary link for identity authentication and key negotiation between the transmitter and the sink device. It should be noted that, in this application, the auxiliary link supports routing. It may be understood that the source device and the sink device may perform cross-device negotiation. For example, a plurality of routes are included between the source device and the sink device, and the auxiliary link may be established by using a router, so that the source device performs identity authentication on the sink device and negotiates a key with the sink device. For example, refer to the source device 100 shown in FIG. 8E.

Figure 9A:
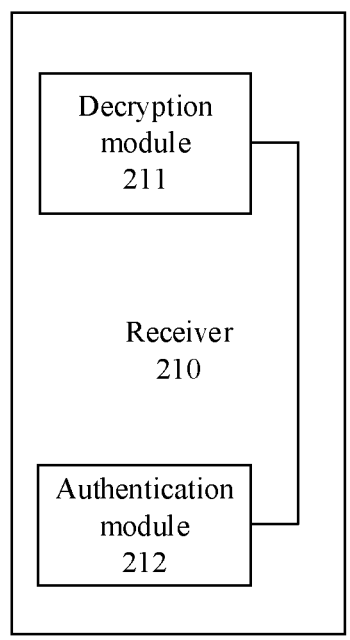
FIG. 9A is a schematic diagram of a possible structure of a receiver according to an embodiment of this application.

Sink Device:

A receiver is built in the sink device 200. FIG. 9A is a schematic diagram of a possible structure of a receiver. The receiver 210 may include a decryption module 211 and an authentication module 212. The receiver 210 may include one or more decryption modules 211.

The authentication module 212 in the receiver 210 is configured to accept identity authentication from the source device, and negotiate an encryption key with the source device. The decryption module 211 is configured to decrypt a received encrypted audio-video stream.

Figure 9B:
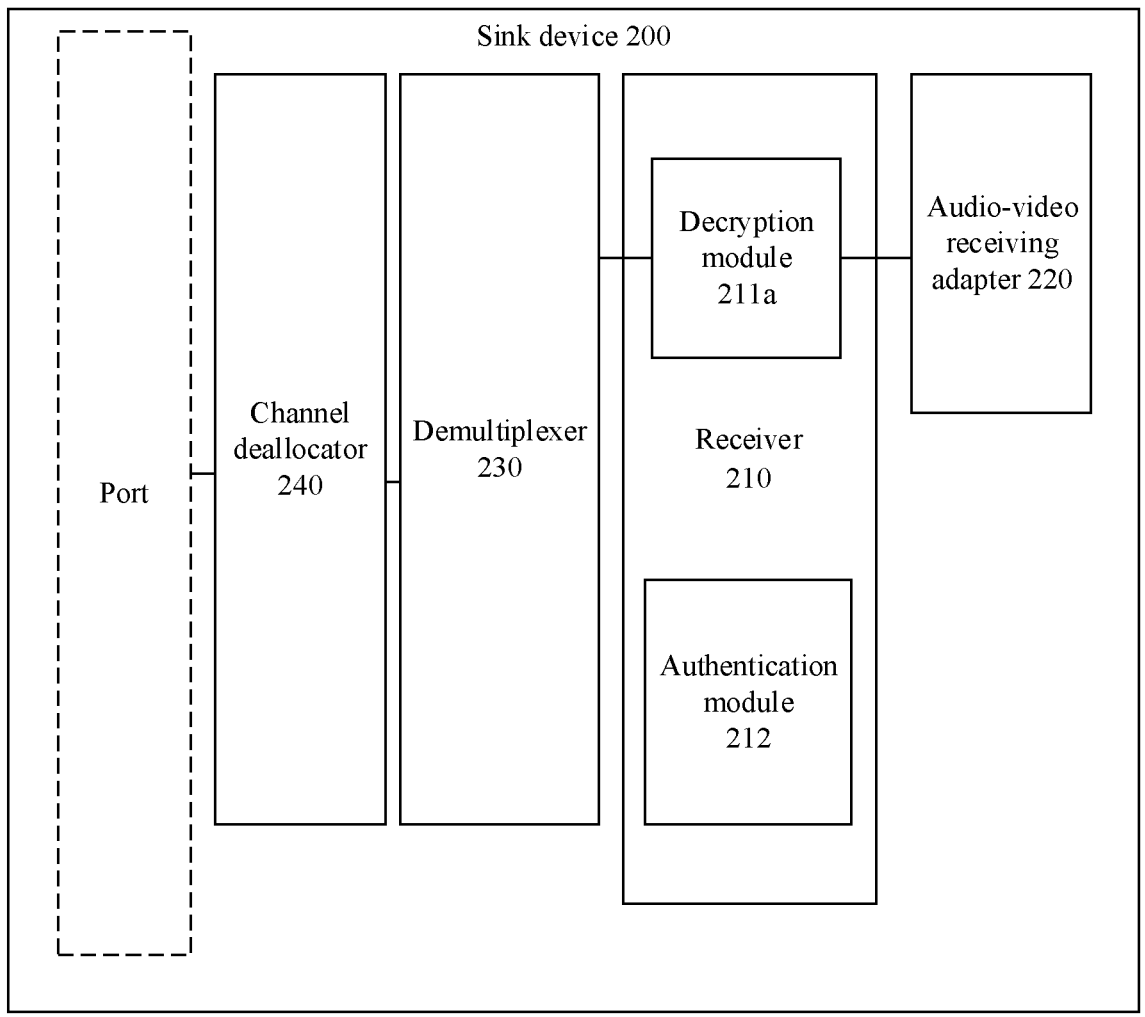
FIG. 9B is a schematic diagram of a first possible structure of a sink device according to an embodiment of this application.

Refer to FIG. 9B. In addition to the receiver 210, the sink device 200 may further include an audio-video receiving adapter 220. The audio-video receiving adapter 220 is configured to parse the audio-video stream decrypted by the receiver 210 to obtain audio-video data, to output the audio-video data to an audio-video signal output apparatus.

In an example, the sink device 200 may further include a demultiplexer 230 and a channel deallocator 240. The channel deallocator 240 is configured to combine a plurality of audio-video streams received from one or more primary link channels into one downlink audio-video stream. The demultiplexer 230 is configured to demultiplex different audio-video streams in a received downlink audio-video stream into different audio-video streams.

Figure 9C:
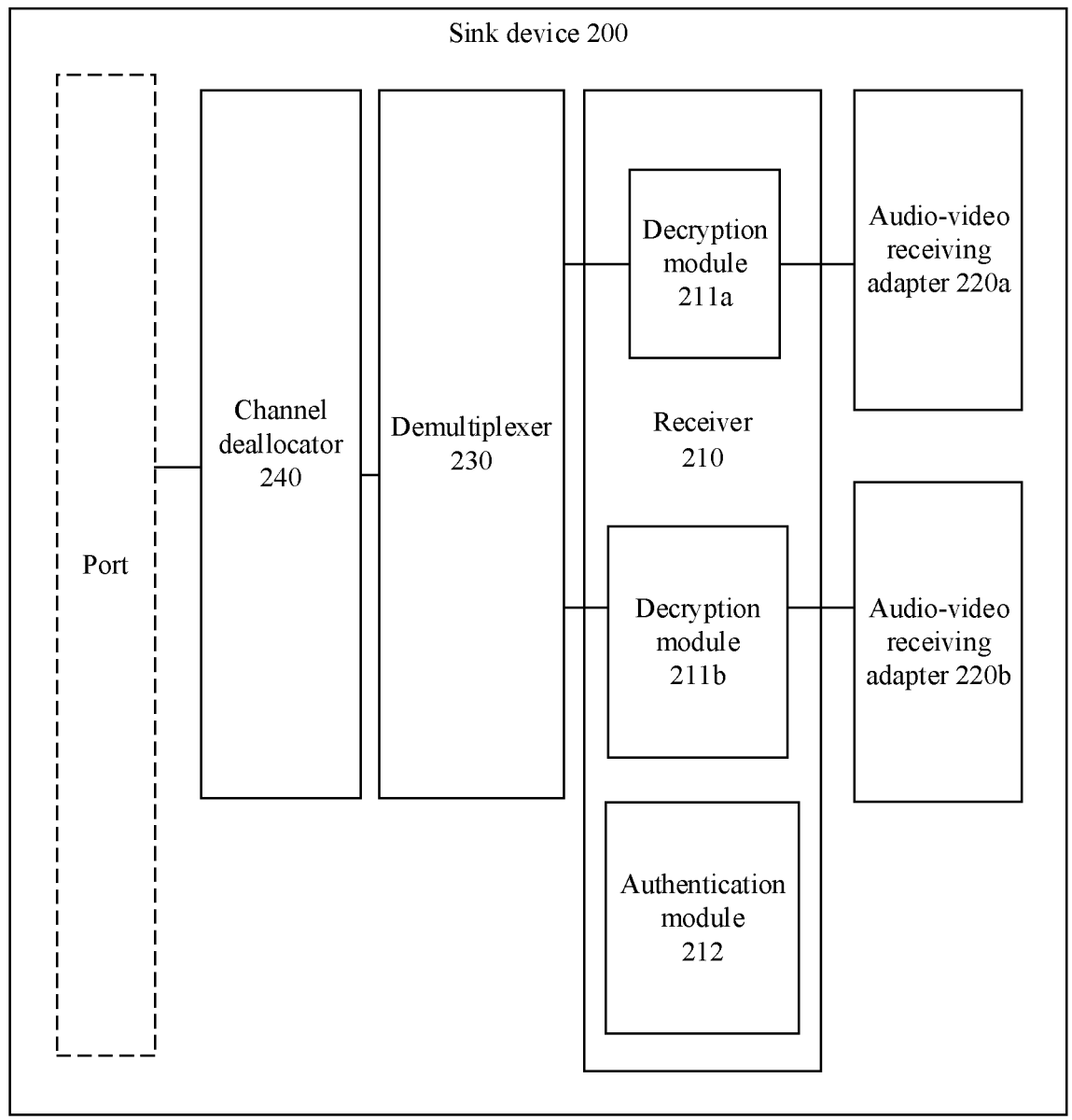
FIG. 9C is a schematic diagram of a second possible structure of a sink device according to an embodiment of this application.

In some embodiments, the receiver 210 includes a plurality of decryption modules, to support decryption of a plurality of audio-video streams. Refer to FIG. 9C. An example in which a sink device outputs two audio-video signal sources is used. The receiver 210 includes two decryption modules, which are respectively referred to as a decryption module 211a and a decryption module 211b for ease of differentiation. The sink device 200 includes two audio-video receiving adapters 220 corresponding to two audio-video streams. For ease of differentiation, the two audio-video receiving adapters are respectively referred to as an audio-video receiving adapter 220a and an audio-video receiving adapter 220b.

Figure 9D:
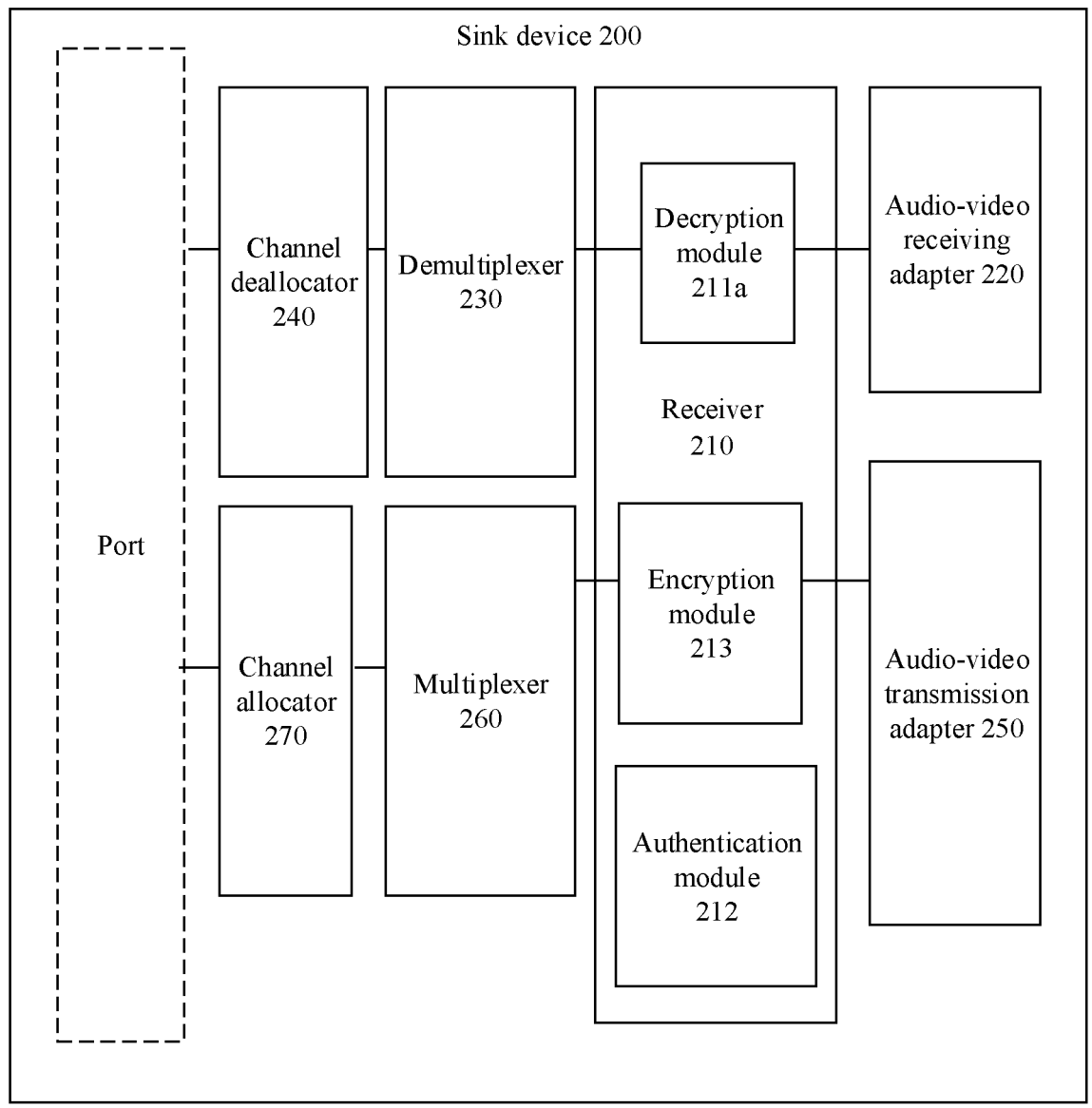
FIG. 9D is a schematic diagram of a third possible structure of a sink device according to an embodiment of this application.

In some embodiments, the sink device 200 may further have a function of back-transmitting an audio-video stream to an upstream receiving device. Further, refer to FIG. 9D, the receiver 210 may further include an encryption module 213, configured to decrypt the received encrypted audio-video data. The sink device 200 may further include a channel allocator 270, a multiplexer 260, and an audio-video transmission adapter 250. The multiplexer 260 is configured to multiplex a plurality of audio-video streams into one uplink audio-video stream, and send the uplink audio-video stream to the channel allocator 270. The channel allocator 270 is configured to allocate one or more uplink primary link channels in a plurality of uplink primary link channels to transmit the uplink audio-video stream, and send the audio-video stream to a downstream transmission apparatus through a port. It should be understood that FIG. 9B, FIG. 9C, or FIG. 9D is merely an example, and the sink device 200 may include more or fewer components.

Figure 9E:
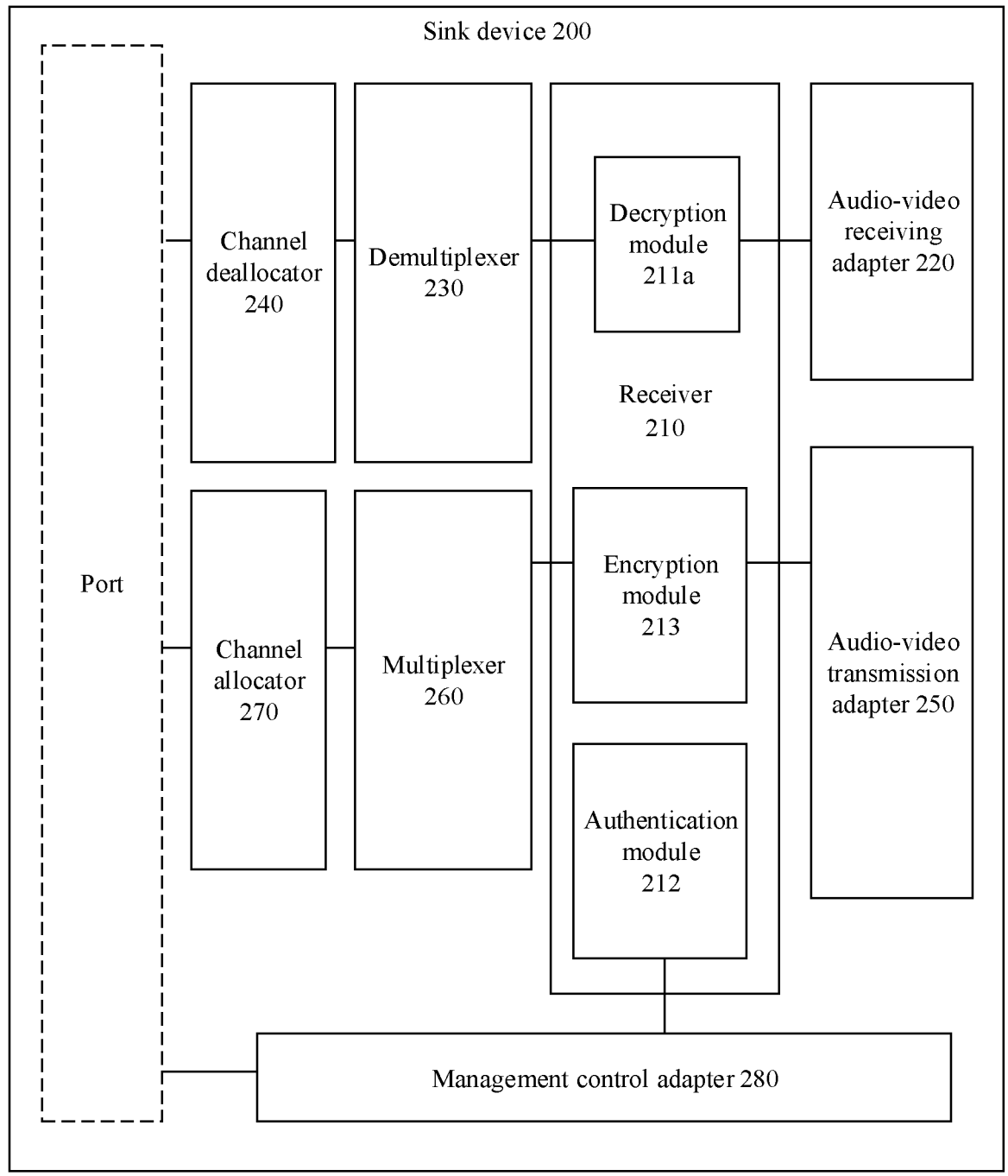
FIG. 9E is a schematic diagram of a fourth possible structure of a sink device according to an embodiment of this application.

In some embodiments, the sink device 200 may further include a management control adapter 280, configured to establish an auxiliary link for key negotiation with the source device 100. It should be noted that, in this application, the auxiliary link supports routing. It may be understood that the source device and the sink device may perform cross-device negotiation. For example, a plurality of routes are included between the source device and the sink device, and the auxiliary link may be established by using a router, so that the sink device and the source device perform key negotiation. For example, refer to the sink device 200 shown in FIG. 9E.

Figure 10:
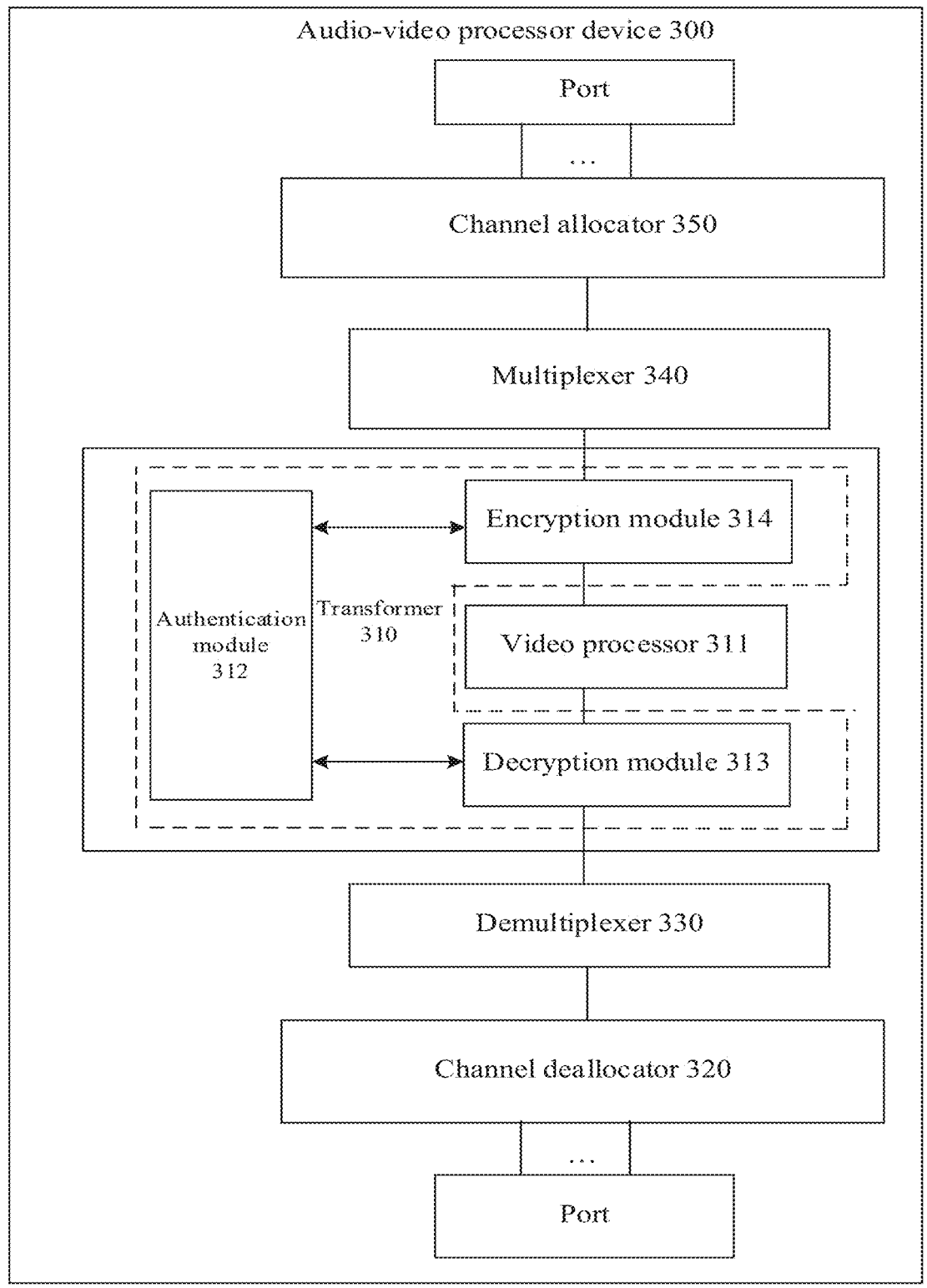
FIG. 10 is a schematic diagram of a possible structure of an audio-video processor device according to an embodiment of this application.

Audio-Video Processor Device:

The audio-video processor device 300 is configured to process and forward an audio-video stream. Refer to FIG. 10. A transformer 310 and a video processor 311 are built in the audio-video processor device 300. The transformer 310 includes an authentication module 312, a decryption module 313, and an encryption module 314. The authentication module 312 is configured to accept authentication from the source device, and negotiate an encryption key with the source device. The decryption module 313 is configured to decrypt a received encrypted audio-video stream. The encryption module 313 is configured to decrypt an audio-video stream sent to the downstream receiving device. The video processor is configured to perform audio-video transformation processing on the audio-video stream decrypted by the decryption module 312, and send the audio-video stream to the encryption module 314 for encryption.

In some embodiments, the audio-video processor device 300 may further include a channel deallocator 320, a demultiplexer 330, a multiplexer 340, and a channel allocator 350. In some embodiments, the audio-video processor device 300 may further include one or more ports (which may be referred to as receive ports) configured to receive audio-video streams, and one or more ports (which may be referred to as transmit ports) configured to send audio-video data. It should be understood that FIG. 10 is merely an example, and the audio-video processor device 300 may include more or fewer components.

In some embodiments, the audio-video processor device may further include a management control adapter (not shown in FIG. 10), configured to establish an auxiliary link for key negotiation with the source device 100. It should be noted that, in this application, the auxiliary link supports routing. It may be understood that the source device and the audio-video processor device may perform cross-device negotiation. For example, a plurality of routes are included between the source device and the sink device, and the auxiliary link may be established by using a router, so that the audio-video processor device and the source device perform key negotiation.

Daisy Chain Device:

The daisy chain device may be considered as a special sink device, and is not only configured to output an audio-video stream, but also configured to forward the audio-video stream. The daisy chain device can have a built-in receiver certificate. The daisy chain device accepts authentication from the source device, and negotiates an encryption key with the source device. In a possible example, the daisy chain device may further have a video transformation processing function. In this case, the daisy chain device may have a built-in receiving transformer certificate.

Figure 11:
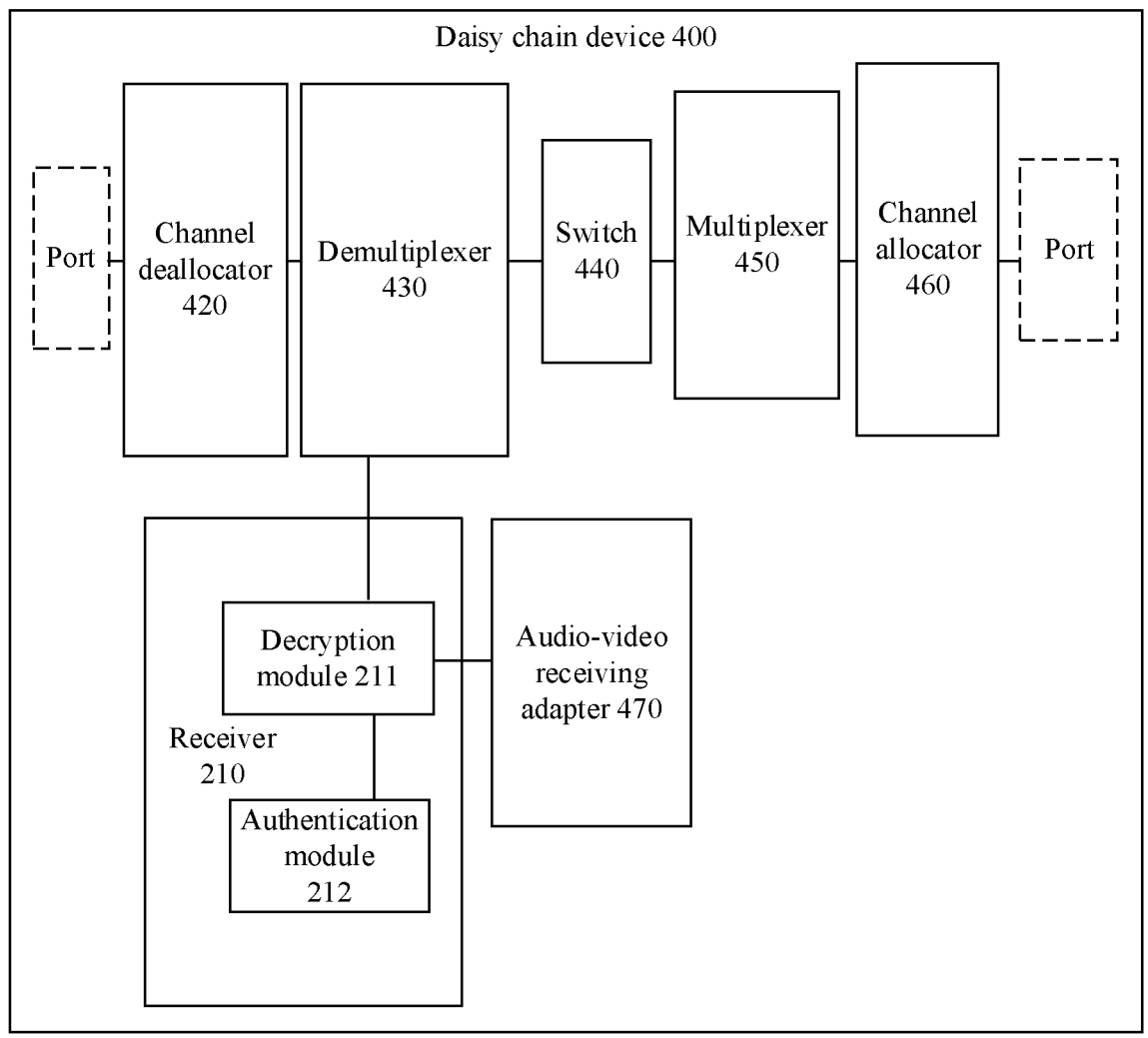
FIG. 11 is a schematic diagram of a possible structure of a daisy chain device according to an embodiment of this application.

The daisy chain device 400 includes a receiver. For a structure of the receiver, refer to FIG. 9A. Refer to FIG. 11. The daisy chain device 400 may further include a channel deallocator 420, a demultiplexer 430, a switch 440, a multiplexer 450, a channel allocator 460, and an audio-video receiving adapter 470. The switch 440 is configured to perform switching processing on a demultiplexed audio-video stream, to determine a next-hop transmission device of the audio-video stream. It should be understood that FIG. 11 is merely an example, and the daisy chain device 400 may include more or fewer components.

In some embodiments, the daisy chain device may further include a management control adapter (not shown in FIG. 10), configured to establish an auxiliary link for key negotiation with the source device 100. It should be noted that, in this application, the auxiliary link supports routing. It may be understood that the source device and the daisy chain device may perform cross-device negotiation. For example, a plurality of routes are included between the source device and the sink device, and the auxiliary link may be established by using a router, so that the daisy chain device and the source device perform key negotiation.

Figure 12:
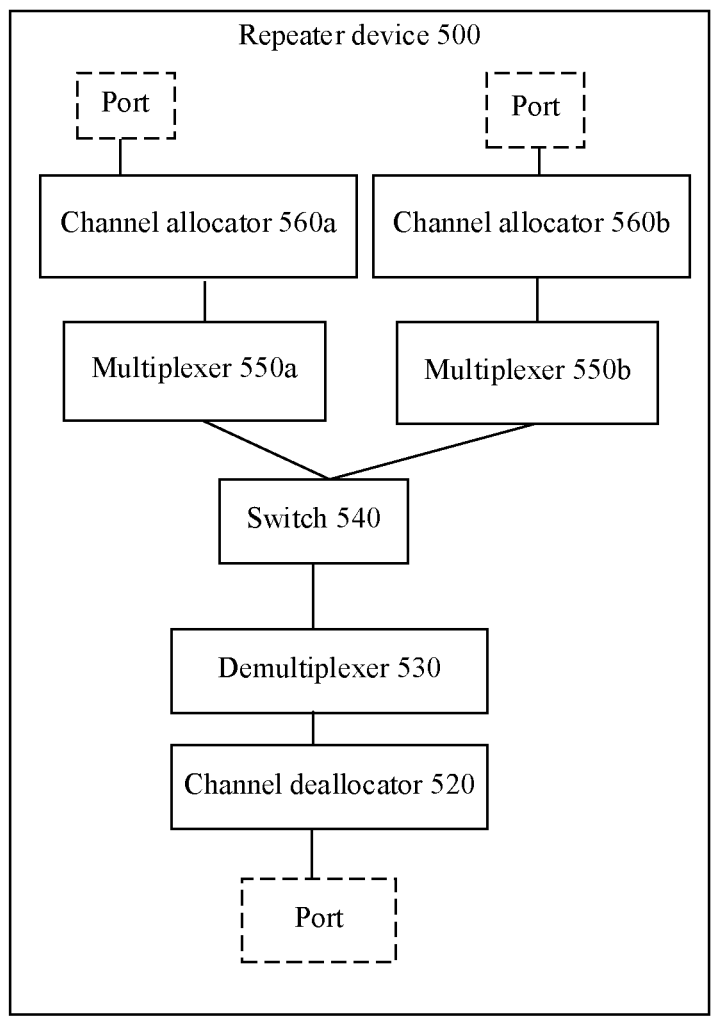
FIG. 12 is a schematic diagram of a possible structure of a repeater device according to an embodiment of this application.

Repeater Device:

The repeater device is configured to distribute an audio-video stream, and does not require audio-video stream encryption and decryption functions or a video processing function. FIG. 12 is a schematic diagram of a possible structure of a repeater device. Refer to FIG. 12. The repeater device 500 may include a channel deallocator 520, a demultiplexer 530, a switch 540, a multiplexer 550a, a multiplexer 550b, a channel allocator 560a, and a channel allocator 560b. The switch 540 is configured to perform switching processing on a demultiplexed audio-video stream, and determine transmission devices to which the audio-video stream needs to be sent. It should be understood that FIG. 12 is merely an example, and the repeater device 500 may include more or fewer components.

The following describes in detail the solutions provided in the embodiments of this application with reference to the foregoing described structures of the apparatuses and the foregoing descriptions of the application scenarios.

Figure 13A:
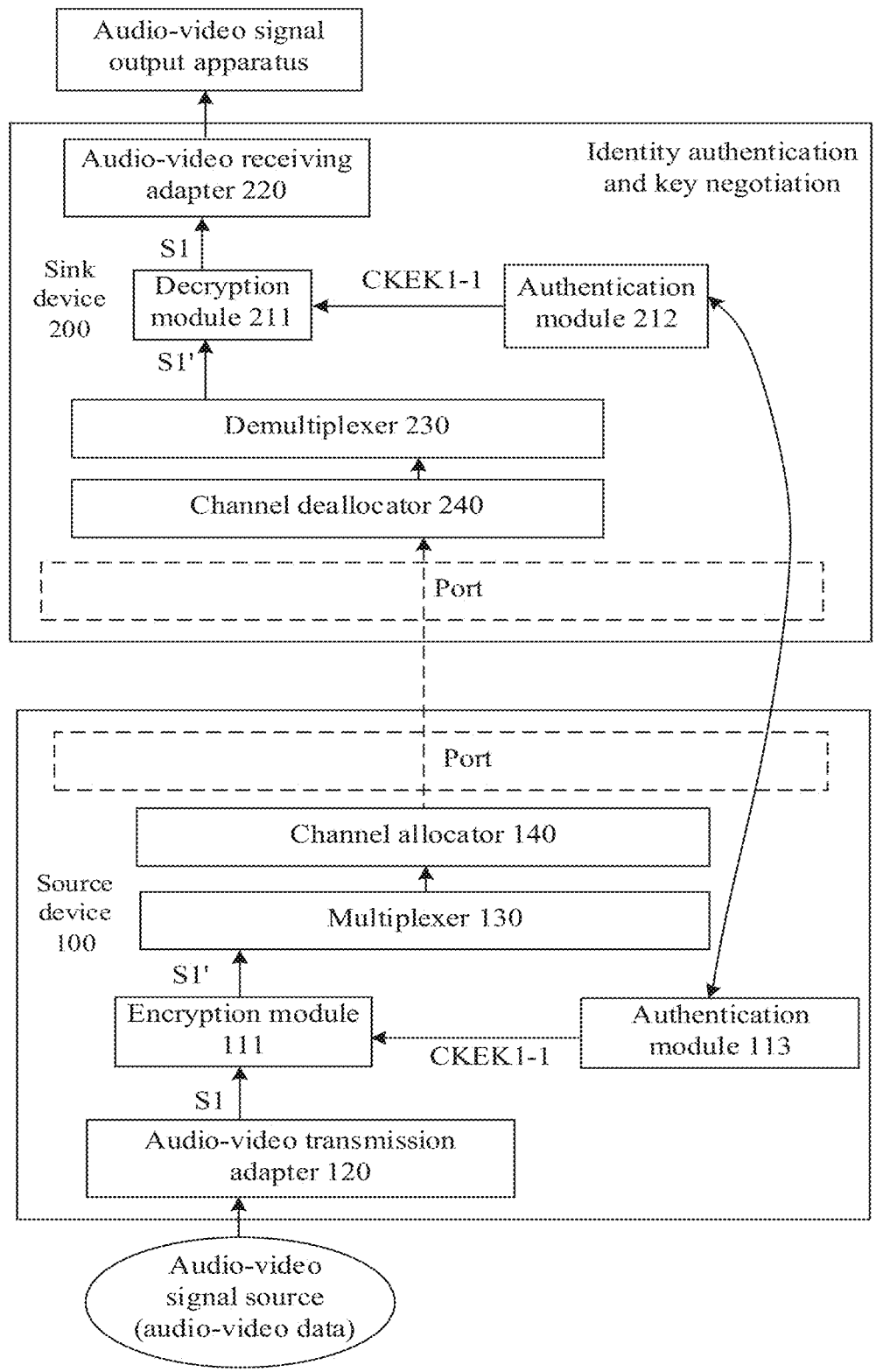
FIG. 13A is a schematic flowchart of a first possible scenario according to an embodiment of this application.

Refer to FIG. 13A. The first possible scenario provided in the embodiments of this application is described. A source device sends audio-video data to a sink device. For a structure of the source device, refer to FIG. 8B.

An authentication module 113 performs identity authentication on the sink device, and negotiates an encryption key CKEK1-1 with the sink device. For example, the authentication module 113 may perform identity authentication on and negotiate a key with the sink device by using an auxiliary link established between the source device and a management control adapter included in the sink device. An authorization module 112 performs authorization control to determine whether to send the to-be-sent audio-video data to the sink device. An audio-video transmission adapter 120 is configured to encapsulate the input audio-video data into an audio-video packet. The audio-video stream formed by the audio-video packets is represented by S1. S1 is input to a transmitter 110. An encryption module in the transmitter 110 encrypts each audio-video packet in S1 and inserts a key distribution packet, and outputs an encrypted audio-video stream S1'. For example, the encryption module 111 generates a content key CK1-1, and encrypts CK1-1 by using CKEK1-1 to obtain an encrypted content key ECK1-1. The encryption module 111 encrypts an audio-video packet that belongs to S1 by using CK1-1 and Counter1-1, and then inserts a key distribution packet KDP1-1 into the encrypted S1 to obtain S1'. The key distribution packet KDP1-1 includes ECK1-1 and Counter1-1. The audio-video stream S1' is separately processed by a multiplexer 130 and a channel allocator 140, and then sent to a sink device 200 through a port. A channel deallocator 240 and a demultiplexer 230 in the sink device 200 process the audio-video stream from the source device 100 to obtain S1', and then a decryption module 211 performs decryption processing to obtain the audio-video stream S1. For example, the decryption module 211 filters KDP1-1 from the audio-video stream S1'. The decryption module 211 obtains ECK1-1 and Counter1-1 from KDP1-1. The decryption module 211 decrypts ECK1-1 by using CKEK1-1 to obtain CK1-1, and then decrypts S1' by using CK1-1 and Counter1-1 to obtain the audio-video stream S1. The audio-video stream S1 is parsed and processed by the audio-video receiving adapter 220 to obtain audio-video data, and the audio-video data is output to an audio-video signal output apparatus for output.

Figures 1, 13B:
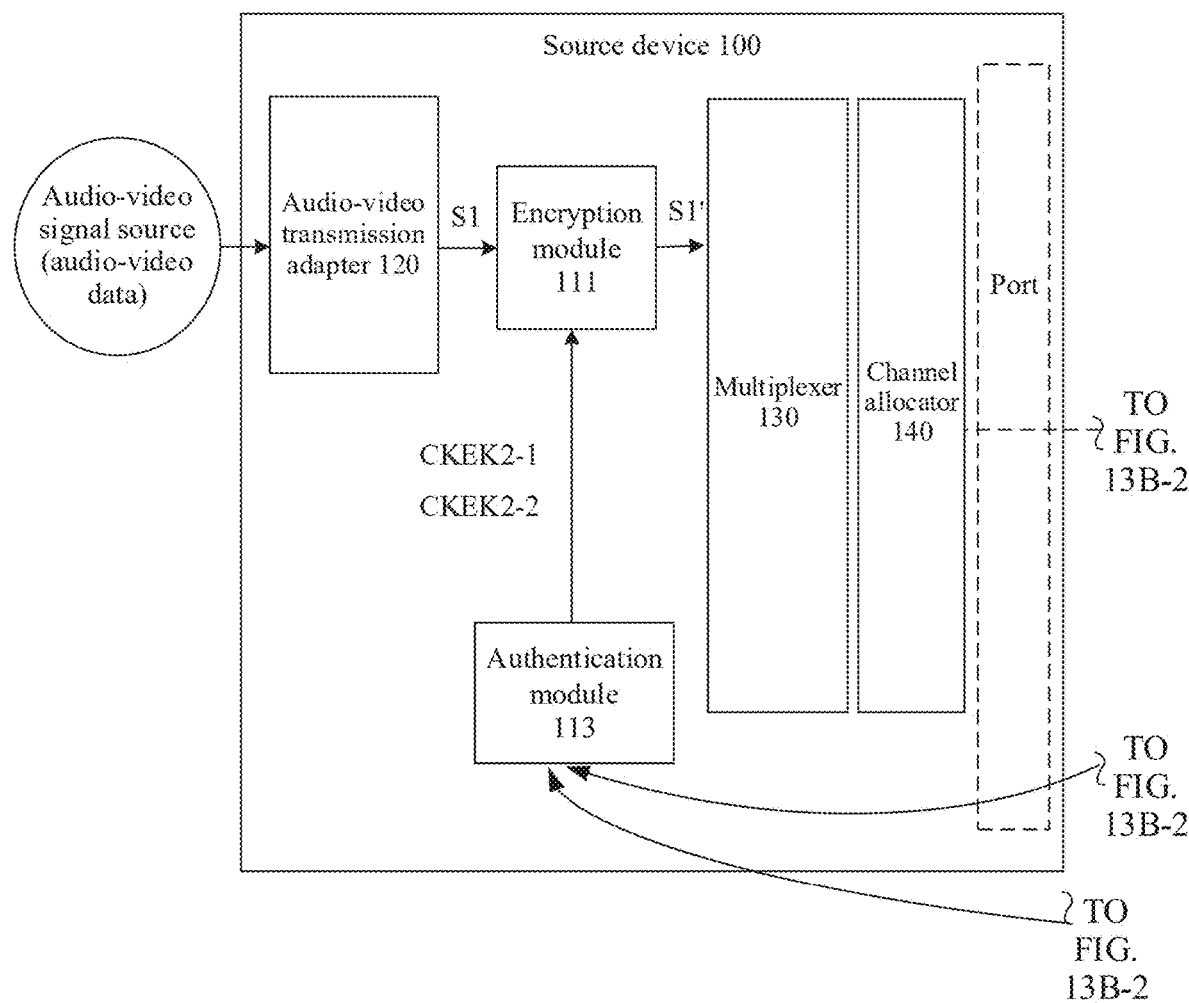
Figures 2, 13B:
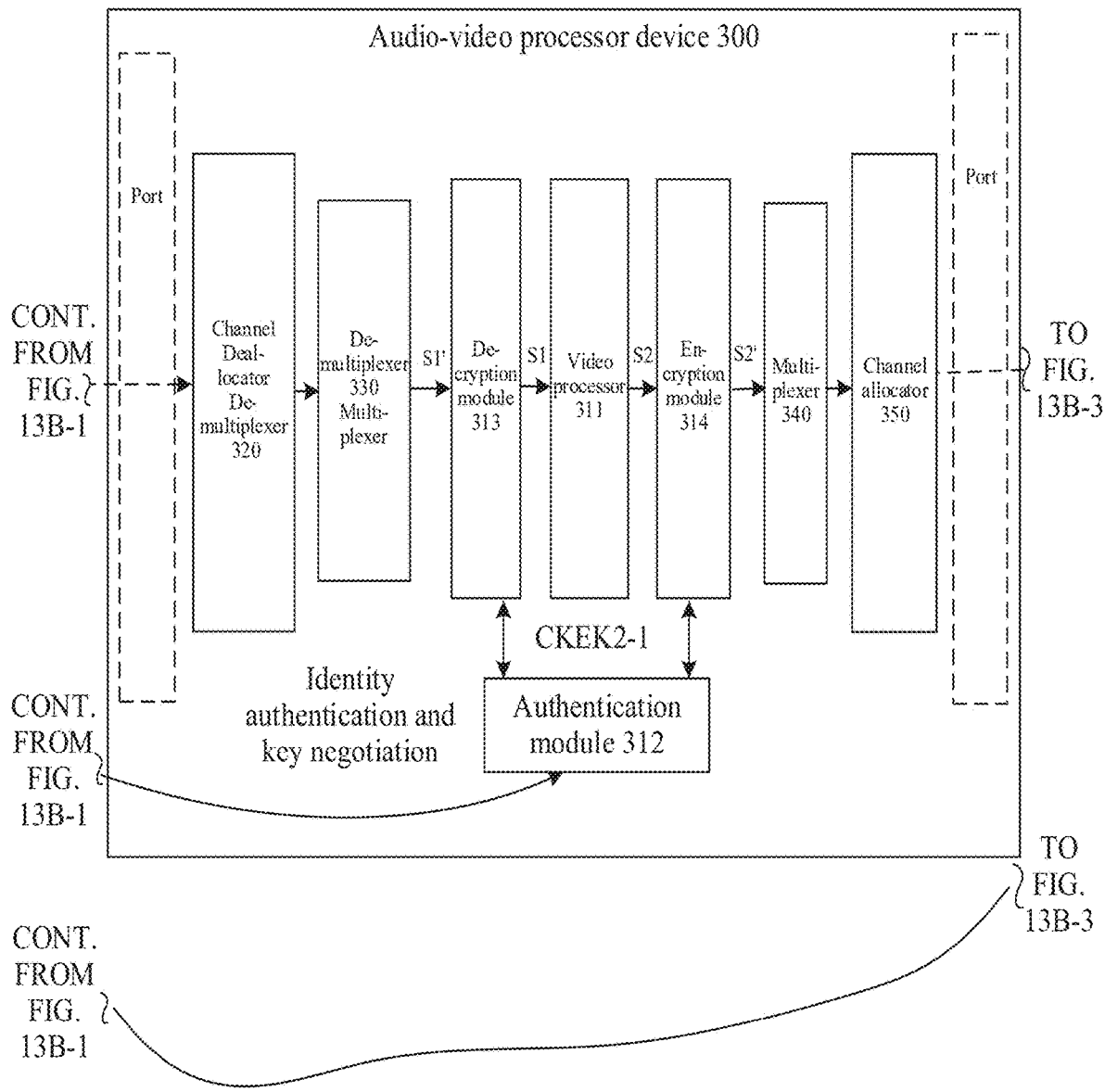
Figures 3, 13B:
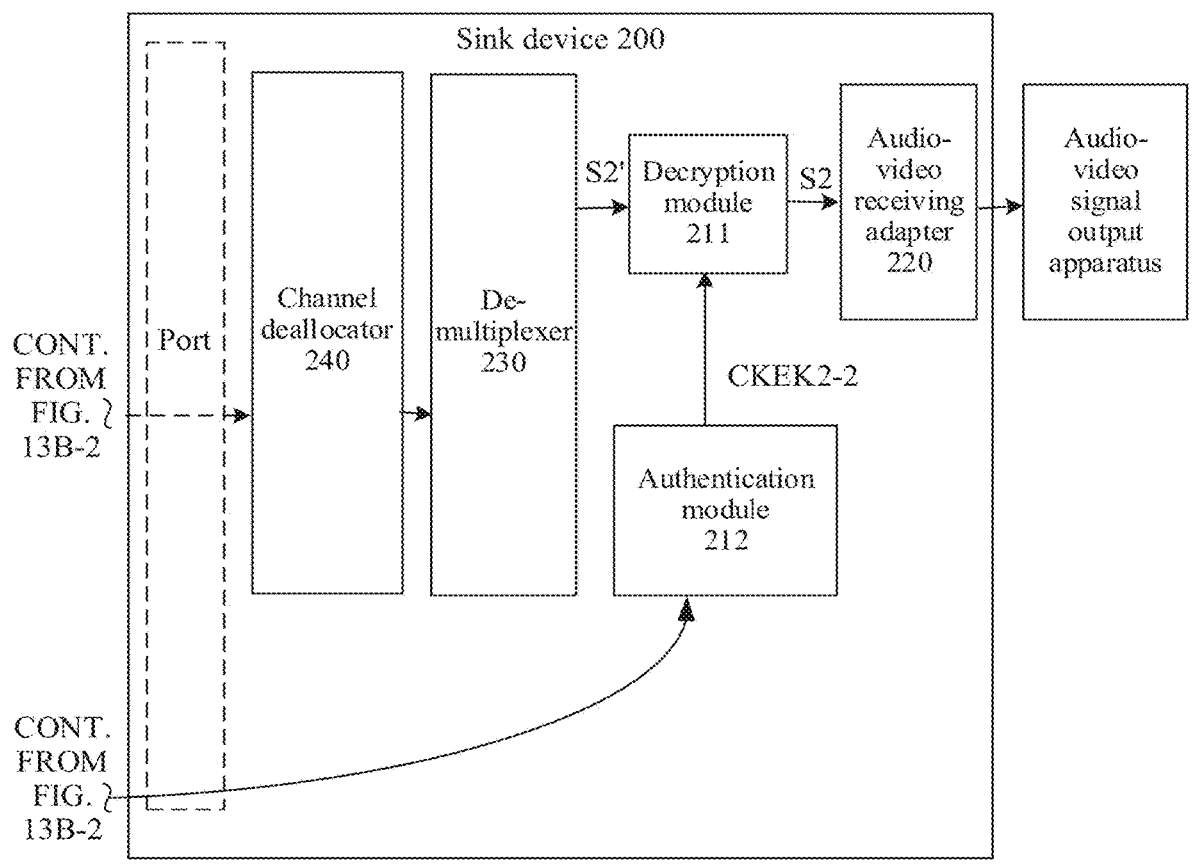

Refer to FIG. 13B-1 to FIG. 13B-3. The second possible scenario provided in the embodiments of this application is described. A source device 100 sends audio-video data to a sink device 200 by using an audio-video processor device 300. For example, for a structure of the source device 100, refer to FIG. 8B.

An authentication module 113 performs identity authentication on the sink device 200 and the audio-video processor device 300, negotiates an encryption key CKEK2-1 with the audio-video processor device 300, and negotiates an encryption key CKEK2-2 with the sink device 200. For example, the authentication module 113 may perform identity authentication on and negotiate a key with the sink device by using an auxiliary link established between the source device and a management control adapter included in the sink device. The auxiliary link passes through the audio-video processor device 300. A negotiation message may be forwarded by using the audio-video processor device. An authorization module 112 performs authorization control on the sink device 200 and the audio-video processor device 300, to determine whether to send to-be-sent audio-video data to the audio-video processor device 300 and the sink device 200. An audio-video transmission adapter 120 is configured to encapsulate the input audio-video data into an audio-video packet. The audio-video stream formed by the audio-video packets is represented by S1. S1 is input to a transmitter 110. An encryption module in the transmitter 110 encrypts each audio-video packet in S1 and inserts a key distribution packet, and outputs an encrypted audio-video stream S1'. For example, an encryption module 111 generates content keys CK2-1 and CK2-2, encrypts CK2-1 by using CKEK2-1 to obtain an encrypted content key ECK2-1, encrypts CK2-2 by using CKEK2-1 to obtain an encrypted content key ECK2-2, and encrypts CK2-2 by using CKEK2-2 to obtain an encrypted content key ECK2-3. CK2-1 and Counter2-1 are used to encrypt an audio-video packet that belongs to S1, and then the key distribution packets KDP2-1, KDP2-2, and KDP2-3 are inserted into the encrypted S1 to obtain S1'. The key distribution packet KDP2-1 includes ECK2-1 and Counter2-1. The key distribution packet KDP2-2 includes ECK2-2 and Counter2-2. The key distribution packet KDP2-3 includes ECK2-3 and Counter2-2.

The audio-video stream S1' is separately processed by a multiplexer 130 and a channel allocator 140, and then sent to the audio-video processor device 300 through a port. A channel deallocator 320 and a demultiplexer 330 in the audio-video processor device 300 process the audio-video stream from the source device 100 to obtain S1'. Then, a decryption module 313 performs decryption processing to obtain the audio-video stream S1. For example, the decryption module 313 filters KDP2-1 from the audio-video stream S1'. The decryption module 313 obtains ECK2-1 and Counter2-1 from KDP2-1. The decryption module 313 decrypts ECK2-1 by using CKEK2-1 to obtain CK2-1, decrypts S1' by using CK2-1 and Counter2-1 to obtain an audio-video stream S1, and outputs the audio-video stream S1 to the video processor 311. The video processor 311 processes the audio-video stream S1 to obtain an audio-video stream S2, and outputs the audio-video stream S2 to an encryption module 314. The encryption module 314 filters KDP2-2 from the audio-video stream S2, and obtains ECK2-2 and Counter2-2 from KDP2-2. The encryption module 314 decrypts ECK2-2 by using CKEK2-1 to obtain CK2-2, and then encrypts S2 by using CK2-2 and Counter2-2 to obtain an audio-video stream S2'. KDP2-3 is inserted into audio-video stream S2'. The audio-video stream S1' is separately processed by a multiplexer 340 and a channel allocator 350, and then sent to a sink device 200 through a port.

A channel deallocator 240 and a demultiplexer 230 in the sink device 200 process the audio-video stream from the source device 100 to obtain S2', and then a decryption module 211 performs decryption processing to obtain the audio-video stream S2. For example, the decryption module 211 filters KDP2-3 from the audio-video stream S2'. The decryption module 211 obtains ECK2-3 and Counter2-2 from KDP2-3. The decryption module 211 decrypts ECK2-3 by using CKEK2-2 to obtain CK2-2, and then decrypts S2' by using CK2-2 and Counter2-2 to obtain the audio-video stream S2. The audio-video stream S2 is parsed and processed by the audio-video receiving adapter 220 to obtain audio-video data, and the audio-video data is output to an audio-video signal output apparatus for output.

Figures 1, 13C:
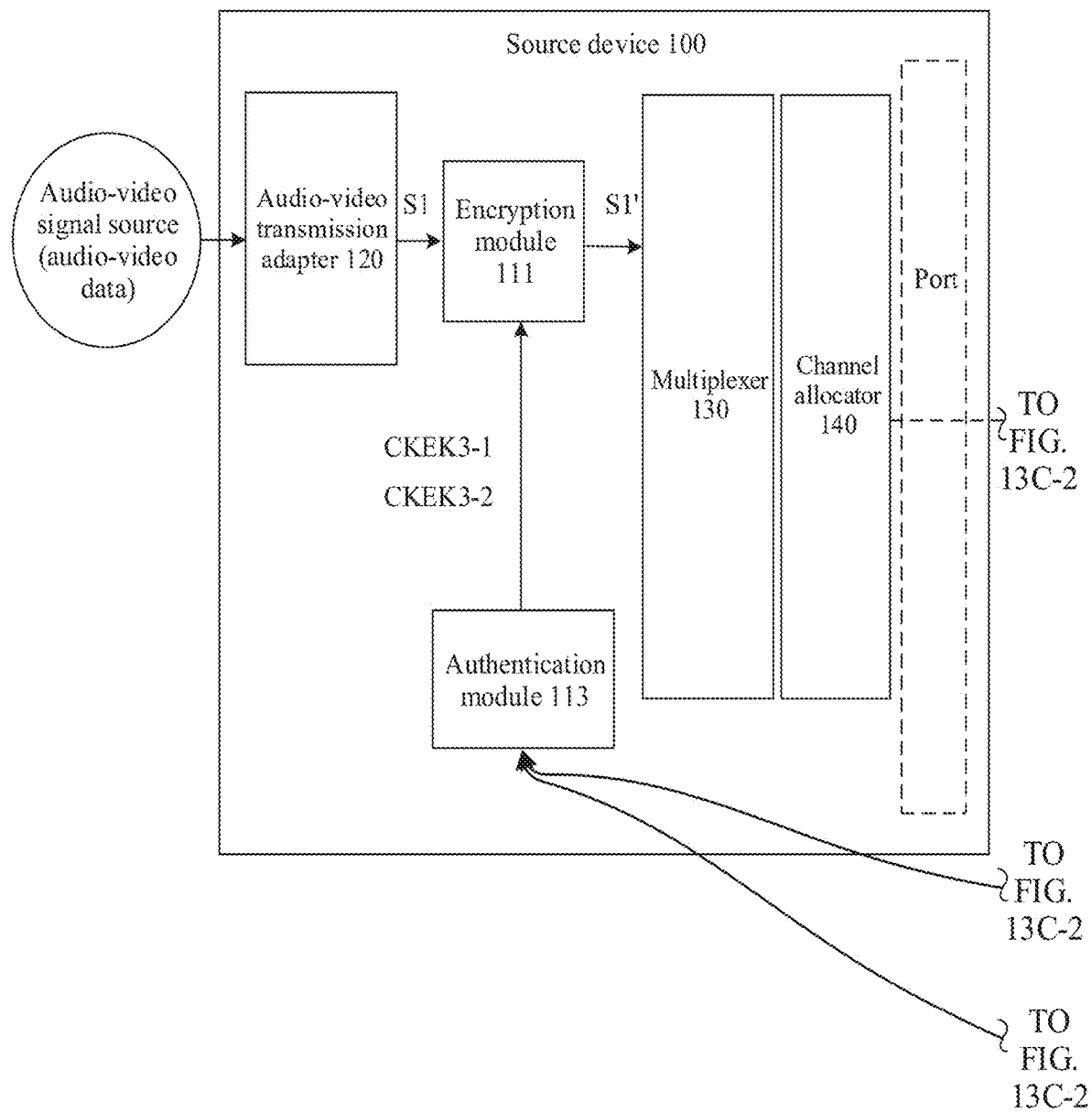
Figures 2, 13C:
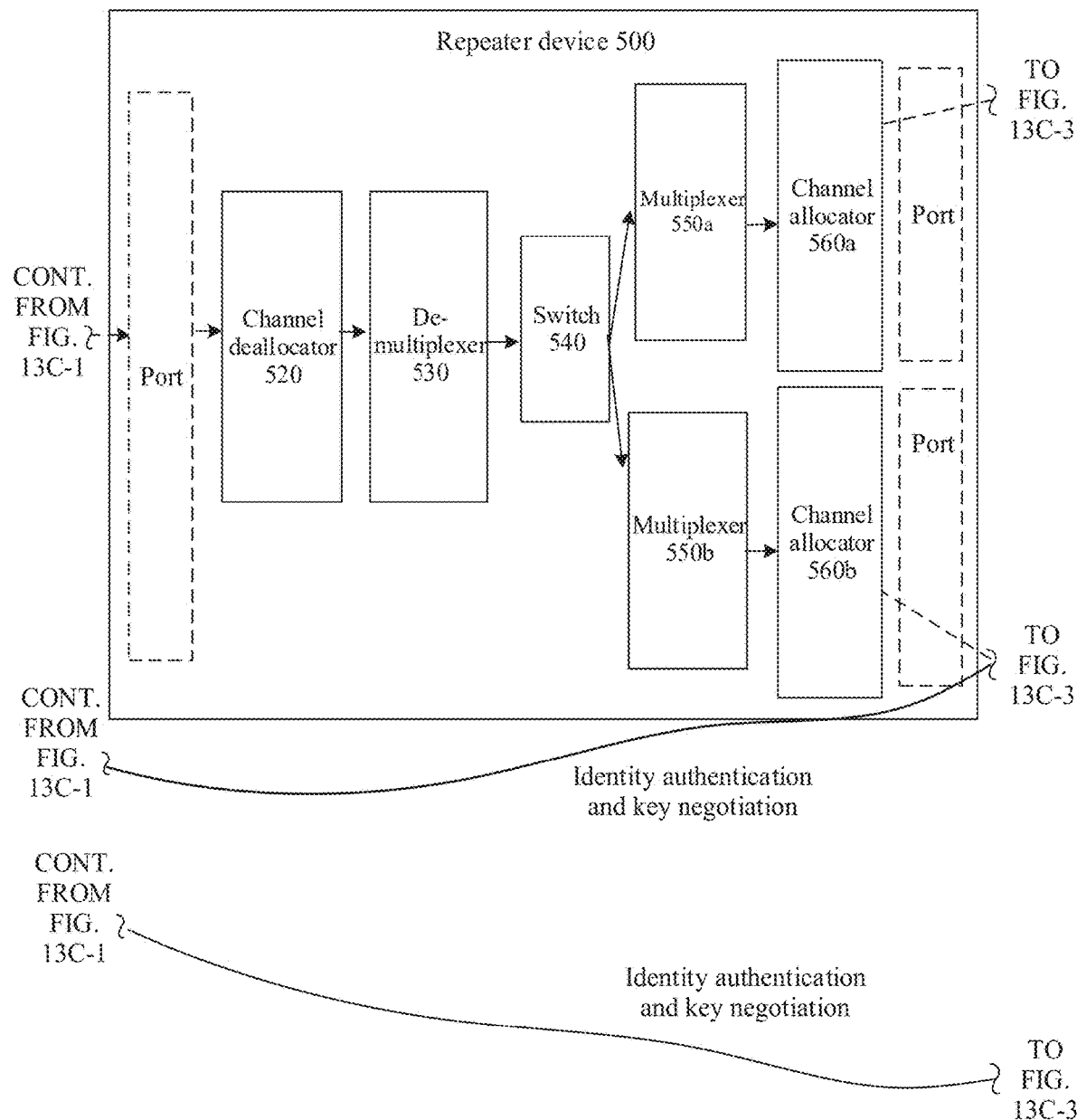
Figures 3, 13C:
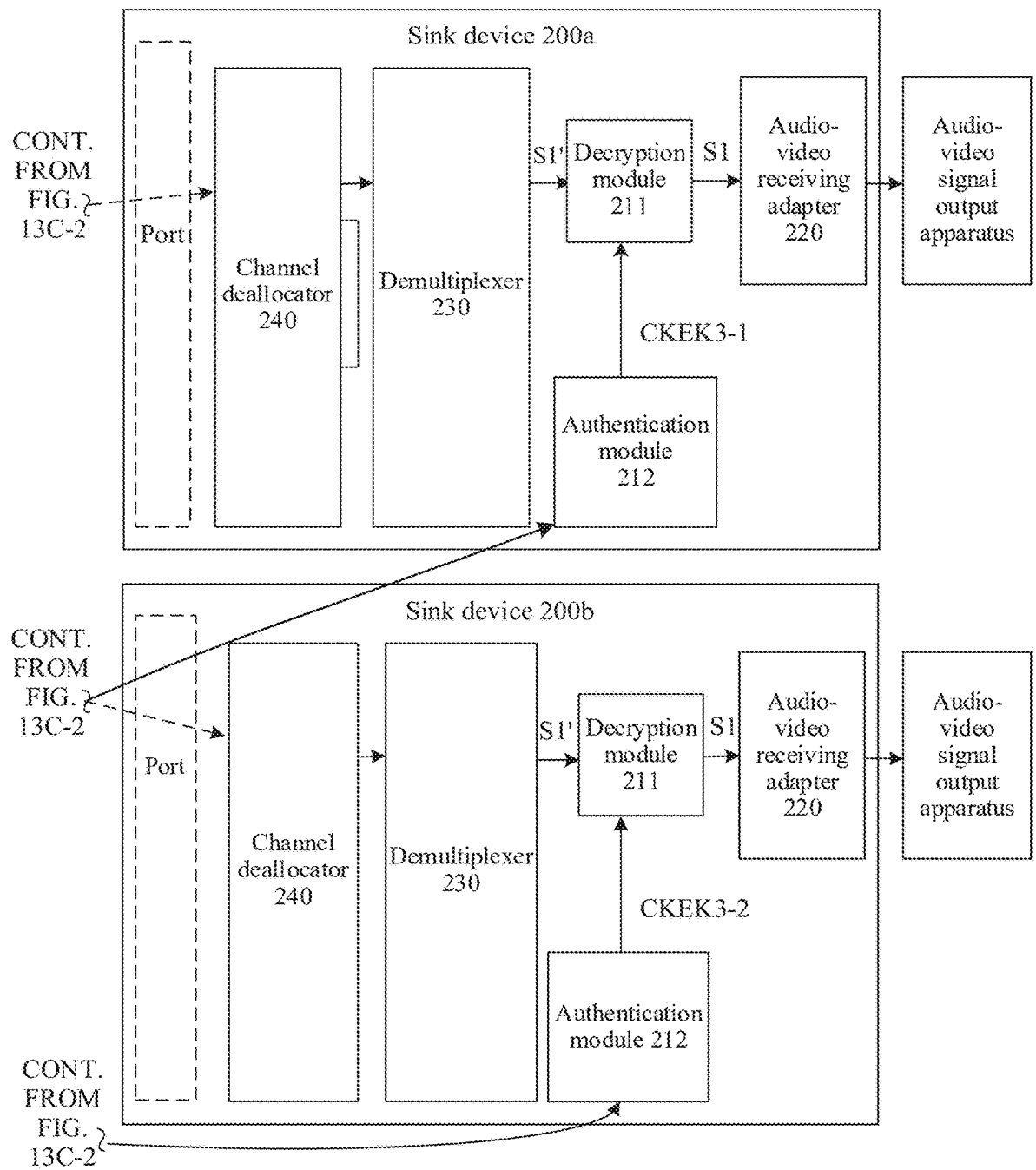

Refer to FIG. 13C-1 to FIG. 13C-3. A third possible scenario provided in an embodiment of this application is described. A source device 100 sends audio-video data to two sink devices 200 by using a repeater device 500. For ease of differentiation between the two sink devices 200, the two sink devices 200 are respectively referred to as a sink device 200a and a sink device 200b. For example, for a structure of the source device 100, refer to FIG. 8B. For structures of the sink device 200a and the sink device 200b, refer to FIG. 9B. For a structure of the repeater device 500, refer to FIG. 12.

An authentication module 113 performs identity authentication on the sink device 200a and the sink device 200b, negotiates an encryption key CKEK3-1 with the sink device 200a, and negotiates an encryption key CKEK3-2 with the sink device 200b. For example, the authentication module 113 may perform identity authentication on and negotiate a key with the sink device by using an auxiliary link established between the source device and a management control adapter included in the sink device. The auxiliary link passes through the repeater device 500. A negotiation message may be forwarded by the repeater device 200. The authorization module 112 performs authorization control on the sink device 200a and the sink device 200b, to determine whether to send the to-be-sent audio-video data to the sink device 200a and the sink device 200b. The repeater device 500 is configured to encapsulate input audio-video data into an audio-video packet. The audio-video stream formed by the audio-video packets is represented by S1. S1 is input to a transmitter 110. An encryption module in the transmitter 110 encrypts each audio-video packet in S1 and inserts a key distribution packet, and outputs an encrypted audio-video stream S1'. For example, the encryption module 111 generates a content key CK3-1, encrypts CK3-1 by using CKEK3-1 to obtain an encrypted content key ECK3-1, and encrypts CK3-1 by using CKEK3-2 to obtain an encrypted content key ECK3-2. CK3-1 and Counter3-1 are used to encrypt an audio-video packet that belongs to S1, and then the key distribution packets KDP3-1 and KDP3-2 are inserted into the encrypted S1 to obtain S1'. The key distribution packet KDP3-1 includes ECK3-1 and Counter3-1. The key distribution packet KDP3-2 includes ECK3-2 and Counter3-1.

The audio-video stream S1' is separately processed by the multiplexer 130 and the channel allocator 140, and then sent to the repeater device 500 through a port. A channel deallocator 520 and a demultiplexer 530 in the repeater device 500 process the audio-video stream from the source device 100. Then, when the switch 540 determines that the audio-video stream S1' needs to be sent to the sink device 200a and the sink device 200b, the audio-video stream S1' is processed by the multiplexer 550a and the channel allocator 560a, and then sent to the sink device 200a through a port. After being processed by the multiplexer 550b and the channel allocator 560b, the audio-video stream S1' is sent to the sink device 200b through a port.

The channel deallocator 240 and the demultiplexer 230 in the sink device 200a process the audio-video stream from the source device 100 to obtain S1', and then the decryption module 211 performs decryption processing to obtain the audio-video stream S1. For example, the decryption module 211 filters KDP3-1 from the audio-video stream S1'. The decryption module 211 obtains ECK3-1 and Counter3-1 from KDP3-1. The decryption module 211 decrypts ECK3-1 by using CKEK3-1 to obtain CK3-1, and then decrypts S1' by using CK3-1 and Counter3-1 to obtain the audio-video stream S1. The audio-video stream S1 is parsed and processed by the audio-video receiving adapter 220 to obtain audio-video data, and the audio-video data is output to an audio-video signal output apparatus for output.

The channel deallocator 240 and the demultiplexer 230 in the sink device 200b process the audio-video stream from the source device 100 to obtain S1', and then the decryption module 211 performs decryption processing to obtain the audio-video stream S1. For example, the decryption module 211 filters KDP3-2 from the audio-video stream S1'. The decryption module 211 obtains ECK3-2 and Counter3-1 from KDP3-2. The decryption module 211 decrypts ECK3-2 by using CKEK3-2 to obtain CK3-1, and then decrypts S1' by using CK3-1 and Counter3-1 to obtain the audio-video stream S1. The audio-video stream S1 is parsed and processed by the audio-video receiving adapter 220 to obtain audio-video data, and the audio-video data is output to an audio-video signal output apparatus for output.

Figures 1, 13D:
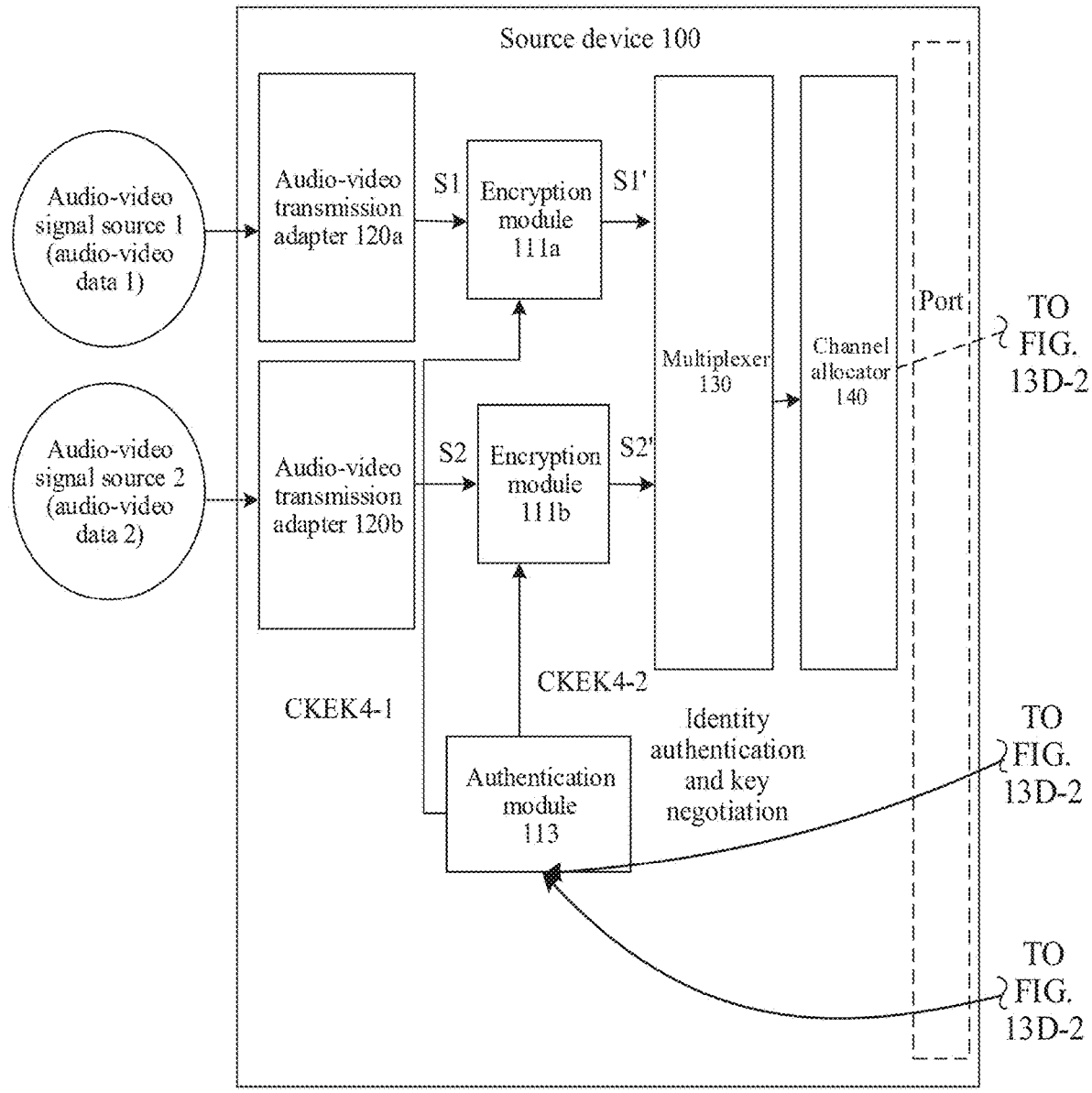
Figures 2, 13D:
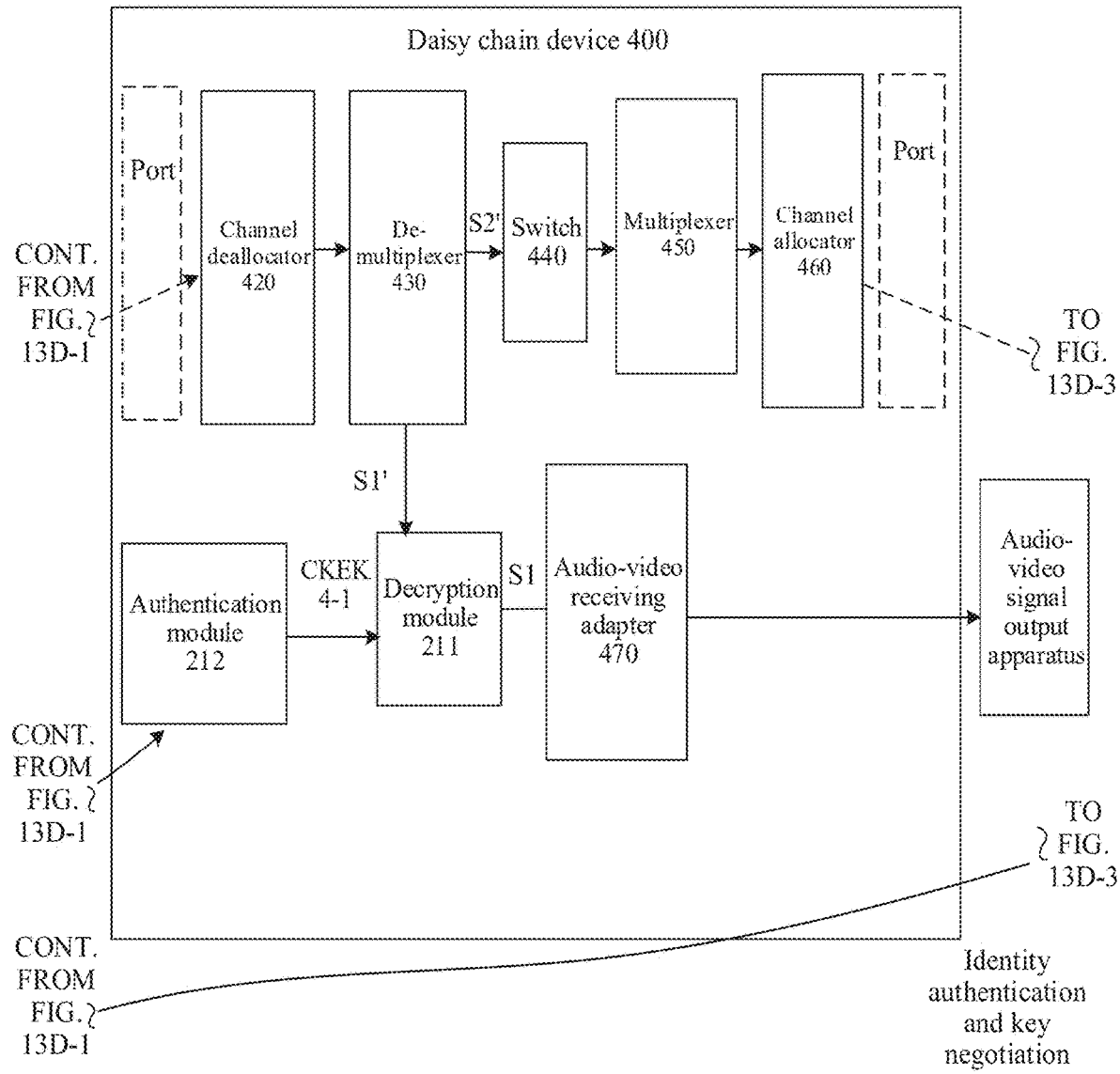
Figures 3, 13D:
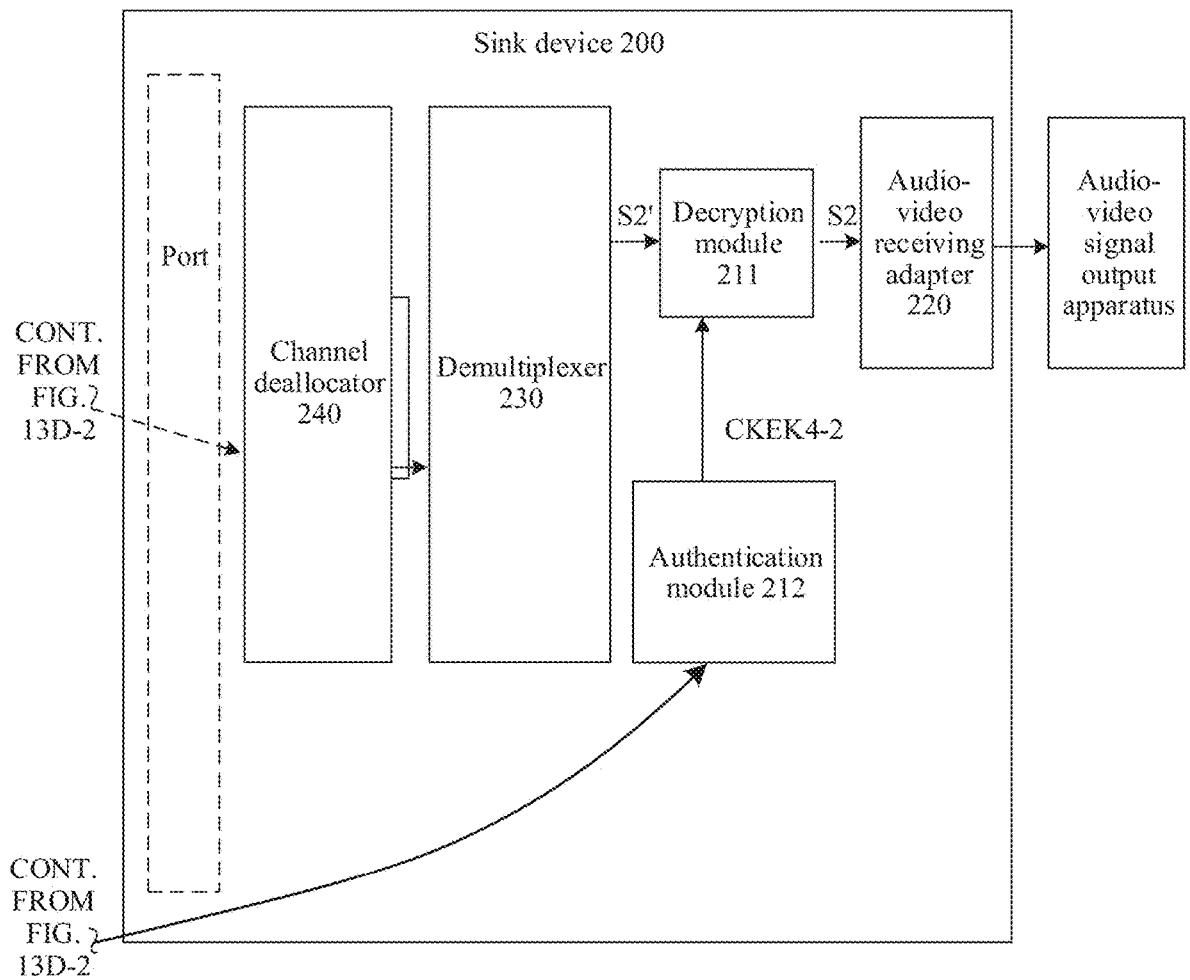

Refer to FIG. 13D-1 to FIG. 13D-3. A fourth possible scenario provided in an embodiment of this application is described. A source device 100 is connected to a daisy chain device 400, and the daisy chain device 400 is connected to a sink device 200. The source device 100 sends audio-video data 1 by using the daisy chain device 400, and sends audio-video data 2 to the sink device 200 by using the daisy chain device. For example, for a structure of the source device 100, refer to FIG. 8C.

An authentication module 113 performs identity authentication on the sink device 200 and the daisy chain device 400, negotiates an encryption key CKEK4-1 with the daisy chain device 400, and negotiates an encryption key CKEK4-2 with the sink device 200. An authorization module 112 performs authorization control on the sink device 200 and the daisy chain device 400, to determine whether to send audio-video data to the daisy chain device 400 and the sink device 200. For example, the authentication module 113 may perform identity authentication on and negotiate a key with the sink device by using an auxiliary link established between the source device and a management control adapter included in the sink device. The auxiliary link passes through the daisy chain device. A negotiation message may be forwarded by the daisy chain device. The audio-video transmission adapter 120a is configured to encapsulate input audio-video data 1 into an audio-video packet 1. The audio-video stream formed by the audio-video packet 1 is represented by S1. S1 is input to a transmitter 110. An encryption module 111a in the transmitter 110 encrypts each audio-video packet in S1 and inserts a key distribution packet, and outputs an encrypted audio-video stream S1'. For example, the encryption module 111a generates a content key CK4-1, and encrypts CK4-1 by using CKEK4-1 to obtain an encrypted content key ECK4-1. The encryption module 111an encrypts an audio-video packet that belongs to S1 by using CK4-1 and Counter4-1, and then inserts a key distribution packet KDP4-1 into the encrypted S1 to obtain S1'. The key distribution packet KDP4-1 includes ECK4-1 and Counter4-1. The audio-video transmission adapter 120b is configured to encapsulate input audio-video data 2 into an audio-video packet 2. The audio-video stream formed by the audio-video packet 2 is represented by S2. S2 is input to the transmitter 110. An encryption module 111b in the transmitter 110 encrypts each audio-video packet in S2 and inserts a key distribution packet, and outputs an encrypted audio-video stream S2'. For example, the encryption module 111b generates a content key CK4-2, and encrypts CK4-2 by using CKEK4-2 to obtain an encrypted content key ECK4-2. The encryption module 111b encrypts the audio-video packet that belongs to S2 by using CK4-2 and Counter4-2, and then inserts the key distribution packet KDP4-2 into the encrypted S2 to obtain S2'. The key distribution packet KDP4-2 includes ECK4-2 and Counter4-2.

The audio-video streams S1' and S2' are combined into one audio-video stream by using a multiplexer 130, processed by a channel allocator 140, and then sent to an audio-video processor device 300 through a port. A channel deallocator 320 and a demultiplexer 330 in the audio-video processor device 300 process an audio-video stream from the source device 100 to obtain an audio-video stream S1' and an audio-video stream S2'. Then, the audio-video stream S1' is decrypted by a decryption module 211 to obtain the audio-video stream S1. For example, the decryption module 211 filters KDP4-1 from the audio-video stream S1'. The decryption module 211 obtains ECK4-1 and Counter4-1 from KDP4-1. The decryption module 211 decrypts ECK4-1 by using CKEK4-1 to obtain CK4-1, and then decrypts S1' by using CK4-1 and Counter4-1 to obtain the audio-video stream S1, and outputs the audio-video stream S1 to an audio-video receiving adapter 470. After being processed by the audio-video receiving adapter 470, the audio-video stream S1 is output to an audio-video signal output apparatus. The switch 440 determines that the audio-video stream ST needs to be sent to the sink device 200. After being processed by the multiplexer 450 and the channel allocator 460, the audio-video stream ST is sent to the sink device 200 through a port.

A channel deallocator 240 and a demultiplexer 230 in the sink device 200 process the audio-video stream from the source device 100 to obtain S2', and then a decryption module 211 performs decryption processing to obtain the audio-video stream S2. For example, the decryption module 211 filters KDP4-2 from the audio-video stream ST. The decryption module 211 obtains ECK4-2 and Counter4-2 from KDP4-2. The decryption module 211 decrypts ECK4-2 by using CKEK4-2 to obtain CK4-2, and then decrypts ST by using CK4-2 and Counter4-2 to obtain the audio-video stream S2. The audio-video stream S2 is parsed and processed by the audio-video receiving adapter 220 to obtain audio-video data, and the audio-video data is output to an audio-video signal output apparatus for output.

Figure 13E:
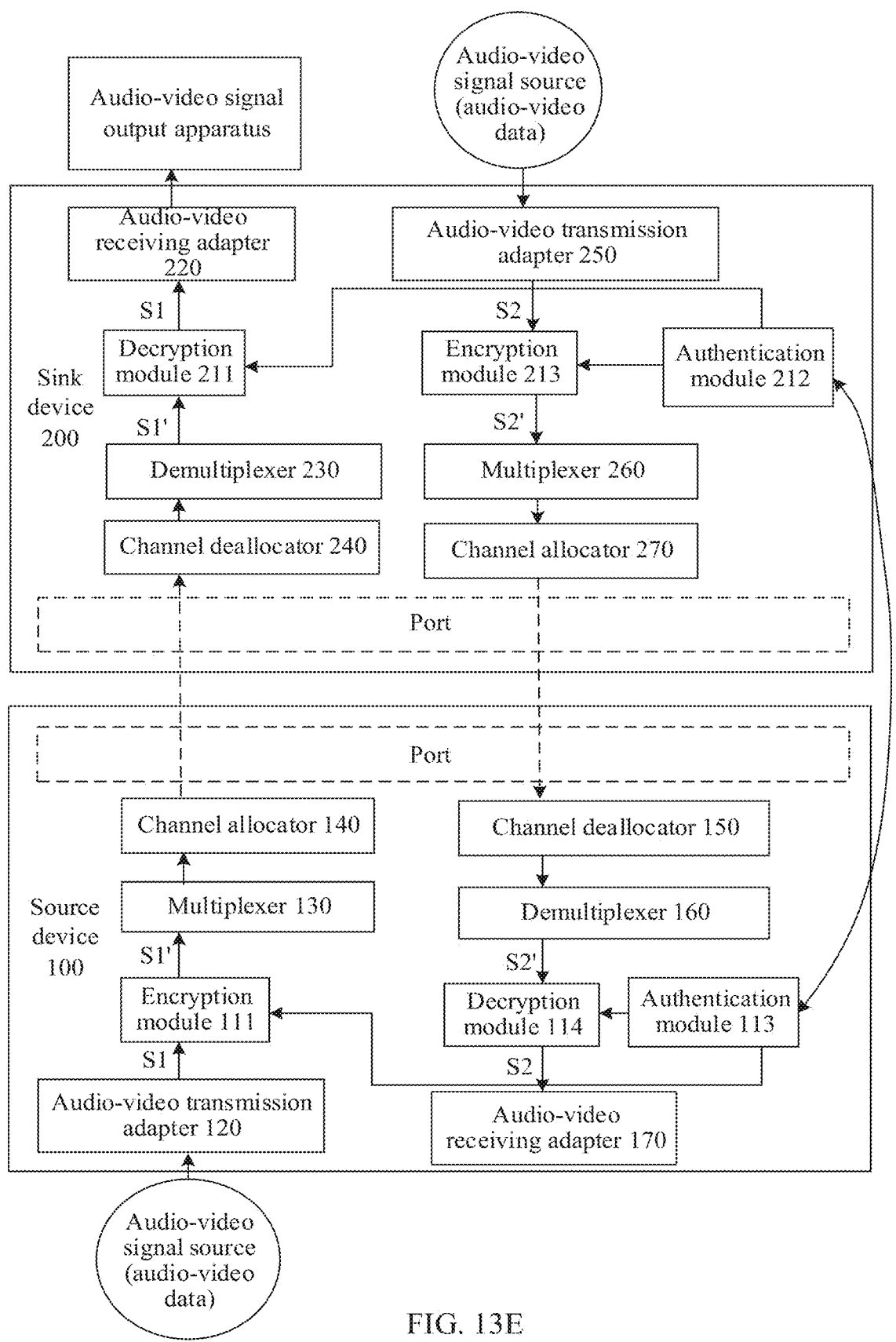
FIG. 13E is a schematic flowchart of a fifth possible scenario according to an embodiment of this application.

Refer to FIG. 13E. The fifth possible scenario provided the embodiments of this application is described. A source device 100 is connected to a sink device 200. For example, an apparatus to which audio-video data is back-transmitted is the source device 100. For example, for a structure of the source device 100, refer to FIG. 8D. For a structure of the sink device 200, refer to FIG. 9C.

In a possible example, the back-transmitted audio-video data may be audio-video data generated by the source device 100. Then, after being sent to the sink device 200, the audio-video data is back-transmitted to an upstream receiving device, where the upstream receiving device is the source device 100. The back-transmitted data may include audio data, video data, or audio-video data.

In this example, an authentication module 113 in the source device 100 performs identity authentication on the sink device 200 and an upstream receiving device (herein, an example in which the upstream receiving device is the source device 100 is used), and negotiates an encryption key CKEK5-1 with the sink device 200. An authorization module 112 performs authorization control on the sink device 200. The audio-video transmission adapter 120a is configured to encapsulate input audio-video data 1 into an audio-video packet 1. The audio-video stream formed by the audio-video packet 1 is represented by S1. S1 is input to a transmitter 110. An encryption module 111 in the transmitter 110 encrypts each audio-video packet in S1 and inserts a key distribution packet, and outputs an encrypted audio-video stream S1'. For example, the encryption module 111 generates a content key CK5-1, Counter5-1, CK5-2, and Counter5-2, where CK5-1 is used by the sink device 200 to decrypt the audio-video stream S1'. CK5-2 is used by the sink device 200 to encrypt the audio-video stream to be back-transmitted. The encryption module 111 encrypts CK5-1 by using CKEK5-1 to obtain the encrypted content key ECK5-1. The encryption module 111 encrypts an audio-video packet that belongs to S1 by using CK5-1 and Counter5-1. The encryption module 11 encrypts CK5-2 by using CKEK5-1 to obtain the encrypted content key ECK5-2. Then, the encryption module 111 inserts the key distribution packets KDP5-1 and KDP5-2 into the encrypted S1 to obtain S1'. The key distribution packet KDP5-1 includes ECK5-1 and Counter5-1. The key distribution packet KDP5-2 includes ECK5-2 and Counter5-2.

After being processed by the multiplexer 130 and the channel allocator 140, the audio-video stream S1' is sent to the sink device 200 through a port. A channel deallocator 240 and a demultiplexer 230 in the sink device 200 process the audio-video stream from the source device 100 to obtain S1', and then a decryption module 211 performs decryption processing to obtain the audio-video stream S1. For example, the decryption module 211 filters KDP5-1 and KDP5-2 from the audio-video stream S1'. The decryption module 211 obtains ECK5-1 and Counter5-1 from KDP5-1. The decryption module 211 decrypts ECK5-1 by using CKEK5-1 to obtain CK5-1, and then decrypts S1' by using CK5-1 and Counter5-1 to obtain the audio-video stream S1. The audio-video stream S1 is parsed and processed by the audio-video receiving adapter 220 to obtain audio-video data, and the audio-video data is output to an audio-video signal output apparatus for output.

Then, an audio-video receiving adapter 220 may send an output audio signal, video signal, or audio-video signal to an audio-video transmission adapter 250. A video signal being back-transmitted to the source device 100 is used as an example. For example, the sink device 200 does not have a display. The source device has a display. The audio-video data transmission adapter 250 encapsulates the video signal into a video packet and sends the video packet to an encryption module 213. Then, the encryption module 213 obtains ECK5-2 and Counter5-1 from KDP5-2, decrypts ECK5-2 by using CKEK5-1 to obtain CK5-2, and encrypts a video packet that belongs to S2 by using CK5-2 and Counter5-2 to obtain S2'. After passing through a multiplexer 260 and a channel allocator 270, S2' is sent to the source device 100 through an interface. The source device 100 processes the audio-video stream received from the sink device 200 by using the channel deallocator 150 and the demultiplexer 160 to obtain S2', and then a decryption module 114 decrypts S2' to obtain S2. Then, an audio-video receiving adapter 170 performs parsing processing and outputs the processed audio-video signal to the audio-video signal output apparatus.

In some embodiments, when the sink device 200 determines that the audio-video stream needs to be forwarded to an upstream receiving device for output, for example, the upstream receiving device is the source device 100, the decryption module 211 decrypts S1' to obtain S1, and then sends S1 to the encryption module 213 for encryption.

In some embodiments, the sink device 200 may further include an audio-video processor, to perform transformation processing on a video signal or an audio-video signal before back-transmitting the video signal or the audio-video signal to the source device 100. The sink device 200 performs transformation processing on the video signal or the audio-video signal. For example, the audio-video processor may be deployed between the audio-video receiving adapter 220 and the audio-video transmission adapter 250.

The following describes a process in which the source device in the embodiments of this application authenticates each receiver end that receives an audio-video stream. Specifically, a transmitter in the source device, for example, an authentication module in the transmitter, may perform identity authentication on each receiver end that receives the audio-video stream.

It should be understood that, when performing identity authentication on the receiver end, the source device may perform authentication on a certificate chain of the receiver end, to determine an identity of the receiver end. In an example, a trust relationship is established between the source device and the receiver end or the like based on a device certificate signed by a public key infrastructure (public key infrastructure, PKI), and secure communication is performed between the source device and the receiver end or the like based on the trust relationship. A PKI system may be used to issue and manage certificates. Generally, the PKI system usually issues a certificate through a certificate authority (certificate authority, CA). The source device and the receiver end or the like both request a digital certificate from the authentication center (certificate authority, CA) as a credential of their own identities. The source device and a device of the receiver end each have a built-in device certificate and a trust chain, so that authentication on the device is implemented by using the device certificate and the trust chain.

Figure 14A:
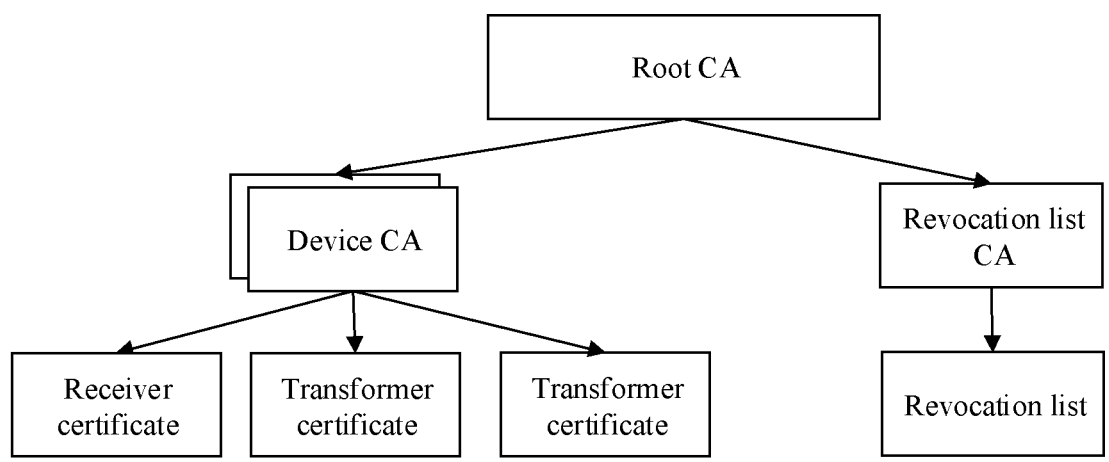
FIG. 14A is a schematic structural diagram of a trust chain according to an embodiment of this application.

For example, the trust chain includes a root CA (Root CA), a device CA (Device CA), a revocation list CA, device certificates (including a receiver certificate, a transformer certificate, and a receiving transformer certificate), and a revocation list, as shown in FIG. 14A. For example, the certificate format may comply with the X.509v3 standard, and support the national signature algorithm SM3/SM2 and the international algorithm SHA256X/X25519. Root CA (Root CA): self-signed root certificate. Device CA (Device CA): signed by the root CA and used to sign a device certificate. Device certificate: a device certificate signed by a device CA. The device certificate carries a certificate type (receiver, transformer, or receiving transformer, where the receiving transformer supports either forwarding after transformation or outputting), a unique device identifier, a security level, and the like. Revocation list CA: issued by the root CA and used to sign a revocation list. Revocation list: complies with the X.509v2 CRL standard. In some embodiments, before delivery, the transmitter stores a root CA certificate based on a national encryption algorithm, a root CA certificate based on an international algorithm, a revocation list CA, and the latest revocation list (which is used to authenticate a transformer, a receiver, and the like). In some embodiments, both the transformer and the receiver store a device CA certificate, a device private key, and a corresponding device certificate.

For example, a device private key needs to be stored in a secure storage to prevent modification and replacement, and cannot be read by other software or hardware outside the system; and a device certificate and a device CA certificate need to be stored in a secure storage to prevent modification and replacement. The root CA certificate can be hard-coded or stored in a secure storage to prevent modification and replacement. The revocation list can be stored in a secure storage or an external non-volatile storage, and may be used to verify validity and integrity of a source. For example, a secure storage space is deployed on each device to store a device private key and a device certificate, a device CA certificate, a root CA certificate, a revocation list, or an integrity check value. For example, a size of the secure storage space is not less than 20 KB.

In an example, Table 4 describes a possible format definition of the root certificate as an example.

TABLE 4

| Field | Description |
| --- | --- |
| Version | Version |
| Serial Number | Certificate serial number |
| Signature Algorithm | Signature algorithm: id-Ed25519 (OID: 1.3.101.112) or SM2-with-SM3(OID: 1.2.156.10197.1.501) |
| Issuer | Issuer |
| Validity | Validity period |
| Subject | Subject, including the following attributes: Country/Region name (countryName) Organization name (oranizationName) Common name (commonName): "Root CA" |
| Subject Public Key Info | Subject public key information, including: Algorithm identifier OID Curve identifier OID Public key |
| IssuerUniqueID | Unique identifier of an issuer, which is not used. |
| SubjectUniqueID | Unique identifier of a subject, which is not used. |
| Extension | Extension, including: Basic constraints (Basic Constraints): The CA field is set to "true". Key usage (Key Usage): Only key usage fields KeyCertSign and CRLSign are set to be used. |
| Signature | Signature value |

In an example, Table 5 describes a possible format definition of the device subordinate CA certificate as an example.

TABLE 5

| Field | Description |
| --- | --- |
| Version | Version |
| Serial Number | Certificate serial number |
| Signature Algorithm | Signature algorithm id-Ed25519 (OID: 1.3.101.112) or SM2-with-SM3(OID: 1.2.156.10197.1.501) |
| Issuer | Issuer |
| Validity | Validity period |
| Subject | Subject, including the following attributes: Country/Region name (countryName) Organization name (oranizationName) Common name (commonName): "Device CA" |
| Subject Public Key Info | Subject public key information, including: Algorithm identifier OID Curve identifier OID Public key |
| IssuerUniqueID | Unique identifier of an issuer, which is not used. |
| SubjectUniqueID | Unique identifier of a subject, which is not used. |
| Extension | Extension, including: Basic constraints (Basic Constraints): If the CA field is set to "true" and pathLenConstraint is set to 0, only a device certificate can be issued. Key usage (Key Usage): Only a key usage field KeyCertSign is set to be used. |
| Signature | Signature value |

In an example, Table 6 describes a possible format definition of the device certificate as an example.

TABLE 6

| Field | Description |
| --- | --- |
| Version | Version |
| Serial Number | Certificate serial number |
| Signature Algorithm | Signature algorithm id-Ed25519 (OID: 1.3.101.112) or SM2-with-SM3(OID: 1.2.156.10197.1.501) |
| Issuer | Issuer |
| Validity | Validity period |
| Subject | Subject, including the following attributes: Country/Region name (countryName) Organization name (oranizationName) Common name (commonName): a character string including five parts: Device type: TF indicates a transformer, RX indicates a receiver, and TR indicates a receiving transformer. Security level: Lx, where x indicates a security level. Protocol version: including four hexadecimal characters of the protocol version. The current version is 0001. Manufacturer No.: including four characters, for example, 0001. Unique device identifier: 12 hexadecimal characters, for example, "112233445566" |
| Subject Public Key Info | Subject public key information, including: Algorithm identifier OID Curve identifier OID Public key |
| IssuerUniqueID | Unique identifier of an issuer, which is not used. |
| SubjectUniqueID | Unique identifier of a subject, which is not used. |
| Extension | Extension, including: Basic constraints (Basic Constraints): The CA field is set to "false". Key usage (Key Usage): Only key usage fields "digital Signature" and "keyEncipherment" are set to be used. |
| Signature | Signature value |

In an example, Table 7 describes a possible format definition of the revocation list CA certificate as an example.

TABLE 7

| Field | Description |
|---|---|
| Version | Version |
| Serial Number | Certificate serial number |
| Signature Algorithm | Signature algorithm id-Ed25519 (OID: 1.3.101.112) or SM2-with-SM3(OID: 1.2.156.10197.1.501) |
| Issuer | Issuer |
| Validity | Validity period |
| Subject | Subject, including the following attributes: Country/Region name (countryName) Organization name (oranizationName) Common name (commonName): "CRL CA" |
| Subject Public Key Info | Subject public key information, including: Algorithm identifier OID Curve identifier OID Public key |
| IssuerUniqueID | Unique identifier of an issuer, which is not used. |
| SubjectUniqueID | Unique identifier of a subject, which is not used. |
| Extension | Extension, including: Basic constraints (Basic Constraints): The CA field is set to "true". Key usage (Key Usage): Only key usage fields KeyCertSign and CRLSign are set to be used. |
| Signature | Signature value |

In an example, Table 8 describes a possible format definition of the revocation list as an example.

TABLE 8

| Field | Description |
|---|---|
| Version | Version |
| Signature | Signature algorithm |
| Issuer | Issuer |
| thisUpdate | Issuance time |
| userCertificate | Certificate revoked |
| revocationDate | Revocation time |
| SignatureAlgorithm | Signature algorithm |
| signatureValue | Signature value |

Figure 14B:
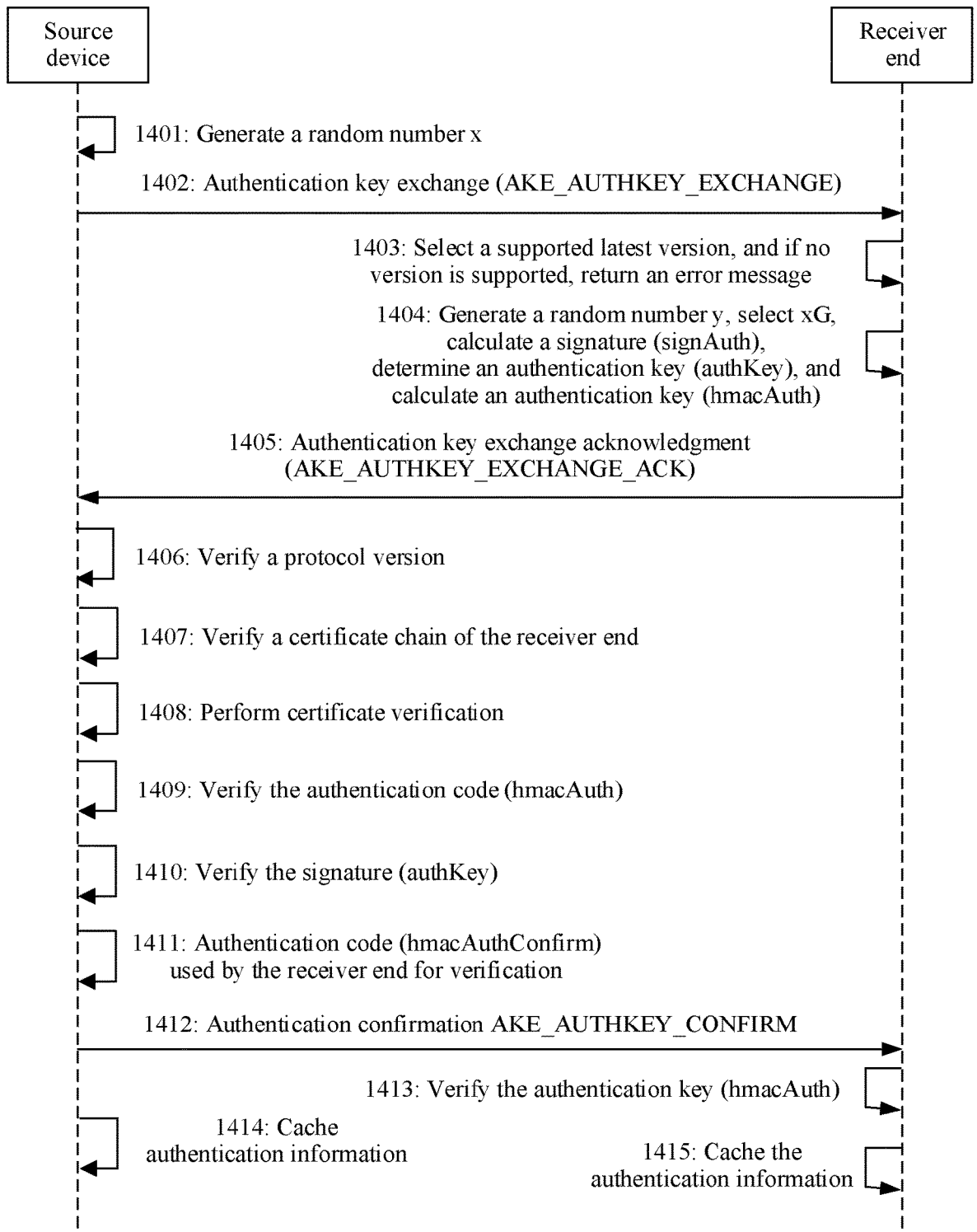
FIG. 14B is a schematic diagram of a possible identity authentication procedure according to an embodiment of this application.

With reference to the accompanying drawings, the following describes a procedure in which a source device performs identity authentication on a receiver end according to the embodiments of this application. The receiver end may include a daisy chain device, a sink device, or an audio-video processor device. FIG. 14B is a possible schematic flowchart of identity authentication.

1401: A source device generates a random number x. x is used to determine xG0 or xG1. For example, xG0 or xG1 is determined according to x by using an ECDH technology.

1402: The source device sends an authentication key exchange (AKE_AUTHKEY_EXCHANGE) message, where the AKE_AUTHKEY_EXCHANGE message includes a unique identifier txId of the source device, a list of versions supported by the source device (which may be represented by supportedVersions), an elliptic curve Diffie-Hellman key exchange (Elliptic Curve Diffie-Hellman key Exchange, ECDH) key negotiation parameter [xG0||xG1] that is obtained through calculation by the source device by using a supported algorithm, and a fast authentication flag (which is represented by enableFastAuth). A key negotiation parameter of a national encryption algorithm is xG0, and a key negotiation parameter of an international algorithm is xG1. txId may be randomly generated, and may be stored in a local non-volatile storage. For example, enableFastAuth is 0 by default. enableFastAuth is initially set to 1 if the current receiver end is reconnected, and is also set to after fast authentication fails.

In an example, Table 9 describes a format definition of the AKE_AUTHKEY_EXCHANGE message as an example.

TABLE 9

| Field | Length (bytes) | Description |
|---|---|---|
| msgId | 2 | Message ID. The value is 0x01. |
| msgLen | 2 | Message length |
| txId | 8 | Unique transmitter ID |
| supportedVersions Numbers | 1 | Quantity of protocol versions supported by the transmitter |
| supportedVersions | 2* supportVersionNumbers | List of versions supported by the transmitter. Each version includes two bytes. |
| xG0||xG1 | 64 + 64 | ECDH key negotiation parameter. The first 64 bytes are the negotiation parameter of a national encryption algorithm, and the last 64 bytes are the negotiation parameter of the international algorithm. If an algorithm is not supported, the 32-byte xG of the corresponding algorithm is set to all 0s. |
| enableFastAuth | 1 | Fast certification flag 0x0: Fast authentication is enabled. 0x1: Fast authentication is disabled. |

1403: The receiver end receives the AKE_AUTH-KEY_EXCHANGE message, selects a supported latest version from the version list supported by the source device, and if no version is supported, returns an error message ERROR_ACK indicating that the version is not supported.

In an example, Table 10 describes a format definition of the ERROR_ACK message as an example.

TABLE 10

| Field | Length (bytes) | Description |
|---|---|---|
| msgId | 2 | Message ID. The value is 0xFF. |
| msgLen | 2 | Message length |
| errorNO | 2 | Error code |
| errorMsgLen | 1 | Length of an error message |
| errorMsg | 4 | Error message |

1404: If enableFastAuth is 1, the receiver end determines whether txId and a corresponding authentication key authKey are cached. If authKey is cached, a fast authentication process is enabled; or if authKey is not cached, the receiver end generates a random number y, and selects a supported algorithm type according to a signature algorithm (a national encryption algorithm or an international algorithm) used by the device certificate, calculates the ECDH key negotiation parameter yG, determines [xG0∥xG1] and selects xG (for example, selects xG0 or xG1), determines authKey=y(xG) (indicating that authKey is obtained based on y and xG by using a scalar multiplication algorithm), and hmacAuth=HMAC (yG∥xG∥txId∥version, authKey), and uses a private key of the receiver to calculate a signature signAuth=S(hmacAuth, rxPriKey), where rxPriKey is the private key of the receiver. If the algorithm is not supported, an error message ERROR_ACK is returned to indicate that the algorithm is not supported. S( ) indicates the signature algorithm.

The HMAC-based authentication code (hmacAuth) is calculated by using the key-related hash-based message authentication code (hash-based message authentication code, HMAC) technology.

1405: The receiver end sends an authentication key exchange acknowledgment AKE_AUTHKEY_EXCHANGE_ACK message, where the message includes a protocol version supported by the receiver end, a device CA certificate caCert of the receiver end, a device certificate rxCert, yG, signAuth, and hmacAuth.

In an example, Table 11 describes a possible format definition of the AKE_AUTHKEY_EXCHANGE_ACK message as an example.

TABLE 11

| Field | Length (bytes) | Description |
|---|---|---|
| msgId | 1 | Message ID. The value is 0x02. |
| msgLen | 2 | Message length |
| version | 2 | Protocol version selected by the receiver end |
| caCertLen | 2 | Length of a device CA certificate of the receiver end. |
| caCert | caCertLen | Device CA certificate of the receiver end |
| rxCertLen | 2 | Length of a device certificate of the receiver end |
| rxCert | rxCertLen | Device certificate of the receiver end |
| yG | 64 | ECDH key negotiation parameter |
| signAuth | 64 | Signature value |
| hmacAuth | 32 | HMAC authentication code |

1406: The source device receives the AKE_AUTHKEY_EXCHANGE_ACK message, verifies the protocol version, and determines whether the protocol version of the receiver end is supported. If the protocol version of the receiver end is supported, the next step 1407 is performed; or if the protocol version of the receiver end is not supported, the authentication status is recorded as a protocol version error, and the authentication procedure is terminated.

1407: The source device parses an algorithm (a national encryption algorithm or an international algorithm) used by the device certificate as an algorithm supported by the receiver end, and verifies a certificate chain of the receiver end. If the certificate chain is successfully verified, the next step 1408 is performed; or if the certificate chain fails to be verified, the authentication status is recorded as a certificate verification failure, and the authentication process is terminated.

1408: The source device performs certificate verification, and determines whether the caCert and rxCert serial numbers are in the revocation list. If the caCert and rxCert serial numbers are not included in the revocation list, the next step 1409 is performed; or if the caCert and rxCert serial numbers are included in the revocation list, the authentication status is recorded as "certificate revoked", and the authentication process is terminated.

1409: The source device calculates authKey=x(yG), calculates HMAC (yG∥xG∥txID∥version, authKey), and compares HMAC (yG∥xG∥txId∥version, authKey) with hmacAuth. If HMAC (yG∥xG∥txId∥version, authKey) and hmacAuth are equal, the next step 1410 is performed; or if HMAC (yG∥xG∥txId∥version, authKey) and hmacAuth are different, the authentication status is recorded as an HMAC verification failure, and the authentication process is terminated.

1410: The source device verifies the signAuth by using the public key rxPubKey in the certificate of the receiver end. If the verification succeeds, the next step 1411 is performed; or if the verification fails, the authentication status is recorded as a signature verification failure, and the authentication process is terminated.

1411: The source device calculates an authentication code hmacAuthConfirm=HMAC (yG∥xG∥rxId, authKey) used by the receiver end for verification, where rxId is a unique identifier of a device in the certificate of the receiver end. In an example, the rxID may be used as a DeviceId of a receiver end during audio-video stream transmission.

1412: The source device sends an AKE_AUTHKEY_CONFIRM message, where the message includes hmacAuthConfirm.

In an example, Table 12 describes a format definition of the AKE_AUTHKEY_CONFIRM message as an example.

TABLE 12

| Field | Length (bytes) | Description |
|---|---|---|
| msgId | 2 | Message ID. The value is 0x03. |
| msgLen | 2 | Message length |
| hmacAuthConfirm | 32 | HMAC authentication code |

1413: The receiver end receives the AKE_AUTHKEY_CONFIRM message, calculates HMAC (yG∥xG∥rxId, authKey), and compares HMAC (yG∥xG∥rxId, authKey) with hmacAuthConfirm. If HMAC (yG∥xG∥rxId, authKey) and hmacAuthConfirm are equal, the next step 1414 is performed; or HMAC (yG∥xG∥rxId, authKey) and hmacAuthConfirm are different, an authentication key verification failure message is sent, and the authentication process is terminated.

1414: The source device caches the authentication information, including rxId, authKey, and version, caches certificates, including caCert and rxCert, and sets the authentication status of the receiver end to "success".

1415: The receiver end caches the authentication key txId, authKey, and version.

In some embodiments, for HMAC and signature verification (including certificate verification) errors, the source device may retry for eight times.

Figure 15:
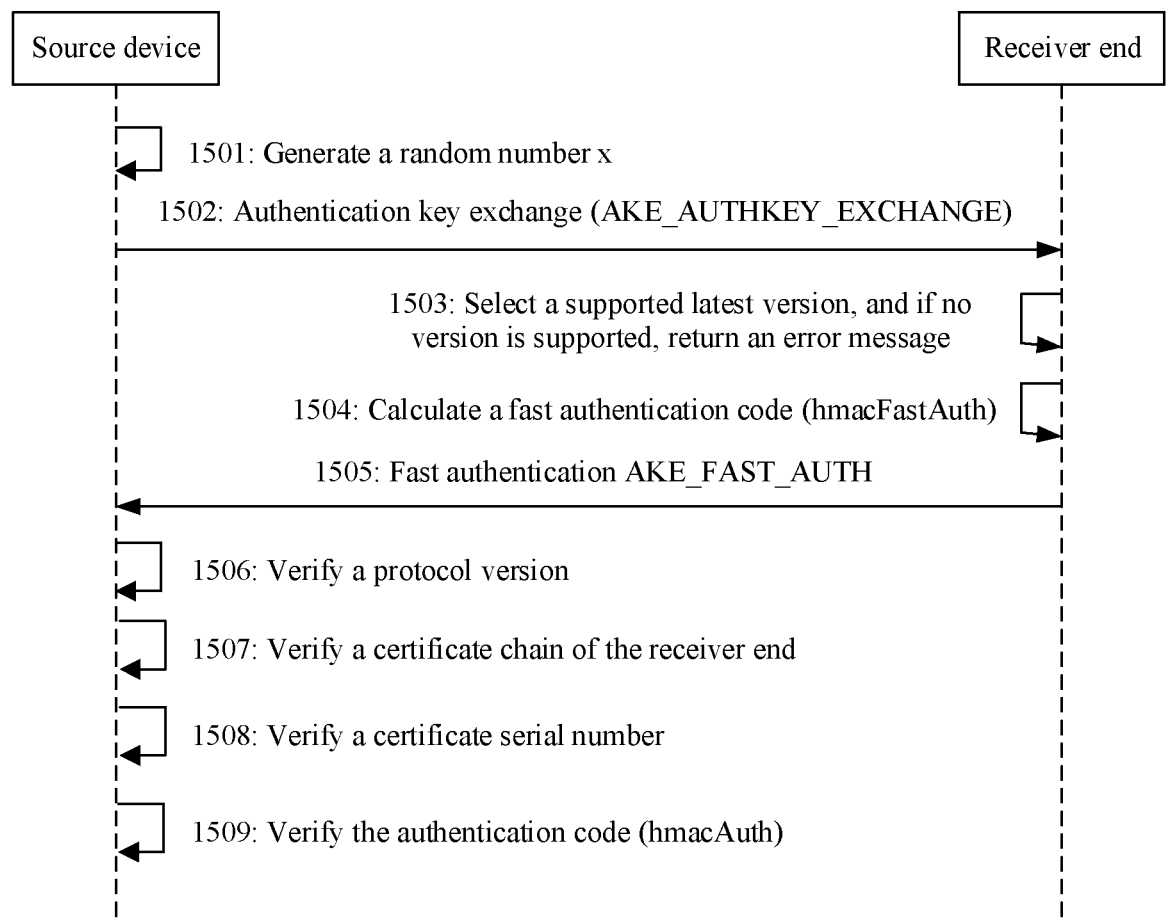
FIG. 15 is a schematic diagram of another possible identity authentication procedure according to an embodiment of this application.

In a possible implementation, after the source device and the receiver end complete one-way authentication key exchange, both parties cache the authKey. During next re-authentication, the source device determines, by comparing hmacAuth, whether the receiver end caches the authKey. If the receiver end caches the authKey, the source device skips a subsequent authentication step, to implement one-way fast authentication. FIG. 15 is another possible schematic flowchart of identity authentication.

1501: A source device generates a random number x.

1502: The source device sends an authentication key exchange AKE_AUTHKEY_EXCHANGE message, where the message includes a unique identifier txId of the source device, a version list supportedVersions supported by the source device, an ECDH key negotiation parameter list [xG0||xG1] calculated by the source device by using the supported algorithm, and a fast authentication flag enableFastAuth, where a key negotiation parameter of the national encryption algorithm is xG0, and a key negotiation parameter of the international algorithm is xG1. The txId of the source device may be randomly generated, and may be stored in a local non-volatile storage. enableFastAuth is set to 1. For example, for a format definition of the AKE_AUTHKEY_EXCHANGE message, refer to Table 9.

1503: The receiver end receives the AKE_AUTHKEY_EXCHANGE message, selects a supported latest version from the version list supported by the source device, and if no version is supported, returns an error message ERROR_ACK indicating that the version is not supported. For example, for a format definition of the ERROR_ACK message, refer to Table 10.

1504: If enableFastAuth is 1, the receiver end determines whether a corresponding txId and an authentication key authKey are cached, and if the authKey is cached, calculates hmacFastAuth=HMAC (txId||version, authKey).

1505: The receiver end sends an AKE_FAST_AUTH message, where the AKE_FAST_AUTH message includes a protocol version supported by the receiver end, a device CA certificate caCert of the receiver end, a device certificate rxCert, and hmacFastAuth.

In an example, Table 13 describes a format definition of the AKE_FAST_AUTH message as an example.

TABLE 13

| Field | Length (bytes) | Description |
| --- | --- | --- |
| msgId | 1 | Message ID. The value is 0x04. |
| msgLen | 2 | Message length |
| version | 2 | Protocol version selected by the receiver end |
| caCertLen | 2 | Length of a device CA certificate of the receiver end. |
| caCert | caCertLen | Device CA certificate of the receiver end |
| rxCertLen | 2 | Length of a device certificate of the receiver end |
| rxCert | rxCertLen | Device certificate of the receiver end |
| hmacFastAuth | 32 | HMAC fast authentication code |

1506: The source device receives the AKE_FAST_AUTH message, verifies the protocol version, and determines whether the protocol version of the receiver end is supported. If the protocol version of the receiver end is supported, the next step 1507 is performed; or if the protocol version of the receiver end is not supported, the authentication status is recorded as a protocol version error, and the authentication procedure is terminated.

1507: The source device verifies the certificate chain of the receiver end. If caCert and rxCert in the cache are consistent with caCert and rxCert in the AKE_FAST_AUTH message, the next step 1508 is performed; or if caCert and rxCert in the cache are inconsistent with caCert and rxCert in the AKE_FAST_AUTH message, the authentication status is recorded as a certificate verification failure, and the authentication procedure is terminated.

1508: The source device determines whether the caCert and rxCert serial numbers are in the revocation list. If the caCert and rxCert serial numbers are not included in the revocation list, the next step 1509 is performed; or if the caCert and rxCert serial numbers are included in the revocation list, the authentication status is recorded as "certificate revoked", and the authentication process is terminated.

1509: The source device calculates HMAC (txId||version, authKey), and compares HMAC (txId||version, authKey) with the received hmacFastAuth. If the comparison succeeds, the fast authentication succeeds; or if the comparison fails, the authentication procedure is terminated. After the authentication process is terminated, the source device sets enableFastAuth to 0, disables the fast authentication mode, and restarts the authentication key exchange process.

After completing the identity authentication on each receiver end, the source device may perform key negotiation with the receiver end, for example, negotiate a content key encryption key CKEK and a location check HMAC key lcMacKey. As an example, when the transmitter in the source device negotiates a key with the receiver end, a key derivation algorithm (password-based derived key derivation function) PDKDF2 may be used. The derived key derivedKey may be determined in the following manner:

derivedKey=PDKDF2 (hash algorithm, password, salt, count, keyLen)

The hash algorithm is determined by the signature algorithm of the device certificate of the receiver end. For example, if the signature algorithm is a national encryption algorithm, the data digest algorithm SM3 is used; or if the signature algorithm is an international algorithm, the data digest algorithm SHA256 is used. "password" indicates a derivation parameter; "salt" indicates a salt value; "count" indicates a quantity of iterations; and "keyLen" indicates a length of a derived key.

As an example, both the source device and the receiver end may determine the content key encryption key CKEK in the following manner:

CKEK=PDKDF2 (hash algorithm, authKey||global authentication constant||"content key encryption key", yG||xG, 1, 16). "yG||xG" is used as the salt value, and the password includes authKey, the global authentication constant, and the content key encryption key. || indicates a hyphen. The quantity of iterations is 1, and the length of the derived key is 16. The global authentication constant is used for key derivation in the key negotiation process. For example, the value of the global authentication constant may be 0x85AC702793BD614F.

In an example, both the source device and the receiver end may determine a location check HMAC key in the following manner:

lcMacKey=PDKDF2 (hash algorithm, authKey||Global authentication constant||"locality check hmac key", yG||xG, 1, 16)

Figure 16:
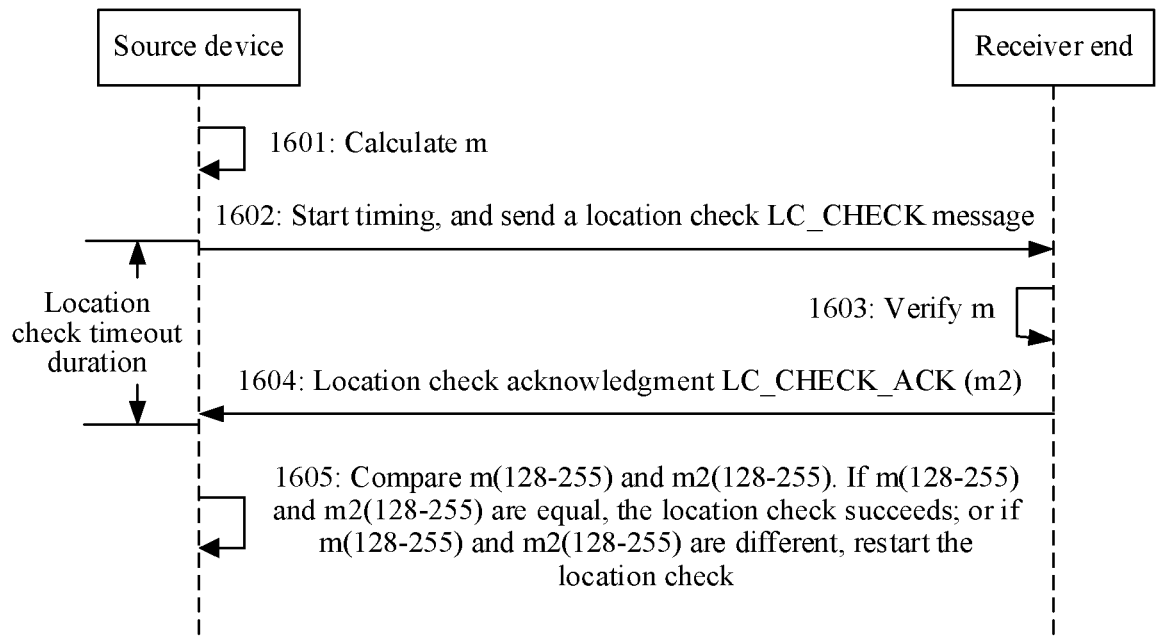
FIG. 16 is a schematic flowchart of another possible location check according to an embodiment of this application.

The following describes a location check procedure in this embodiment of this application. After the source device authenticates the identity of the receiver end and completes the key negotiation, the transmitter in the source device may check the location of the receiver end, to further verify the receiver end, to prevent the receiver end from receiving data that does not belong to the receiver end or beyond a specified distance. FIG. 16 is a possible schematic flowchart of location check of a receiver end.

1601: A transmitter in a source device calculates m=HMAC (seqNum, lcMacKey), where the least significant 128 bits of m are m(0-127), the most significant 128 bits of m are m(128-255), and seqNum is initialized to 1 after identity authentication and key negotiation are performed.

1602: The transmitter starts timing (t0), and sends a location check LC_CHECK message, where the message includes seqNum and m(0-127).

In an example, Table 14 describes a format definition of the LC_CHECK message as an example.

TABLE 14

| Field | Length (bytes) | Description |
| --- | --- | --- |
| msgId | 2 | Message ID. The value is 0x05. |
| msgLen | 2 | Message length |
| seqNum | 1 | Sequence number |
| m (0-127) | 16 | The least significant 128 bits of HMAC |

1603: The receiver end receives the LC_CHECK message, calculates m2=HMAC (seqNum, lcMacKey), and compares whether the least significant 128 bits of m2, namely m2(0-127), and m(0-127) are equal. If the least significant 128 bits of m2, namely m2(0-127), and m(0-127) are equal, the next step 1604 is performed; or if the least significant 128 bits of m2, namely m2(0-127), and m(0-127) are different, a location check error message is sent.

1604: The receiver end sends an LC_CHECK_ACK message, where the message includes seqNum and the most significant 128 bits of m2, namely m2(128-255).

In an example, Table 15 describes a format definition of the LC_CHECK_ACK message as an example.

TABLE 15

| Field | Length (bytes) | Description |
| --- | --- | --- |
| msgId | 2 | Message ID. The value is 0x06. |
| msgLen | 2 | Message length |
| seqNum | 1 | Sequence number |
| m(128-255) | 16 | the least significant 256 bits of HMAC |

1605: The transmitter receives the LC_CHECK_ACK message and starts timing (t1), and compares whether t1-t0 is shorter than the location check time; and if the comparison succeeds, the location check continues; or if the comparison fails, the location check is failed. Then, the transmitter compares whether m2(128-255) and m(128-255) are equal. If m2(128-255) and m(128-255) are equal, the location check succeeds; or if m2(128-255) and m(128-255) are different, the location check is restarted. The transmitter can retry for a maximum of eight times. If all the retries fail, the location check fails, and the process is terminated.

If the location check fails and the quantity of retry times is within the specified range, the value of seqNum can be increased by 1, and then the location check can be restarted. To ensure that the location check is not affected by the HMAC calculation performance as much as possible, the receiver end may first calculate the value of m in advance.

Based on the descriptions in the foregoing embodiments, the following provides a summary of the key used in this embodiment of this application. For example, refer to Table 16.

TABLE 16

| Layer | Key category | Key | Key algorithm | Generation | Usage | Distribution | Storage | Updating | Destroying |
| --- | --- | --- | --- | --- | --- | --- | --- | --- | --- |
| 1 | Device public-private key pair | ECDH temporary key | ECDH algorithm. National encryption algorithm: SM2; International algorithm: x25519 | The private key is generated randomly. | ECDH key negotiation | The public key is sent to the peer end during identity authentication. | Not stored | Randomly re-generated when identity authentication is re-enabled | Cleared when authentication ends |
|  | Device private key and certificate | Authentication key | National encryption algorithm: SM2; International algorithm: Ed25519 | Issued by an authoritative organization | Authentication key, which is used to sign and verify data | The certificate is sent to the peer end during identity authentication. | Secure storage | Re-added to the secure storage | Deleted from the secure storage, and revoked |
| 2 | Authentication key | authKey | National encryption algorithm: PBKDF2 (SM3); International algorithm: PBKDF2 (SHA256) | Generated through ECDH negotiation | Derived key | Not transmitted | Not stored | ECDH negotiation is performed again when identity authentication is re-enabled. | Cleared when the device restarts or when a validity period (for example, 24 hours) expires |
| 3 | Key derivation | Content key encryption key CKEK | National encryption algorithm: SM4-CTR International algorithm: AES-128-CTR | Generated through derivation | Content key encryption | Not transmitted | Not stored | Re-derived when the authentication key is updated | Cleared when the device restarts or the authentication key is cleared |

TABLE 16-continued

| Layer | Key category | Key | Key algorithm | Generation | Usage | Distribution | Storage | Updating | Destroying |
|---|---|---|---|---|---|---|---|---|---|
| | | Location check HMAC key lcMacKey | National encryption algorithm: HMAC (SM3) International algorithm: HMAC (SHA256) | Generated through derivation | Location check and integrity verification | Not transmitted | Not stored | Re-derived when the authentication key is updated | Cleared when the device restarts or the authentication key is cleared |
| 4 | Content key. | Content encryption key CK | National encryption algorithm: SM4-CTR/GCM International algorithm: AES-128-CTR/GCM | Randomly generated | Encryption of an audio-video stream | The transmitter uses the CKEK to encrypt the content key, packs the content key into a key distribution packet, and sends the packet to the receiver end. | Not stored | A parity key transformation mechanism is used: (1) The content key is updated when the validity period (for example, 2 hours) expires; (2) The content key is updated after the CKEK is updated; (3) The content key is updated when the authorization changes. | The content key is destroyed when the device restarts or the audio-video stream is closed, or the content key is overwritten when being updated. |

Figure 17:
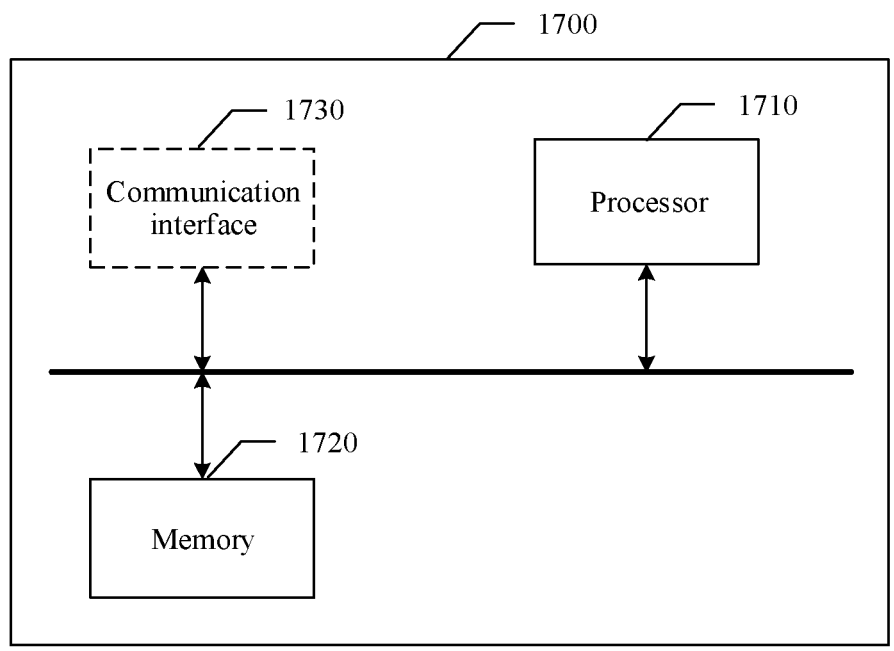
FIG. 17 is a schematic structural diagram of a data transmission apparatus according to an embodiment of this application.

FIG. 17 is a schematic diagram of a possible structure of a data transmission apparatus according to an embodiment of this application. As shown in FIG. 17, the apparatus 1700 includes a processor 1710 and a memory 1720. It should be understood that, when the apparatus 1700 is a chip product, the apparatus 1700 may include only the processor 1710, and the memory 1720 may be considered as a memory chip outside the apparatus 1700. The apparatus 1700 may further include a communication interface 1730. The communication interface 1730 is configured to communicate with another apparatus. In an implementation process, steps in a processing procedure may be performed by using a hardware integrated logic circuit in the processor 1710, or an instruction in a form of software, to implement the methods in FIG. 2A to FIG. 16, for example, the method in the source device, the method in the sink device, the method in the daisy chain device, the method in the repeater device, and the method in the router device. In this embodiment of this application, the communication interface 1730 may be a hardware interface that may be configured to perform information exchange, such as a circuit or a bus.

In this embodiment of this application, the processor 1710 may be a general-purpose processor, a digital signal processor, an application-specific integrated circuit, a field programmable gate array or another programmable logic device, a discrete gate or a transistor logic device, or a discrete hardware component. The general-purpose processor may be a microprocessor, any conventional processor, or the like. The steps of the methods disclosed with reference to the embodiments of this application may be directly performed by a hardware processor, or may be performed by a combination of hardware in the processor and a software unit. Program code executed by the processor 1710 for implementing the foregoing method may be stored in the memory 1720. The memory 1720 is coupled to the processor 1710. The coupling in this embodiment of this application may be an indirect coupling or a communication connection between apparatuses, units, or modules in an electrical form, a mechanical form, or another form, and is used for information exchange between the apparatuses, the units, or the modules. The processor 1710 may cooperate with the memory 1720. The memory 1720 may be a non-volatile memory such as a hard disk drive (hard disk drive, HDD) or a solid-state drive (solid-state drive, SSD). The memory 1720 is any other medium capable of carrying or storing expected program code in a form of instructions or data structures and capable of being accessed by a computer, but is not limited thereto. The memory 1720 is further configured to: associatively store a digital certificate, a private key, and identification information, and associatively store the identification information and a pass key.

A specific connection medium between the communication interface 1730, the processor 1710, and the memory 1720 is not limited in this embodiment of this application. In this embodiment of this application, in FIG. 17, the communication interface 1730, the processor 1710, and the memory 1720 are connected through a bus. The bus is represented by a thick line in FIG. 17, and a connection manner between other components is merely described as an example, and is not limited thereto. The bus may be classified into an address bus, a data bus, a control bus, and the like. For ease of representation, only one thick line is used to represent the bus in FIG. 17, but this does not mean that there is only one bus or only one type of bus.

Based on a same invention idea, an embodiment of this application provides a computer program product, including a computer program. When the computer program is executed on a computer, the computer is enabled to implement the function in any one of the foregoing certificate management method embodiments.

Based on a same invention idea, an embodiment of this application provides a computer program. When the computer program is executed on a computer, the computer is enabled to implement the function in any one of the foregoing certificate management method embodiments.

Based on a same invention idea, an embodiment of this application provides a computer-readable storage medium, configured to store a program and instructions. When the program and the instructions are invoked and executed on a computer, the computer may be enabled to implement the function in any one of the foregoing certificate management method embodiments.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may be implemented in a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts/or in one or more blocks in the block diagrams.

It is clear that a person skilled in the art can make various modifications and variations to embodiments of this application without departing from the scope of embodiments of this application. This application is intended to cover these modifications and variations provided that they fall within the scope of protection defined by the following claims and their equivalent technologies.

What is claimed is:

1. A data transmission method, applied to a source device, comprising:
    performing identity authentication on a downstream first transmission apparatus, and negotiating a first encryption key with the first transmission apparatus;
    generating a first content key, and encrypting the first content key by using the first encryption key to obtain a second content key, wherein the first content key is used to encrypt or decrypt content transmitted between the source device and the first transmission apparatus;
    generating a first key distribution packet based on the second content key, wherein the first key distribution packet comprises the second content key and is used by the first transmission apparatus to decrypt content from the source device;
    obtaining first audio-video data, and encapsulating the first audio-video data into an audio-video packet, wherein the audio-video packet belongs to a first audio-video stream;
    processing the first audio-video stream to obtain a second audio-video stream, wherein processing the first audio-video stream comprises encrypting the audio-video packet of the first audio-video stream by using the first content key, and the second audio-video stream comprises the generated first key distribution packet; and
    sending the second audio-video stream to the first transmission apparatus.

2. The method according to claim 1, wherein processing the first audio-video stream to obtain the second audio-video stream comprises:
    encrypting the first audio-video stream by using the first content key and a randomly generated first count value, and adding the first key distribution packet to the encrypted first audio-video stream to obtain the second audio-video stream, wherein the first key distribution packet further comprises the first count value.

3. The method according to claim 1, wherein the first key distribution packet further comprises at least one of a device identifier of the first transmission apparatus or a first stream identifier, the device identifier of the first transmission apparatus indicates that a device that uses the first key distribution packet is the first transmission apparatus, and the first stream identifier indicates that an audio-video stream to which the first key distribution packet is applied is transmitted between the source device and the first transmission apparatus.

4. The method according to claim 3, wherein the first key distribution packet further comprises one or more of an encryption algorithm, an encryption mode, and a check code.

5. The method according to claim 1, wherein the first content key comprises an odd content key or an even content key, and the second content key comprises an encrypted odd content key that is obtained by encrypting the odd content key by using the first encryption key or an encrypted even content key that is obtained by encrypting the even content key by using the first encryption key.

6. The method according to claim 2, wherein adding the first key distribution packet to the encrypted first audio-video stream to obtain the second audio-video stream comprises:
adding the first key distribution packet to a vertical blanking area of the encrypted first audio-video stream to obtain the second audio-video stream.

7. The method according to claim 1, wherein the downstream first transmission apparatus is a sink device, the source device is connected to the first transmission apparatus through a second transmission apparatus, the second transmission apparatus is a daisy chain device, and the method further comprises:
performing identity authentication on the daisy chain device, and negotiating a second encryption key with the daisy chain device;
obtaining second audio-video data, and encapsulating the second audio-video data into an audio-video packet that belongs to a third audio-video stream;
generating a third content key, and using the second encryption key to encrypt the third content key to obtain a fourth content key, wherein the third content key is used to encrypt or decrypt content transmitted between the source device and the daisy chain device;
processing the third audio-video stream to obtain a fourth audio-video stream, wherein processing the third audio-video stream comprises encrypting the audio-video packet of the third audio-video stream by using the third content key, and wherein the fourth audio-video stream comprises a second key distribution packet, the second key distribution packet is used by the daisy chain device to decrypt the content from the source device, and the second key distribution packet comprises the fourth content key; and
multiplexing the second audio-video stream and the fourth audio-video stream into one audio-video stream, and sending the one audio-video stream to the daisy chain device.

8. The method according to claim 1, wherein:
the first transmission apparatus is an audio-video processor device on a transmission path between the source device and a second transmission apparatus, and the second transmission apparatus is a sink device corresponding to the source device; or
the first transmission apparatus is a sink device corresponding to the source device, and the first transmission apparatus supports back-transmission of audio-video data of the source device to an upstream second transmission apparatus; and
the method further comprises:
performing identity authentication on the second transmission apparatus, and negotiating a third encryption key with the second transmission apparatus; and
generating a fifth content key, encrypting the fifth content key by using the first encryption key to obtain a sixth content key, and encrypting the fifth content key by using the third encryption key to obtain a seventh content key, wherein the fifth content key is used to encrypt or decrypt content transmitted between the first transmission apparatus and the second transmission apparatus, and wherein the second audio-video stream further comprises a third key distribution packet and a fourth key distribution packet, the third key distribution packet is used by the first transmission apparatus to encrypt content to be transmitted to the second transmission apparatus, the fourth key distribution packet is used by the second transmission apparatus to decrypt content from the first transmission apparatus, the third key distribution packet comprises the sixth content key, and the fourth key distribution packet comprises the seventh content key.

9. The method according to claim 8, wherein at least one of:
the third key distribution packet further comprises a device identifier of the first transmission apparatus, which indicates that a device that uses the third key distribution packet is the first transmission apparatus, and the fourth key distribution packet further comprises a device identifier of the second transmission apparatus, which indicates that a device that uses the fourth key distribution packet is the second transmission apparatus; or
the third key distribution packet further comprises a first stream identifier, which indicates that an audio-video stream on which the third key distribution packet acts is transmitted between the source device and the first transmission apparatus, and the fourth key distribution packet further comprises a second stream identifier, which indicates that an audio-video stream on which the fourth key distribution packet acts is transmitted between the first transmission apparatus and the second transmission apparatus.

10. The method according to claim 1, wherein the first transmission apparatus is a sink device corresponding to the source device, the sink device corresponding to the source device further comprises a downstream second transmission apparatus, the source device is connected to both the first transmission apparatus and the second transmission apparatus through a repeater, and the method further comprises:
performing identity authentication on a downstream second transmission apparatus, and negotiating a fourth encryption key with the second transmission apparatus; and
encrypting the first content key by using the fourth encryption key to obtain an eighth content key, wherein the first content key is further used to encrypt or decrypt content transmitted between the source device and the second transmission apparatus, wherein the second audio-video stream comprises a fifth key distribution packet used by a second transmission apparatus, and the fifth key distribution packet comprises the eighth content key; and
wherein sending the second audio-video stream to the first transmission apparatus comprises:
sending the second audio-video stream to both the first transmission apparatus and the second transmission apparatus through the repeater.

11. The method according to claim 10, wherein the fifth key distribution packet further comprises at least one of a device identifier of the second transmission apparatus or a third stream identifier, the device identifier of the second transmission apparatus indicates that a device that uses the fifth key distribution packet is the second transmission apparatus, and the third stream identifier indicates that an audio-video stream on which the fifth key distribution packet acts is transmitted between the source device and the second transmission apparatus.

12. The method according to claim 7, wherein the method further comprises:
receiving authorization control information from a content authorization system; and verifying that the first transmission apparatus and the second transmission apparatus meet a requirement of the authorization control information.

13. The method according to claim 8, wherein;
performing identity authentication on the first transmission apparatus comprises:
  performing identity authentication on the first transmission apparatus through an auxiliary link to the first transmission apparatus; and
performing identity authentication on the second transmission apparatus comprises:
  performing identity authentication on the second transmission apparatus through an auxiliary link to the second transmission apparatus.

14. A data transmission method, comprising:
negotiating, by a first transmission apparatus, a first encryption key with a source device, wherein the first transmission apparatus includes a daisy chain device, and the source device, the first transmission apparatus, and a second transmission apparatus are in a daisy chain topology structure;
receiving, by the first transmission apparatus, a second audio-video stream from the source device, wherein the second audio-video stream comprises a first key distribution packet, the first key distribution packet is used by the first transmission apparatus to decrypt content from the source device, and the first key distribution packet comprises a second content key;
decrypting, by the first transmission apparatus, the second content key by using the first encryption key to obtain a first content key;
decrypting, by the first transmission apparatus, the second audio-video stream by using the first content key to obtain a first audio-video stream;
parsing, by the first transmission apparatus, the first audio-video stream to obtain audio-video data, and outputting the audio-video data;
receiving, by the first transmission apparatus, a third audio-video stream from the source device, wherein the third audio-video stream comprises a second key distribution packet, and the second key distribution packet is used by the second transmission apparatus to decrypt the content from the source device; and
forwarding, by the first transmission apparatus, the third audio-video stream to the second transmission apparatus.

15. The method according to claim 14, wherein the first key distribution packet further comprises a first count value, and decrypting the second content key by using the first encryption key to obtain the first content key comprises:
  decrypting the second content key by using the first encryption key and the first count value to obtain the first content key.

16. A data transmission device, comprising:
at least one processor; and
at least one memory coupled to the at least one processor and storing programming instructions for execution by the at least one processor to perform operations comprising:
  performing identity authentication on a downstream first transmission apparatus, and negotiating a first encryption key with the first transmission apparatus;
  generating a first content key, and encrypting the first content key by using the first encryption key to obtain a second content key, wherein the first content key is used to encrypt or decrypt content transmitted between the data transmission device and the first transmission apparatus;
  generating a first key distribution packet based on the second content key, wherein the first key distribution packet comprises the second content key and is used by the first transmission apparatus to decrypt content from the data transmission device;
  obtaining first audio-video data, and encapsulating the first audio-video data into an audio-video packet, wherein the audio-video packet belongs to a first audio-video stream;
  processing the first audio-video stream to obtain a second audio-video stream, wherein processing the first audio-video stream comprises encrypting the audio-video packet of the first audio-video stream by using the first content key, and the second audio-video stream comprises the generated first key distribution packet; and
  sending the second audio-video stream to the first transmission apparatus.

17. The data transmission device according to claim 16, wherein processing the first audio-video stream to obtain the second audio-video stream comprises:
  encrypting the first audio-video stream by using the first content key and a randomly generated first count value, and adding the first key distribution packet to the encrypted first audio-video stream to obtain the second audio-video stream, wherein the first key distribution packet further comprises the first count value.

18. The data transmission device according to claim 16, wherein the first key distribution packet further comprises at least one of a device identifier of the first transmission apparatus or a first stream identifier, the device identifier of the first transmission apparatus indicates that a device that uses the first key distribution packet is the first transmission apparatus, and the first stream identifier indicates that an audio-video stream to which the first key distribution packet is applied is transmitted between the data transmission device and the first transmission apparatus.

19. The data transmission device according to claim 18, wherein the first key distribution packet further comprises one or more of an encryption algorithm, an encryption mode, and a check code.

20. The data transmission device according to claim 16, wherein the first content key comprises an odd content key or an even content key, and the second content key comprises an encrypted odd content key that is obtained by encrypting the odd content key by using the first encryption key or an encrypted even content key that is obtained by encrypting the even content key by using the first encryption key.

* * * * *